US009363481B2

(12) United States Patent
Grigorovitch et al.

(10) Patent No.: US 9,363,481 B2
(45) Date of Patent: Jun. 7, 2016

(54) PROTECTED MEDIA PIPELINE

(75) Inventors: Alexandre Grigorovitch, Redmond, WA (US); Chadd Knowlton, Bellevue, WA (US); Kirt Debique, Seattle, WA (US); James Alkove, Woodinville, WA (US); Geoffrey T. Dunbar, Kirkland, WA (US); Sumedh N. Barde, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2716 days.

(21) Appl. No.: 11/116,689

(22) Filed: Apr. 27, 2005

(65) Prior Publication Data
US 2006/0248594 A1  Nov. 2, 2006

Related U.S. Application Data

(60) Provisional application No. 60/673,979, filed on Apr. 22, 2005.

(51) Int. Cl.
*H04N 7/16* (2011.01)
*G06F 21/10* (2013.01)
*H04L 29/06* (2006.01)
(Continued)

(52) U.S. Cl.
CPC ............. *H04N 7/163* (2013.01); *G06F 21/10* (2013.01); *H04L 63/0428* (2013.01); *H04N 21/42646* (2013.01); *H04N 21/43615* (2013.01);
(Continued)

(58) Field of Classification Search
CPC . G06F 21/10; G11B 20/0021; H04L 63/0428; H04N 21/4627

USPC .............. 709/246; 713/193, 200, 164, 160; 726/26, 27, 22, 12; 707/9; 705/59; 715/716
See application file for complete search history.

(56) References Cited

U.S. PATENT DOCUMENTS

| 3,718,906 A | 2/1973 | Lightner |
| 4,183,085 A | 1/1980 | Roberts |

(Continued)

FOREIGN PATENT DOCUMENTS

| CN | 1287665 | 3/2001 |
| CN | 1305159 | 7/2001 |

(Continued)

OTHER PUBLICATIONS

Changgui Shi; A fast MPEG video encryption algorithm; Year of Publication: 1998 ; Bristol, United Kingdom ; pp. 81-88.*

(Continued)

*Primary Examiner* — Saleh Najjar
*Assistant Examiner* — Peiliang Pan
(74) *Attorney, Agent, or Firm* — Henry Gabryjelski; Kate Drakos; Micky Minhas

(57) ABSTRACT

A system for processing a media content comprising an application space, a media control mechanism operating in the application space, the media control mechanism controlling the operation of the system, a user interface adapted to provide input to the media control mechanism, a protected space distinct from the application space, and a protected media pipeline operating in the protected space, the protected media pipeline coupled to the media control mechanism, the protected media pipeline adapted to access the media content, process the media content, and output the media content.

19 Claims, 22 Drawing Sheets

(51) Int. Cl.
*H04N 21/426* (2011.01)
*H04N 21/436* (2011.01)
*H04N 21/4627* (2011.01)
*H04N 21/8355* (2011.01)
*G11B 20/00* (2006.01)

(52) U.S. Cl.
CPC ....... *H04N21/4627* (2013.01); *H04N 21/8355* (2013.01); *G11B 20/0021* (2013.01)

(56) References Cited

U.S. PATENT DOCUMENTS

| | | |
|---|---|---|
| 4,323,921 A | 4/1982 | Guillou |
| 4,405,829 A | 9/1983 | Rivest |
| 4,528,643 A | 7/1985 | Freeny |
| 4,529,870 A | 7/1985 | Chaum |
| 4,558,176 A | 12/1985 | Arnold et al. |
| 4,620,150 A | 10/1986 | Germer et al. |
| 4,658,093 A | 4/1987 | Hellman |
| 4,683,553 A | 7/1987 | Mollier |
| 4,750,034 A | 6/1988 | Lem |
| 4,817,094 A | 3/1989 | Lebizay et al. |
| 4,827,508 A | 5/1989 | Shear |
| 4,855,730 A | 8/1989 | Venners et al. |
| 4,855,922 A | 8/1989 | Huddleston et al. |
| 4,857,999 A | 8/1989 | Welsh |
| 4,910,692 A | 3/1990 | Outram |
| 4,916,738 A | 4/1990 | Chandra |
| 4,926,479 A | 5/1990 | Goldwasser |
| 4,953,209 A | 8/1990 | Ryder |
| 4,959,774 A | 9/1990 | Davis |
| 4,967,273 A | 10/1990 | Greenberg |
| 4,977,594 A | 12/1990 | Shear |
| 5,001,752 A | 3/1991 | Fischer |
| 5,012,514 A | 4/1991 | Renton |
| 5,047,928 A | 9/1991 | Wiedemer |
| 5,050,213 A | 9/1991 | Shear |
| 5,103,392 A | 4/1992 | Mori |
| 5,103,476 A | 4/1992 | Waite |
| 5,109,413 A | 4/1992 | Comerford |
| 5,117,457 A | 5/1992 | Comerford |
| 5,193,573 A | 3/1993 | Chronister |
| 5,204,897 A | 4/1993 | Wyman |
| 5,222,134 A | 6/1993 | Waite |
| 5,249,184 A | 9/1993 | Woest et al. |
| 5,261,002 A | 11/1993 | Perlman |
| 5,269,019 A | 12/1993 | Peterson et al. |
| 5,274,368 A | 12/1993 | Breeden et al. |
| 5,295,266 A | 3/1994 | Hinsley |
| 5,301,268 A | 4/1994 | Takeda |
| 5,303,370 A | 4/1994 | Brosh |
| 5,319,705 A | 6/1994 | Halter |
| 5,355,161 A | 10/1994 | Bird et al. |
| 5,369,262 A | 11/1994 | Dvorkis et al. |
| 5,373,561 A | 12/1994 | Haber |
| 5,406,630 A | 4/1995 | Piosenka et al. |
| 5,410,598 A | 4/1995 | Shear |
| 5,414,861 A | 5/1995 | Horning |
| 5,437,040 A | 7/1995 | Campbell |
| 5,442,704 A | 8/1995 | Holtey |
| 5,444,780 A | 8/1995 | Hartman |
| 5,448,045 A | 9/1995 | Clark |
| 5,457,699 A | 10/1995 | Bode |
| 5,459,867 A | 10/1995 | Adams et al. |
| 5,469,506 A | 11/1995 | Berson |
| 5,473,692 A | 12/1995 | Davis |
| 5,490,216 A | 2/1996 | Richardson, III |
| 5,500,897 A | 3/1996 | Hartman, Jr. |
| 5,509,070 A | 4/1996 | Schull |
| 5,513,319 A | 4/1996 | Finch et al. |
| 5,522,040 A | 5/1996 | Hofsass et al. |
| 5,530,846 A | 6/1996 | Strong |
| 5,535,276 A | 7/1996 | Ganesan |
| 5,552,776 A | 9/1996 | Wade et al. |
| 5,553,143 A | 9/1996 | Ross |
| 5,557,765 A | 9/1996 | Lipner |
| 5,563,799 A | 10/1996 | Brehmer et al. |
| 5,568,552 A | 10/1996 | Davis |
| 5,586,291 A | 12/1996 | Lasker et al. |
| 5,615,268 A | 3/1997 | Bisbee |
| 5,629,980 A | 5/1997 | Stefik |
| 5,634,012 A | 5/1997 | Stefik |
| 5,636,292 A | 6/1997 | Rhoads |
| 5,638,443 A | 6/1997 | Stefik |
| 5,638,513 A | 6/1997 | Ananda |
| 5,644,364 A | 7/1997 | Kurtze |
| 5,671,412 A | 9/1997 | Christiano |
| 5,673,316 A | 9/1997 | Auerbach |
| 5,708,709 A | 1/1998 | Rose |
| 5,710,706 A | 1/1998 | Markl et al. |
| 5,710,887 A | 1/1998 | Chelliah |
| 5,715,403 A | 2/1998 | Stefik |
| 5,717,926 A | 2/1998 | Browning |
| 5,721,788 A | 2/1998 | Powell |
| 5,724,425 A | 3/1998 | Chang et al. |
| 5,745,573 A | 4/1998 | Lipner |
| 5,745,879 A | 4/1998 | Wyman |
| 5,754,657 A | 5/1998 | Schipper |
| 5,754,763 A | 5/1998 | Bereiter |
| 5,757,908 A | 5/1998 | Cooper |
| 5,758,068 A | 5/1998 | Brandt et al. |
| 5,763,832 A | 6/1998 | Anselm |
| 5,765,152 A | 6/1998 | Erickson |
| 5,768,382 A | 6/1998 | Schneier et al. |
| 5,771,354 A | 6/1998 | Crawford |
| 5,774,870 A | 6/1998 | Storey |
| 5,790,664 A | 8/1998 | Coley |
| 5,793,839 A | 8/1998 | Farris et al. |
| 5,799,088 A | 8/1998 | Raike |
| 5,802,592 A | 9/1998 | Chess |
| 5,809,144 A | 9/1998 | Sirbu |
| 5,809,145 A | 9/1998 | Slik |
| 5,812,930 A | 9/1998 | Zavrel |
| 5,825,876 A | 10/1998 | Peterson |
| 5,825,877 A | 10/1998 | Dan |
| 5,825,879 A | 10/1998 | Davis |
| 5,825,883 A | 10/1998 | Archibald et al. |
| 5,841,865 A | 11/1998 | Sudia |
| 5,844,986 A | 12/1998 | Davis |
| 5,845,065 A | 12/1998 | Conte et al. |
| 5,845,281 A | 12/1998 | Benson |
| 5,864,620 A | 1/1999 | Pettitt |
| 5,872,846 A | 2/1999 | Ichikawa |
| 5,875,236 A | 2/1999 | Jankowitz et al. |
| 5,883,670 A | 3/1999 | Sporer et al. |
| 5,883,955 A | 3/1999 | Ronning |
| 5,883,958 A | 3/1999 | Ishiguro |
| 5,892,900 A | 4/1999 | Ginter |
| 5,892,906 A | 4/1999 | Chou et al. |
| 5,893,086 A | 4/1999 | Schmuck |
| 5,893,920 A | 4/1999 | Shaheen |
| 5,905,799 A | 5/1999 | Ganesan |
| 5,913,038 A | 6/1999 | Griffiths |
| 5,917,912 A | 6/1999 | Ginter |
| 5,925,127 A | 7/1999 | Ahmad |
| 5,926,624 A | 7/1999 | Katz |
| 5,935,248 A | 8/1999 | Kuroda |
| 5,943,248 A | 8/1999 | Clapp |
| 5,943,422 A | 8/1999 | Van Wie |
| 5,948,061 A | 9/1999 | Merriman |
| 5,949,877 A | 9/1999 | Traw |
| 5,949,879 A | 9/1999 | Berson |
| 5,951,642 A | 9/1999 | Onoe |
| 5,953,502 A | 9/1999 | Helbig et al. |
| 5,956,408 A | 9/1999 | Arnold |
| 5,982,891 A | 11/1999 | Ginter |
| 5,983,238 A | 11/1999 | Becker et al. |
| 5,983,350 A | 11/1999 | Minear |
| 5,987,126 A | 11/1999 | Okuyama |
| 5,991,406 A | 11/1999 | Lipner |
| 5,994,710 A | 11/1999 | Knee et al. |
| 5,995,625 A | 11/1999 | Sudia |
| 6,005,945 A | 12/1999 | Whitehouse |
| 6,009,177 A | 12/1999 | Sudia |

(56) References Cited

U.S. PATENT DOCUMENTS

| | | |
|---|---|---|
| 6,021,438 A | 2/2000 | Duvvoori |
| 6,023,510 A | 2/2000 | Epstein |
| 6,026,293 A | 2/2000 | Osborn |
| 6,049,789 A | 4/2000 | Frison et al. |
| 6,049,878 A | 4/2000 | Caronni |
| 6,052,735 A | 4/2000 | Ulrich |
| 6,058,188 A | 5/2000 | Chandersekaran |
| 6,058,476 A | 5/2000 | Matsuzaki |
| 6,061,451 A | 5/2000 | Muratani |
| 6,061,794 A | 5/2000 | Angelo et al. |
| 6,069,647 A | 5/2000 | Sullivan |
| 6,072,874 A | 6/2000 | Shin |
| 6,073,124 A | 6/2000 | Krishnan |
| 6,078,909 A | 6/2000 | Knutson |
| 6,085,976 A | 7/2000 | Sehr |
| 6,101,606 A | 8/2000 | Diersch et al. |
| 6,105,069 A | 8/2000 | Franklin |
| 6,112,181 A | 8/2000 | Shear |
| 6,119,229 A | 9/2000 | Martinez et al. |
| 6,122,741 A | 9/2000 | Patterson |
| 6,128,740 A | 10/2000 | Curry |
| 6,131,162 A | 10/2000 | Yoshiura |
| 6,134,659 A | 10/2000 | Sprong |
| 6,141,754 A | 10/2000 | Choy |
| 6,147,773 A | 11/2000 | Taylor |
| 6,148,417 A | 11/2000 | Da Silva |
| 6,151,676 A | 11/2000 | Cuccia |
| 6,157,721 A | 12/2000 | Shear |
| 6,158,011 A | 12/2000 | Chen |
| 6,158,657 A | 12/2000 | Hall, III et al. |
| 6,170,060 B1 | 1/2001 | Mott |
| 6,175,825 B1 | 1/2001 | Fruechtel |
| 6,178,244 B1 | 1/2001 | Takeda |
| 6,185,678 B1 | 2/2001 | Arbaugh et al. |
| 6,188,995 B1 | 2/2001 | Garst et al. |
| 6,189,146 B1 | 2/2001 | Misra et al. |
| 6,192,392 B1 | 2/2001 | Ginter |
| 6,199,068 B1 | 3/2001 | Carpenter |
| 6,209,099 B1 | 3/2001 | Saunders |
| 6,212,634 B1 | 4/2001 | Geer |
| 6,219,652 B1 | 4/2001 | Carter et al. |
| 6,219,788 B1 | 4/2001 | Flavin |
| 6,223,291 B1 | 4/2001 | Puhl |
| 6,226,618 B1 | 5/2001 | Downs |
| 6,226,747 B1 | 5/2001 | Larsson et al. |
| 6,230,185 B1 | 5/2001 | Salas et al. |
| 6,230,272 B1 | 5/2001 | Lockhart |
| 6,233,600 B1 | 5/2001 | Salas et al. |
| 6,233,685 B1 | 5/2001 | Smith |
| 6,243,439 B1 | 6/2001 | Arai et al. |
| 6,243,470 B1 | 6/2001 | Coppersmith |
| 6,243,692 B1 | 6/2001 | Floyd |
| 6,253,224 B1 | 6/2001 | Brice, Jr. et al. |
| 6,260,141 B1 | 7/2001 | Park |
| 6,263,313 B1 | 7/2001 | Milsted |
| 6,263,431 B1 | 7/2001 | Lovelace et al. |
| 6,266,420 B1 | 7/2001 | Langford |
| 6,266,480 B1 | 7/2001 | Ezaki |
| 6,272,469 B1 | 8/2001 | Koritzinsky et al. |
| 6,279,111 B1 | 8/2001 | Jensenworth et al. |
| 6,279,156 B1 | 8/2001 | Amberg et al. |
| 6,286,051 B1 | 9/2001 | Becker et al. |
| 6,289,319 B1 | 9/2001 | Lockwood et al. |
| 6,289,452 B1 | 9/2001 | Arnold |
| 6,295,577 B1 | 9/2001 | Anderson et al. |
| 6,298,446 B1 | 10/2001 | Schreiber |
| 6,303,924 B1 | 10/2001 | Adan et al. |
| 6,304,915 B1 | 10/2001 | Nguyen |
| 6,314,408 B1 | 11/2001 | Salas et al. |
| 6,314,409 B2 | 11/2001 | Schneck et al. |
| 6,321,335 B1 | 11/2001 | Chu |
| 6,324,544 B1 | 11/2001 | Alam |
| 6,327,652 B1 * | 12/2001 | England et al. .................. 713/2 |
| 6,330,670 B1 | 12/2001 | England et al. |
| 6,334,189 B1 | 12/2001 | Granger |
| 6,335,972 B1 | 1/2002 | Chandersekaran |
| 6,343,280 B2 | 1/2002 | Clark |
| 6,345,256 B1 | 2/2002 | Milsted |
| 6,345,294 B1 | 2/2002 | O'Toole et al. |
| 6,363,488 B1 | 3/2002 | Ginter |
| 6,367,017 B1 | 4/2002 | Gray |
| 6,373,047 B1 | 4/2002 | Adan et al. |
| 6,374,355 B1 | 4/2002 | Patel |
| 6,374,357 B1 | 4/2002 | Mohammed |
| 6,385,596 B1 | 5/2002 | Wiser |
| 6,385,727 B1 | 5/2002 | Cassagnol et al. |
| 6,389,535 B1 | 5/2002 | Thomlinson |
| 6,389,537 B1 | 5/2002 | Davis |
| 6,389,538 B1 | 5/2002 | Gruse |
| 6,389,541 B1 | 5/2002 | Patterson |
| 6,393,427 B1 | 5/2002 | Vu |
| 6,393,434 B1 | 5/2002 | Huang |
| 6,397,259 B1 | 5/2002 | Lincke |
| 6,398,245 B1 | 6/2002 | Gruse |
| 6,405,923 B1 | 6/2002 | Seysen |
| 6,407,680 B1 | 6/2002 | Lai |
| 6,408,170 B1 | 6/2002 | Schmidt et al. |
| 6,409,089 B1 | 6/2002 | Eskicioglu |
| 6,411,941 B1 | 6/2002 | Mullor et al. |
| 6,418,421 B1 | 7/2002 | Hurtado |
| 6,424,714 B1 | 7/2002 | Wasilewski et al. |
| 6,425,081 B1 | 7/2002 | Iwamura |
| 6,438,690 B1 | 8/2002 | Patel |
| 6,441,813 B1 | 8/2002 | Ishibashi |
| 6,442,529 B1 | 8/2002 | Krishan et al. |
| 6,442,690 B1 | 8/2002 | Howard |
| 6,446,207 B1 | 9/2002 | Vanstone |
| 6,449,598 B1 | 9/2002 | Green |
| 6,449,719 B1 | 9/2002 | Baker |
| 6,460,140 B1 | 10/2002 | Schoch et al. |
| 6,463,445 B1 | 10/2002 | Suzuki |
| 6,463,534 B1 | 10/2002 | Geiger et al. |
| 6,490,680 B1 | 12/2002 | Scheidt |
| 6,493,758 B1 | 12/2002 | McLain |
| 6,496,858 B1 | 12/2002 | Frailong et al. |
| 6,502,079 B1 | 12/2002 | Ball |
| 6,507,909 B1 | 1/2003 | Zurko |
| 6,515,676 B1 | 2/2003 | Kasai |
| 6,532,451 B1 | 3/2003 | Schell |
| 6,539,364 B2 | 3/2003 | Moribatake |
| 6,542,546 B1 | 4/2003 | Vetro |
| 6,549,626 B1 | 4/2003 | Al-Salqan |
| 6,550,011 B1 | 4/2003 | Sims |
| 6,557,105 B1 | 4/2003 | Tardo |
| 6,567,793 B1 | 5/2003 | Hicks et al. |
| 6,571,216 B1 | 5/2003 | Garg et al. |
| 6,574,609 B1 | 6/2003 | Downs |
| 6,574,612 B1 | 6/2003 | Baratti |
| 6,581,102 B1 | 6/2003 | Amini |
| 6,581,331 B1 | 6/2003 | Kral |
| 6,585,158 B2 | 7/2003 | Norskog |
| 6,587,684 B1 | 7/2003 | Hsu et al. |
| 6,587,837 B1 | 7/2003 | Spagna |
| 6,609,201 B1 | 8/2003 | Folmsbee |
| 6,611,358 B1 | 8/2003 | Narayanaswamy |
| 6,615,350 B1 | 9/2003 | Schell |
| 6,625,729 B1 | 9/2003 | Angelo |
| 6,631,478 B1 | 10/2003 | Wang et al. |
| 6,646,244 B2 | 11/2003 | Aas et al. |
| 6,664,948 B2 | 12/2003 | Crane et al. |
| 6,665,303 B1 | 12/2003 | Saito |
| 6,671,737 B1 | 12/2003 | Snowdon |
| 6,671,803 B1 | 12/2003 | Pasieka |
| 6,678,828 B1 | 1/2004 | Pham et al. |
| 6,684,198 B1 | 1/2004 | Shimizu |
| 6,690,556 B2 | 2/2004 | Smola et al. |
| 6,694,000 B2 | 2/2004 | Ung et al. |
| 6,701,433 B1 | 3/2004 | Schell |
| 6,704,873 B1 | 3/2004 | Underwood |
| 6,708,176 B2 | 3/2004 | Strunk et al. |
| 6,711,263 B1 | 3/2004 | Nordenstam et al. |
| 6,714,921 B2 | 3/2004 | Stefik |
| 6,716,652 B1 | 4/2004 | Ortlieb |
| 6,738,810 B1 | 5/2004 | Kramer et al. |

(56) References Cited

U.S. PATENT DOCUMENTS

| | | | |
|---|---|---|---|
| 6,757,517 B2 | 6/2004 | Chang |
| 6,763,458 B1 | 7/2004 | Watanabe |
| 6,765,470 B2 | 7/2004 | Shinzaki |
| 6,772,340 B1 | 8/2004 | Peinado |
| 6,775,655 B1 | 8/2004 | Peinado |
| 6,781,956 B1 | 8/2004 | Cheung |
| 6,791,157 B1 | 9/2004 | Casto et al. |
| 6,792,531 B2 | 9/2004 | Heiden |
| 6,799,270 B1 | 9/2004 | Bull |
| 6,816,596 B1 | 11/2004 | Peinado |
| 6,816,809 B2 | 11/2004 | Circenis |
| 6,816,900 B1 | 11/2004 | Vogel et al. |
| 6,826,606 B2 | 11/2004 | Freeman |
| 6,826,690 B1 | 11/2004 | Hind |
| 6,829,708 B1 | 12/2004 | Peinado |
| 6,834,352 B2 | 12/2004 | Shin |
| 6,839,841 B1 | 1/2005 | Medvinsky et al. |
| 6,844,871 B1 | 1/2005 | Hinckley et al. |
| 6,847,942 B1 | 1/2005 | Land et al. |
| 6,850,252 B1 * | 2/2005 | Hoffberg ..................... 715/716 |
| 6,851,051 B1 | 2/2005 | Bolle et al. |
| 6,853,380 B2 | 2/2005 | Alcorn |
| 6,859,790 B1 | 2/2005 | Nonaka |
| 6,868,433 B1 | 3/2005 | Philyaw |
| 6,871,283 B1 | 3/2005 | Zurko et al. |
| 6,895,504 B1 | 5/2005 | Zhang |
| 6,898,286 B2 | 5/2005 | Murray |
| 6,920,567 B1 | 7/2005 | Doherty et al. |
| 6,922,724 B1 | 7/2005 | Freeman |
| 6,931,545 B1 | 8/2005 | Ta |
| 6,934,840 B2 | 8/2005 | Rich |
| 6,934,942 B1 | 8/2005 | Chilimbi |
| 6,954,728 B1 | 10/2005 | Kusumoto et al. |
| 6,957,186 B1 | 10/2005 | Guheen et al. |
| 6,959,288 B1 | 10/2005 | Medina |
| 6,959,290 B2 | 10/2005 | Stefik |
| 6,959,291 B1 | 10/2005 | Armstrong |
| 6,959,348 B1 | 10/2005 | Chan |
| 6,961,858 B2 | 11/2005 | Fransdonk |
| 6,973,444 B1 | 12/2005 | Blinn |
| 6,976,162 B1 | 12/2005 | Ellison et al. |
| 6,976,163 B1 | 12/2005 | Hind |
| 6,981,045 B1 | 12/2005 | Brooks |
| 6,983,050 B1 | 1/2006 | Yacobi et al. |
| 6,983,371 B1 | 1/2006 | Hurtado |
| 6,986,042 B2 | 1/2006 | Griffin |
| 6,990,174 B2 | 1/2006 | Eskelinen |
| 6,993,648 B2 | 1/2006 | Goodman et al. |
| 7,000,100 B2 | 2/2006 | Lacombe et al. |
| 7,000,829 B1 | 2/2006 | Harris et al. |
| 7,010,808 B1 | 3/2006 | Leung |
| 7,013,384 B2 | 3/2006 | Challener et al. |
| 7,016,498 B2 | 3/2006 | Peinado |
| 7,017,188 B1 | 3/2006 | Schmeidler |
| 7,020,704 B1 | 3/2006 | Lipscomb |
| 7,024,393 B1 | 4/2006 | Peinado |
| 7,028,149 B2 | 4/2006 | Grawrock |
| 7,028,180 B1 | 4/2006 | Aull |
| 7,039,643 B2 | 5/2006 | Sena |
| 7,039,801 B2 | 5/2006 | Narin |
| 7,043,633 B1 | 5/2006 | Fink |
| 7,051,005 B1 | 5/2006 | Peinado |
| 7,052,530 B2 | 5/2006 | Edlund et al. |
| 7,054,335 B2 | 5/2006 | Wee |
| 7,054,468 B2 | 5/2006 | Yang |
| 7,054,964 B2 | 5/2006 | Chan |
| 7,055,169 B2 | 5/2006 | Delpuch |
| 7,058,819 B2 | 6/2006 | Okaue |
| 7,069,442 B2 | 6/2006 | Sutton, II |
| 7,069,595 B2 | 6/2006 | Cognigni et al. |
| 7,073,056 B2 | 7/2006 | Kocher |
| 7,073,063 B2 | 7/2006 | Peinado |
| 7,076,652 B2 | 7/2006 | Ginter et al. |
| 7,080,039 B1 | 7/2006 | Marsh |
| 7,080,043 B2 | 7/2006 | Chase |
| 7,089,309 B2 | 8/2006 | Ramaley |
| 7,089,594 B1 | 8/2006 | Lai |
| 7,095,852 B2 | 8/2006 | Wack |
| 7,096,469 B1 | 8/2006 | Kubala et al. |
| 7,097,357 B2 | 8/2006 | Johnson et al. |
| 7,103,574 B1 | 9/2006 | Peinado |
| 7,111,058 B1 | 9/2006 | Nguyen |
| 7,113,912 B2 | 9/2006 | Stefik et al. |
| 7,114,168 B1 * | 9/2006 | Wyatt et al. ..................... 725/31 |
| 7,116,969 B2 | 10/2006 | Park |
| 7,117,183 B2 | 10/2006 | Blair et al. |
| 7,120,250 B2 | 10/2006 | Candelore |
| 7,120,873 B2 | 10/2006 | Li |
| 7,121,460 B1 | 10/2006 | Parsons et al. |
| 7,123,608 B1 | 10/2006 | Scott |
| 7,124,938 B1 | 10/2006 | Marsh |
| 7,127,579 B2 | 10/2006 | Zimmer |
| 7,130,951 B1 | 10/2006 | Christie et al. |
| 7,131,004 B1 | 10/2006 | Lyle |
| 7,133,846 B1 | 11/2006 | Ginter |
| 7,133,925 B2 | 11/2006 | Mukherjee |
| 7,136,838 B1 | 11/2006 | Peinado |
| 7,143,066 B2 | 11/2006 | Shear |
| 7,143,297 B2 | 11/2006 | Buchheit et al. |
| 7,143,354 B2 | 11/2006 | Li |
| 7,146,504 B2 | 12/2006 | Parks |
| 7,155,475 B2 | 12/2006 | Agnoli |
| 7,162,645 B2 | 1/2007 | Iguchi et al. |
| 7,171,539 B2 | 1/2007 | Mansell et al. |
| 7,174,457 B1 | 2/2007 | England et al. |
| 7,194,092 B1 | 3/2007 | England |
| 7,200,680 B2 | 4/2007 | Evans |
| 7,200,760 B2 | 4/2007 | Riebe |
| 7,203,310 B2 | 4/2007 | England |
| 7,203,620 B2 | 4/2007 | Li |
| 7,203,966 B2 | 4/2007 | Abburi |
| 7,207,039 B2 | 4/2007 | Komarla et al. |
| 7,213,005 B2 | 5/2007 | Mourad |
| 7,213,266 B1 * | 5/2007 | Maher et al. ..................... 726/26 |
| 7,216,363 B2 | 5/2007 | Serkowski |
| 7,216,368 B2 | 5/2007 | Ishiguro |
| 7,222,062 B2 | 5/2007 | Goud |
| 7,224,805 B2 | 5/2007 | Hurst |
| 7,233,666 B2 | 6/2007 | Lee |
| 7,233,948 B1 * | 6/2007 | Shamoon et al. ................. 707/9 |
| 7,234,144 B2 | 6/2007 | Wilt et al. |
| 7,236,455 B1 | 6/2007 | Proudler et al. |
| 7,254,836 B2 | 8/2007 | Alkove |
| 7,260,721 B2 | 8/2007 | Tanaka |
| 7,266,569 B2 | 9/2007 | Cutter et al. |
| 7,266,714 B2 | 9/2007 | Davies |
| 7,278,165 B2 | 10/2007 | Molaro |
| 7,290,699 B2 | 11/2007 | Reddy |
| 7,296,154 B2 | 11/2007 | Evans |
| 7,296,296 B2 | 11/2007 | Dunbar |
| 7,299,292 B2 | 11/2007 | Morten |
| 7,299,358 B2 | 11/2007 | Chateau et al. |
| 7,299,504 B1 | 11/2007 | Tiller |
| 7,310,732 B2 | 12/2007 | Matsuyama |
| 7,315,941 B2 | 1/2008 | Ramzan |
| 7,336,791 B2 | 2/2008 | Ishiguro |
| 7,340,055 B2 | 3/2008 | Hori |
| 7,343,496 B1 | 3/2008 | Hsiang |
| 7,350,228 B2 | 3/2008 | Peled |
| 7,353,209 B1 | 4/2008 | Peinado |
| 7,353,402 B2 | 4/2008 | Bourne et al. |
| 7,356,709 B2 | 4/2008 | Gunyakti et al. |
| 7,359,807 B2 | 4/2008 | Frank et al. |
| 7,360,253 B2 | 4/2008 | Frank et al. |
| 7,376,976 B2 | 5/2008 | Fierstein |
| 7,382,879 B1 | 6/2008 | Miller |
| 7,382,883 B2 | 6/2008 | Cross |
| 7,383,205 B1 | 6/2008 | Peinado |
| 7,392,429 B2 | 6/2008 | Westerinen et al. |
| 7,395,245 B2 | 7/2008 | Okamoto et al. |
| 7,395,452 B2 | 7/2008 | Nicholson et al. |
| 7,406,446 B2 | 7/2008 | Frank et al. |
| 7,406,603 B1 | 7/2008 | MacKay |
| 7,421,024 B2 | 9/2008 | Castillo |

(56) References Cited

U.S. PATENT DOCUMENTS

| | | |
|---|---|---|
| 7,421,413 B2 | 9/2008 | Frank et al. |
| 7,426,752 B2 * | 9/2008 | Agrawal et al. ................ 726/26 |
| 7,433,546 B2 | 10/2008 | Marriott |
| 7,441,121 B2 | 10/2008 | Cutter |
| 7,441,246 B2 | 10/2008 | Auerbach et al. |
| 7,451,202 B2 | 11/2008 | Nakahara |
| 7,461,249 B1 | 12/2008 | Pearson et al. |
| 7,464,103 B2 | 12/2008 | Siu |
| 7,474,106 B2 | 1/2009 | Kanno |
| 7,475,106 B2 | 1/2009 | Agnoli |
| 7,490,356 B2 | 2/2009 | Lieblich et al. |
| 7,493,487 B2 | 2/2009 | Phillips et al. |
| 7,494,277 B2 | 2/2009 | Setala |
| 7,499,545 B1 | 3/2009 | Bagshaw |
| 7,500,267 B2 | 3/2009 | McKune |
| 7,502,945 B2 | 3/2009 | Bourne |
| 7,519,816 B2 | 4/2009 | Phillips et al. |
| 7,526,649 B2 | 4/2009 | Wiseman |
| 7,539,863 B2 | 5/2009 | Phillips |
| 7,540,024 B2 | 5/2009 | Phillips et al. |
| 7,549,060 B2 | 6/2009 | Bourne et al. |
| 7,552,331 B2 | 6/2009 | Evans |
| 7,558,463 B2 | 7/2009 | Jain |
| 7,562,220 B2 | 7/2009 | Frank et al. |
| 7,565,325 B2 | 7/2009 | Lenard |
| 7,568,096 B2 | 7/2009 | Evans et al. |
| 7,574,706 B2 | 8/2009 | Meulemans |
| 7,574,747 B2 | 8/2009 | Oliveira |
| 7,584,502 B2 | 9/2009 | Alkove |
| 7,590,841 B2 | 9/2009 | Sherwani |
| 7,596,784 B2 | 9/2009 | Abrams |
| 7,609,653 B2 | 10/2009 | Amin |
| 7,610,631 B2 | 10/2009 | Frank et al. |
| 7,617,401 B2 | 11/2009 | Marsh |
| 7,644,239 B2 | 1/2010 | Westerinen et al. |
| 7,653,943 B2 | 1/2010 | Evans |
| 7,665,143 B2 | 2/2010 | Havens |
| 7,669,056 B2 | 2/2010 | Frank |
| 7,680,744 B2 | 3/2010 | Blinn |
| 7,694,153 B2 | 4/2010 | Ahdout |
| 7,703,141 B2 | 4/2010 | Alkove |
| 7,739,505 B2 | 6/2010 | Reneris |
| 7,752,674 B2 | 7/2010 | Evans |
| 7,770,205 B2 | 8/2010 | Frank |
| 7,809,646 B2 | 10/2010 | Rose |
| 7,810,163 B2 | 10/2010 | Evans |
| 7,814,532 B2 | 10/2010 | Cromer et al. |
| 7,822,863 B2 | 10/2010 | Balfanz |
| 7,860,250 B2 | 12/2010 | Russ |
| 7,877,607 B2 | 1/2011 | Circenis |
| 7,881,315 B2 | 2/2011 | Haveson |
| 7,891,007 B2 | 2/2011 | Waxman et al. |
| 7,900,140 B2 * | 3/2011 | Mohammed et al. ......... 715/249 |
| 7,903,117 B2 | 3/2011 | Howell |
| 7,958,029 B1 | 6/2011 | Bobich et al. |
| 7,979,721 B2 | 7/2011 | Westerinen |
| 8,060,923 B2 | 11/2011 | Cutter |
| 8,074,287 B2 | 12/2011 | Barde |
| 8,095,985 B2 | 1/2012 | Dunbar |
| 8,176,564 B2 | 5/2012 | Frank |
| 8,248,423 B2 | 8/2012 | Howell |
| 8,347,078 B2 | 1/2013 | Jain |
| 2001/0010076 A1 | 7/2001 | Wray |
| 2001/0021252 A1 | 9/2001 | Carter |
| 2001/0033619 A1 | 10/2001 | Hanamura |
| 2001/0034711 A1 | 10/2001 | Tashenberg |
| 2001/0044782 A1 | 11/2001 | Hughes |
| 2001/0049667 A1 | 12/2001 | Moribatake |
| 2001/0051996 A1 | 12/2001 | Cooper |
| 2001/0052077 A1 | 12/2001 | Fung |
| 2001/0053223 A1 | 12/2001 | Ishibashi |
| 2001/0056413 A1 | 12/2001 | Suzuki et al. |
| 2001/0056539 A1 | 12/2001 | Pavlin et al. |
| 2002/0002597 A1 | 1/2002 | Morrell, Jr. |
| 2002/0002674 A1 | 1/2002 | Grimes |
| 2002/0007310 A1 | 1/2002 | Long |
| 2002/0010863 A1 | 1/2002 | Mankefors |
| 2002/0012432 A1 | 1/2002 | England |
| 2002/0013772 A1 | 1/2002 | Peinado |
| 2002/0019814 A1 | 2/2002 | Ganesan |
| 2002/0023207 A1 | 2/2002 | Olik |
| 2002/0023212 A1 | 2/2002 | Proudler |
| 2002/0026574 A1 | 2/2002 | Watanabe |
| 2002/0035723 A1 | 3/2002 | Inoue |
| 2002/0036991 A1 | 3/2002 | Inoue |
| 2002/0044654 A1 | 4/2002 | Maeda |
| 2002/0046098 A1 | 4/2002 | Maggio |
| 2002/0049679 A1 | 4/2002 | Russell |
| 2002/0055906 A1 | 5/2002 | Katz et al. |
| 2002/0057795 A1 | 5/2002 | Spurgat |
| 2002/0059518 A1 | 5/2002 | Smeets |
| 2002/0063933 A1 | 5/2002 | Maeda |
| 2002/0065781 A1 | 5/2002 | Hillegass |
| 2002/0073068 A1 | 6/2002 | Guha |
| 2002/0091569 A1 | 7/2002 | Kitaura et al. |
| 2002/0095603 A1 * | 7/2002 | Godwin et al. ................ 713/201 |
| 2002/0097872 A1 * | 7/2002 | Maliszewski ................. 380/217 |
| 2002/0103880 A1 | 8/2002 | Konetski |
| 2002/0104096 A1 | 8/2002 | Cramer |
| 2002/0107701 A1 | 8/2002 | Batty et al. |
| 2002/0111916 A1 | 8/2002 | Coronna et al. |
| 2002/0112171 A1 | 8/2002 | Ginter et al. |
| 2002/0116707 A1 | 8/2002 | Morris |
| 2002/0118835 A1 | 8/2002 | Uemura |
| 2002/0123964 A1 | 9/2002 | Kramer et al. |
| 2002/0124212 A1 | 9/2002 | Nitschke et al. |
| 2002/0129359 A1 | 9/2002 | Lichner |
| 2002/0138549 A1 | 9/2002 | Urien |
| 2002/0141451 A1 | 10/2002 | Gates et al. |
| 2002/0144131 A1 | 10/2002 | Spacey |
| 2002/0147601 A1 | 10/2002 | Fagan |
| 2002/0147782 A1 | 10/2002 | Dimitrova et al. |
| 2002/0147912 A1 | 10/2002 | Shmueli et al. |
| 2002/0164018 A1 | 11/2002 | Wee |
| 2002/0169974 A1 | 11/2002 | McKune |
| 2002/0178071 A1 | 11/2002 | Walker et al. |
| 2002/0184482 A1 | 12/2002 | Lacombe et al. |
| 2002/0184508 A1 | 12/2002 | Bialick et al. |
| 2002/0186843 A1 | 12/2002 | Weinstein |
| 2002/0193101 A1 | 12/2002 | McAlinden |
| 2002/0194132 A1 | 12/2002 | Pearson et al. |
| 2002/0198845 A1 | 12/2002 | Lao |
| 2002/0198846 A1 | 12/2002 | Lao |
| 2003/0004880 A1 | 1/2003 | Banerjee |
| 2003/0005135 A1 | 1/2003 | Inoue et al. |
| 2003/0005335 A1 | 1/2003 | Watanabe |
| 2003/0014323 A1 | 1/2003 | Scheer |
| 2003/0014496 A1 | 1/2003 | Spencer |
| 2003/0021416 A1 | 1/2003 | Brown |
| 2003/0023564 A1 | 1/2003 | Padhye |
| 2003/0027549 A1 | 2/2003 | Kiel et al. |
| 2003/0028454 A1 | 2/2003 | Ooho et al. |
| 2003/0028488 A1 | 2/2003 | Mohammed |
| 2003/0028643 A1 | 2/2003 | Jabri |
| 2003/0035409 A1 | 2/2003 | Wang et al. |
| 2003/0037246 A1 | 2/2003 | Goodman et al. |
| 2003/0040960 A1 | 2/2003 | Eckmann |
| 2003/0041008 A1 | 2/2003 | Grey |
| 2003/0046026 A1 | 3/2003 | Levy et al. |
| 2003/0046238 A1 | 3/2003 | Nonaka |
| 2003/0048473 A1 | 3/2003 | Rosen |
| 2003/0055898 A1 | 3/2003 | Yeager |
| 2003/0056107 A1 | 3/2003 | Cammack et al. |
| 2003/0065918 A1 | 4/2003 | Willey |
| 2003/0069854 A1 | 4/2003 | Hsu |
| 2003/0069981 A1 | 4/2003 | Trovato |
| 2003/0078853 A1 | 4/2003 | Peinado |
| 2003/0084104 A1 | 5/2003 | Salem et al. |
| 2003/0084278 A1 | 5/2003 | Cromer et al. |
| 2003/0084285 A1 | 5/2003 | Cromer et al. |
| 2003/0084306 A1 | 5/2003 | Abburi |
| 2003/0084337 A1 | 5/2003 | Simionescu et al. |
| 2003/0084352 A1 | 5/2003 | Schwartz et al. |
| 2003/0088500 A1 | 5/2003 | Shinohara et al. |

(56) References Cited

U.S. PATENT DOCUMENTS

| | | |
|---|---|---|
| 2003/0093694 A1 | 5/2003 | Medvinsky et al. |
| 2003/0097596 A1 | 5/2003 | Muratov et al. |
| 2003/0097655 A1 | 5/2003 | Novak |
| 2003/0110388 A1 | 6/2003 | Pavlin et al. |
| 2003/0115147 A1 | 6/2003 | Feldman |
| 2003/0115458 A1 | 6/2003 | Song |
| 2003/0120935 A1 | 6/2003 | Teal |
| 2003/0126086 A1 | 7/2003 | Safadi |
| 2003/0126519 A1 | 7/2003 | Odorcic |
| 2003/0126608 A1 | 7/2003 | Safadi |
| 2003/0131252 A1 | 7/2003 | Barton et al. |
| 2003/0133576 A1 | 7/2003 | Grumiaux |
| 2003/0135380 A1 | 7/2003 | Lehr et al. |
| 2003/0149670 A1 | 8/2003 | Cronce |
| 2003/0149671 A1 | 8/2003 | Yamamoto et al. |
| 2003/0156572 A1 | 8/2003 | Hui et al. |
| 2003/0156719 A1 | 8/2003 | Cronce |
| 2003/0159037 A1 | 8/2003 | Taki |
| 2003/0163383 A1 | 8/2003 | Engelhart |
| 2003/0163712 A1 | 8/2003 | LaMothe et al. |
| 2003/0165241 A1 | 9/2003 | Fransdonk |
| 2003/0172376 A1 | 9/2003 | Coffin, III et al. |
| 2003/0185395 A1 | 10/2003 | Lee |
| 2003/0188165 A1 | 10/2003 | Sutton et al. |
| 2003/0188179 A1 | 10/2003 | Challener |
| 2003/0194094 A1 | 10/2003 | Lampson |
| 2003/0196102 A1 | 10/2003 | McCarroll |
| 2003/0196106 A1 | 10/2003 | Erfani et al. |
| 2003/0198350 A1 | 10/2003 | Foster |
| 2003/0200336 A1* | 10/2003 | Pal et al. ............. 709/246 |
| 2003/0208338 A1 | 11/2003 | Challener et al. |
| 2003/0208573 A1 | 11/2003 | Harrison et al. |
| 2003/0219127 A1 | 11/2003 | Russ |
| 2003/0221100 A1 | 11/2003 | Russ |
| 2003/0229702 A1 | 12/2003 | Hensbergen et al. |
| 2003/0233553 A1 | 12/2003 | Parks |
| 2003/0236978 A1 | 12/2003 | Evans |
| 2004/0001088 A1 | 1/2004 | Stancil et al. |
| 2004/0001594 A1 | 1/2004 | Krishnaswamy |
| 2004/0003190 A1 | 1/2004 | Childs et al. |
| 2004/0003268 A1 | 1/2004 | Bourne |
| 2004/0003269 A1 | 1/2004 | Waxman |
| 2004/0003270 A1 | 1/2004 | Bourne |
| 2004/0003288 A1 | 1/2004 | Wiseman et al. |
| 2004/0010440 A1 | 1/2004 | Lenard et al. |
| 2004/0010684 A1 | 1/2004 | Douglas |
| 2004/0010717 A1 | 1/2004 | Simec |
| 2004/0019456 A1 | 1/2004 | Cirenis |
| 2004/0023636 A1 | 2/2004 | Gurel et al. |
| 2004/0030912 A1 | 2/2004 | Merkle, Jr. et al. |
| 2004/0034816 A1 | 2/2004 | Richard |
| 2004/0039916 A1 | 2/2004 | Aldis et al. |
| 2004/0039924 A1 | 2/2004 | Baldwin et al. |
| 2004/0039960 A1 | 2/2004 | Kassayan |
| 2004/0044629 A1 | 3/2004 | Rhodes et al. |
| 2004/0054629 A1 | 3/2004 | de Jong |
| 2004/0054678 A1 | 3/2004 | Okamoto |
| 2004/0054907 A1 | 3/2004 | Chateau et al. |
| 2004/0054908 A1 | 3/2004 | Circenis et al. |
| 2004/0054909 A1 | 3/2004 | Serkowski et al. |
| 2004/0059937 A1 | 3/2004 | Nakano |
| 2004/0064351 A1 | 4/2004 | Mikurak |
| 2004/0064707 A1 | 4/2004 | McCann et al. |
| 2004/0067746 A1 | 4/2004 | Johnson |
| 2004/0073670 A1 | 4/2004 | Chack et al. |
| 2004/0083289 A1 | 4/2004 | Karger |
| 2004/0088548 A1 | 5/2004 | Smetters et al. |
| 2004/0093371 A1 | 5/2004 | Burrows et al. |
| 2004/0093508 A1 | 5/2004 | Foerstner et al. |
| 2004/0098583 A1 | 5/2004 | Weber |
| 2004/0107125 A1 | 6/2004 | Guheen |
| 2004/0107356 A1* | 6/2004 | Shamoon et al. ............ 713/193 |
| 2004/0107359 A1 | 6/2004 | Kawano et al. |
| 2004/0107368 A1 | 6/2004 | Colvin |
| 2004/0111609 A1 | 6/2004 | Kaji |
| 2004/0111615 A1 | 6/2004 | Nyang |
| 2004/0123127 A1 | 6/2004 | Teicher et al. |
| 2004/0125755 A1 | 7/2004 | Roberts |
| 2004/0128251 A1 | 7/2004 | Adam et al. |
| 2004/0133794 A1 | 7/2004 | Kocher et al. |
| 2004/0139027 A1 | 7/2004 | Molaro |
| 2004/0139312 A1 | 7/2004 | Medvinsky |
| 2004/0146015 A1 | 7/2004 | Cross |
| 2004/0158742 A1 | 8/2004 | Srinivasan |
| 2004/0184605 A1 | 9/2004 | Soliman |
| 2004/0187001 A1 | 9/2004 | Bousis |
| 2004/0193648 A1 | 9/2004 | Lai |
| 2004/0193919 A1 | 9/2004 | Dabbish et al. |
| 2004/0196975 A1 | 10/2004 | Zhu |
| 2004/0199769 A1 | 10/2004 | Proudler |
| 2004/0205028 A1* | 10/2004 | Verosub et al. ............ 705/59 |
| 2004/0205357 A1 | 10/2004 | Kuo et al. |
| 2004/0205510 A1 | 10/2004 | Rising |
| 2004/0210695 A1 | 10/2004 | Weber |
| 2004/0220858 A1 | 11/2004 | Maggio |
| 2004/0225894 A1 | 11/2004 | Colvin |
| 2004/0249768 A1 | 12/2004 | Kontio |
| 2004/0255000 A1 | 12/2004 | Simionescu et al. |
| 2004/0268120 A1 | 12/2004 | Mirtal et al. |
| 2005/0010766 A1 | 1/2005 | Holden |
| 2005/0015343 A1 | 1/2005 | Nagai et al. |
| 2005/0021859 A1 | 1/2005 | Willian |
| 2005/0021944 A1 | 1/2005 | Craft et al. |
| 2005/0021992 A1 | 1/2005 | Aida |
| 2005/0028000 A1 | 2/2005 | Bulusu et al. |
| 2005/0033747 A1 | 2/2005 | Wittkotter |
| 2005/0039013 A1 | 2/2005 | Bajikar et al. |
| 2005/0044197 A1 | 2/2005 | Lai |
| 2005/0044391 A1 | 2/2005 | Noguchi |
| 2005/0044397 A1* | 2/2005 | Bjorkengren ............ 713/200 |
| 2005/0050355 A1 | 3/2005 | Graunke |
| 2005/0060388 A1 | 3/2005 | Tatsumi et al. |
| 2005/0060542 A1 | 3/2005 | Risan |
| 2005/0065880 A1 | 3/2005 | Amato et al. |
| 2005/0066353 A1 | 3/2005 | Fransdonk |
| 2005/0071280 A1 | 3/2005 | Irwin |
| 2005/0080701 A1 | 4/2005 | Tunney et al. |
| 2005/0086174 A1 | 4/2005 | Eng |
| 2005/0089164 A1 | 4/2005 | Lang |
| 2005/0091104 A1 | 4/2005 | Abraham |
| 2005/0091488 A1 | 4/2005 | Dunbar |
| 2005/0091526 A1 | 4/2005 | Alkove |
| 2005/0097204 A1 | 5/2005 | Horowitz et al. |
| 2005/0102181 A1 | 5/2005 | Scroggie et al. |
| 2005/0108547 A1 | 5/2005 | Sakai |
| 2005/0108564 A1 | 5/2005 | Freeman et al. |
| 2005/0120125 A1 | 6/2005 | Morten |
| 2005/0120251 A1 | 6/2005 | Fukumori |
| 2005/0123276 A1 | 6/2005 | Sugaya |
| 2005/0125673 A1 | 6/2005 | Cheng et al. |
| 2005/0129296 A1 | 6/2005 | Setala |
| 2005/0131832 A1 | 6/2005 | Fransdonk |
| 2005/0132150 A1 | 6/2005 | Jewell et al. |
| 2005/0138370 A1 | 6/2005 | Goud et al. |
| 2005/0138389 A1 | 6/2005 | Catherman et al. |
| 2005/0138406 A1 | 6/2005 | Cox |
| 2005/0138423 A1 | 6/2005 | Ranganathan |
| 2005/0141717 A1 | 6/2005 | Cromer et al. |
| 2005/0144099 A1 | 6/2005 | Deb et al. |
| 2005/0149722 A1 | 7/2005 | Wiseman |
| 2005/0149729 A1 | 7/2005 | Zimmer |
| 2005/0166051 A1 | 7/2005 | Buer |
| 2005/0172121 A1* | 8/2005 | Risan et al. ............ 713/164 |
| 2005/0182921 A1 | 8/2005 | Duncan |
| 2005/0182940 A1 | 8/2005 | Sutton |
| 2005/0188843 A1 | 9/2005 | Edlund et al. |
| 2005/0198510 A1 | 9/2005 | Robert |
| 2005/0203801 A1 | 9/2005 | Morgenstern et al. |
| 2005/0204205 A1* | 9/2005 | Ring et al. ............ 714/47 |
| 2005/0210252 A1 | 9/2005 | Freeman |
| 2005/0213761 A1 | 9/2005 | Walmsley et al. |
| 2005/0216577 A1 | 9/2005 | Durham et al. |
| 2005/0221766 A1 | 10/2005 | Brizek et al. |
| 2005/0226170 A1 | 10/2005 | Relan |

(56) References Cited

U.S. PATENT DOCUMENTS

| | | |
|---|---|---|
| 2005/0235141 A1 | 10/2005 | Ibrahim et al. |
| 2005/0239434 A1 | 10/2005 | Marlowe |
| 2005/0240533 A1 | 10/2005 | Cutter et al. |
| 2005/0240985 A1 | 10/2005 | Alkove |
| 2005/0246521 A1 | 11/2005 | Bade et al. |
| 2005/0246525 A1 | 11/2005 | Bade et al. |
| 2005/0246552 A1 | 11/2005 | Bade et al. |
| 2005/0251803 A1 | 11/2005 | Turner |
| 2005/0257073 A1 | 11/2005 | Bade et al. |
| 2005/0262022 A1 | 11/2005 | Oliveira |
| 2005/0265549 A1 | 12/2005 | Sugiyama |
| 2005/0268115 A1 | 12/2005 | Barde |
| 2005/0268174 A1 | 12/2005 | Kumagai |
| 2005/0275866 A1 | 12/2005 | Corlett |
| 2005/0278519 A1 | 12/2005 | Luebke et al. |
| 2005/0279827 A1 | 12/2005 | Mascavage et al. |
| 2005/0283601 A1 | 12/2005 | Tahan |
| 2005/0286476 A1 | 12/2005 | Crosswy et al. |
| 2005/0289177 A1 | 12/2005 | Hohmann, II |
| 2005/0289343 A1 | 12/2005 | Tahan |
| 2006/0008256 A1 | 1/2006 | Khedouri |
| 2006/0010074 A1 | 1/2006 | Zeitsiff |
| 2006/0010076 A1 | 1/2006 | Cutter |
| 2006/0010326 A1 | 1/2006 | Bade et al. |
| 2006/0015717 A1 | 1/2006 | Liu et al. |
| 2006/0015718 A1 | 1/2006 | Liu et al. |
| 2006/0015732 A1 | 1/2006 | Liu |
| 2006/0020784 A1 | 1/2006 | Jonker et al. |
| 2006/0020821 A1 | 1/2006 | Waltermann |
| 2006/0020860 A1 | 1/2006 | Tardif |
| 2006/0026418 A1 | 2/2006 | Bade |
| 2006/0026419 A1 | 2/2006 | Arndt et al. |
| 2006/0026422 A1 | 2/2006 | Bade et al. |
| 2006/0041943 A1 | 2/2006 | Singer |
| 2006/0045267 A1 | 3/2006 | Moore |
| 2006/0053112 A1 | 3/2006 | Chitkara |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry et al. |
| 2006/0075014 A1 | 4/2006 | Tharappel et al. |
| 2006/0075223 A1 | 4/2006 | Bade et al. |
| 2006/0085634 A1 | 4/2006 | Jain et al. |
| 2006/0085637 A1 | 4/2006 | Pinkas |
| 2006/0085844 A1 | 4/2006 | Buer et al. |
| 2006/0089917 A1 | 4/2006 | Strom et al. |
| 2006/0090084 A1 | 4/2006 | Buer |
| 2006/0100010 A1 | 5/2006 | Gatto et al. |
| 2006/0106845 A1 | 5/2006 | Frank et al. |
| 2006/0106920 A1 | 5/2006 | Steeb et al. |
| 2006/0107306 A1 | 5/2006 | Thirumalai et al. |
| 2006/0107328 A1 | 5/2006 | Frank et al. |
| 2006/0107335 A1 | 5/2006 | Frank et al. |
| 2006/0112267 A1 | 5/2006 | Zimmer et al. |
| 2006/0117177 A1 | 6/2006 | Buer |
| 2006/0129496 A1* | 6/2006 | Chow et al. ............ 705/59 |
| 2006/0129824 A1 | 6/2006 | Hoff et al. |
| 2006/0130130 A1 | 6/2006 | Kablotsky |
| 2006/0143431 A1 | 6/2006 | Rothman |
| 2006/0149966 A1 | 7/2006 | Buskey |
| 2006/0156008 A1 | 7/2006 | Frank |
| 2006/0156416 A1* | 7/2006 | Huotari et al. ............ 726/27 |
| 2006/0165005 A1 | 7/2006 | Frank et al. |
| 2006/0165227 A1 | 7/2006 | Steeb |
| 2006/0167814 A1 | 7/2006 | Peinado |
| 2006/0167815 A1 | 7/2006 | Peinado |
| 2006/0168664 A1 | 7/2006 | Frank et al. |
| 2006/0173787 A1* | 8/2006 | Weber et al. ............ 705/59 |
| 2006/0174110 A1 | 8/2006 | Strom |
| 2006/0206618 A1 | 9/2006 | Zimmer et al. |
| 2006/0212363 A1 | 9/2006 | Peinado |
| 2006/0212945 A1 | 9/2006 | Donlin |
| 2006/0213997 A1 | 9/2006 | Frank et al. |
| 2006/0229990 A1 | 10/2006 | Shimoji |
| 2006/0230042 A1 | 10/2006 | Butler |
| 2006/0235798 A1 | 10/2006 | Alkove |
| 2006/0235799 A1 | 10/2006 | Evans |
| 2006/0235801 A1 | 10/2006 | Strom |
| 2006/0242406 A1 | 10/2006 | Barde |
| 2006/0248596 A1 | 11/2006 | Jain |
| 2006/0265758 A1 | 11/2006 | Khandelwal |
| 2006/0282319 A1 | 12/2006 | Maggio |
| 2006/0282899 A1 | 12/2006 | Raciborski |
| 2007/0033102 A1 | 2/2007 | Frank et al. |
| 2007/0058718 A1 | 3/2007 | Shen |
| 2007/0058807 A1 | 3/2007 | Marsh |
| 2007/0153910 A1 | 7/2007 | Levett |
| 2007/0280422 A1 | 12/2007 | Setala |
| 2007/0297426 A1 | 12/2007 | Haveson |
| 2008/0021839 A1 | 1/2008 | Peinado |
| 2008/0040800 A1 | 2/2008 | Park |
| 2008/0256647 A1* | 10/2008 | Kim et al. ............ 726/32 |
| 2009/0070454 A1 | 3/2009 | McKinnon, III et al. |
| 2009/0132815 A1 | 5/2009 | Ginter |
| 2009/0158036 A1 | 6/2009 | Barde |
| 2010/0146576 A1* | 6/2010 | Costanzo et al. ............ 725/117 |
| 2010/0177891 A1* | 7/2010 | Keidar et al. ............ 380/200 |
| 2010/0250927 A1 | 9/2010 | Bradley |
| 2011/0128290 A1 | 6/2011 | Howell |
| 2012/0137127 A1 | 5/2012 | Jain |

FOREIGN PATENT DOCUMENTS

| | | |
|---|---|---|
| CN | 1393783 | 1/2003 |
| CN | 1396568 | 2/2003 |
| CN | 1531673 | 9/2004 |
| CN | 1617152 | 5/2005 |
| EP | 0 387 599 | 9/1990 |
| EP | 0 409 397 | 1/1991 |
| EP | 0 613 073 | 8/1994 |
| EP | 0635790 | 1/1995 |
| EP | 0 665 486 A2 | 8/1995 |
| EP | 0 679 978 | 11/1995 |
| EP | 0 709 760 A2 | 5/1996 |
| EP | 0 715 245 A1 | 6/1996 |
| EP | 0 715 246 | 6/1996 |
| EP | 0 715 247 | 6/1996 |
| EP | 0 725 512 A2 | 8/1996 |
| EP | 0 735 719 | 10/1996 |
| EP | 0 752 663 A1 | 1/1997 |
| EP | 0 778 512 | 6/1997 |
| EP | 0 798 892 A2 | 10/1997 |
| EP | 0843449 | 5/1998 |
| EP | 0 849 658 A2 | 6/1998 |
| EP | 0 874 300 A2 | 10/1998 |
| EP | 0 887 723 A2 | 12/1998 |
| EP | 0 994 475 | 4/2000 |
| EP | 1 045 388 | 10/2000 |
| EP | 1061465 | 12/2000 |
| EP | 1 083 480 | 3/2001 |
| EP | 1085396 | 3/2001 |
| EP | 1 128 342 | 8/2001 |
| EP | 1120967 | 8/2001 |
| EP | 1 130 492 | 9/2001 |
| EP | 1 191 422 | 3/2002 |
| EP | 1 253 740 A1 | 10/2002 |
| EP | 1 292 065 A1 | 3/2003 |
| EP | 1 338 992 | 8/2003 |
| EP | 1 363 424 A2 | 11/2003 |
| EP | 1 376 302 | 1/2004 |
| EP | 1 378 811 A2 | 1/2004 |
| EP | 1387237 | 2/2004 |
| EP | 1429224 | 6/2004 |
| EP | 1223722 | 8/2004 |
| EP | 1460514 | 9/2004 |
| EP | 1233337 | 8/2005 |
| EP | 1 582 962 | 10/2005 |
| EP | 2 492 774 A3 | 9/2012 |
| GB | 2359969 | 9/2001 |
| GB | 2378780 | 2/2003 |
| JP | 02-291043 A | 11/1990 |
| JP | H0535461 | 2/1993 |
| JP | H0635718 | 2/1994 |
| JP | H07036559 | 2/1995 |

(56) References Cited

FOREIGN PATENT DOCUMENTS

| | | |
|---|---|---|
| JP | H07141153 | 6/1995 |
| JP | H086729 | 1/1996 |
| JP | 09-006880 A | 1/1997 |
| JP | 09-069044 A | 3/1997 |
| JP | 2001526550 | 5/1997 |
| JP | H09185504 | 7/1997 |
| JP | H9251494 | 9/1997 |
| JP | 2000-242491 | 9/2000 |
| JP | 2000293369 | 10/2000 |
| JP | 2001051742 | 2/2001 |
| JP | 2001-075870 | 3/2001 |
| JP | 2003510684 | 3/2001 |
| JP | 2001101033 | 4/2001 |
| JP | 2003510713 | 4/2001 |
| JP | 2001-175605 A | 6/2001 |
| JP | 2001-175606 | 6/2001 |
| JP | 2001184472 | 7/2001 |
| JP | 2001-290650 | 10/2001 |
| JP | 2001312325 | 11/2001 |
| JP | 2001331229 | 11/2001 |
| JP | 2001338233 | 12/2001 |
| JP | 2002108478 | 4/2002 |
| JP | 2002108870 | 4/2002 |
| JP | 2002374327 | 12/2002 |
| JP | 2003-058660 | 2/2003 |
| JP | 2003507785 | 2/2003 |
| JP | 2003-101526 | 4/2003 |
| JP | 2003-115017 | 4/2003 |
| JP | 2003-157334 | 5/2003 |
| JP | 2003140761 | 5/2003 |
| JP | 2003140762 | 5/2003 |
| JP | 2003157335 | 5/2003 |
| JP | 2003208314 | 7/2003 |
| JP | 2003248522 | 9/2003 |
| JP | 2003-284024 | 10/2003 |
| JP | 2003296487 | 10/2003 |
| JP | 2003-330560 | 11/2003 |
| JP | 2002182562 | 1/2004 |
| JP | 2004-062886 | 2/2004 |
| JP | 2004062561 | 2/2004 |
| JP | 2004118327 | 4/2004 |
| JP | 2004164491 | 6/2004 |
| JP | 2004295846 | 10/2004 |
| JP | 2004304755 | 10/2004 |
| JP | 2007525774 | 9/2007 |
| JP | H08-054952 | 2/2011 |
| KR | 20010000805 | 1/2001 |
| KR | 20020037453 | 5/2002 |
| KR | 10-2004-0000323 | 1/2004 |
| KR | 1020040098627 | 11/2004 |
| KR | 20050008439 | 1/2005 |
| KR | 20050021782 | 3/2005 |
| KR | 10-0879907 | 1/2009 |
| RU | 2 207 618 | 6/2003 |
| TW | 200508970 A | 3/2005 |
| WO | WO 93/01550 | 1/1993 |
| WO | WO 96/13013 | 5/1996 |
| WO | WO 96/24092 | 8/1996 |
| WO | WO 96/27155 | 9/1996 |
| WO | WO-9721162 | 6/1997 |
| WO | WO 97/25798 | 7/1997 |
| WO | WO 97/43763 | 11/1997 |
| WO | WO 98/02793 | 1/1998 |
| WO | WO 98/09209 | 3/1998 |
| WO | WO 98/10381 | 3/1998 |
| WO | WO-9811478 | 3/1998 |
| WO | WO 98/21679 | 5/1998 |
| WO | WO 98/21683 | 5/1998 |
| WO | WO 98/24037 | 6/1998 |
| WO | WO 98/33106 | 7/1998 |
| WO | WO 98/37481 | 8/1998 |
| WO | 98/42098 A1 | 9/1998 |
| WO | WO 98/58306 | 12/1998 |
| WO | 99/15970 A1 | 4/1999 |
| WO | 99/53689 A1 | 10/1999 |
| WO | 00/08909 A2 | 2/2000 |
| WO | WO-0054126 | 9/2000 |
| WO | 00/57684 A2 | 10/2000 |
| WO | 00/58810 A2 | 10/2000 |
| WO | 00/58859 A2 | 10/2000 |
| WO | 00/59150 A2 | 10/2000 |
| WO | 00/59152 A2 | 10/2000 |
| WO | WO 00/58811 | 10/2000 |
| WO | WO 00/59150 | 10/2000 |
| WO | WO-0135293 | 5/2001 |
| WO | 01/44908 A1 | 6/2001 |
| WO | WO-0145012 | 6/2001 |
| WO | WO 01/52020 | 7/2001 |
| WO | WO 01/52021 | 7/2001 |
| WO | WO 0163512 | 8/2001 |
| WO | WO-0163512 | 8/2001 |
| WO | WO-0177795 | 10/2001 |
| WO | WO-0193461 | 12/2001 |
| WO | WO-0208969 | 1/2002 |
| WO | WO 02/19598 | 3/2002 |
| WO | WO 02/28006 | 4/2002 |
| WO | 02/37371 A1 | 5/2002 |
| WO | WO 02/057865 | 7/2002 |
| WO | WO-02056155 | 7/2002 |
| WO | WO 02/088991 | 11/2002 |
| WO | WO-02103495 | 12/2002 |
| WO | WO-03009115 | 1/2003 |
| WO | WO 03/034313 | 4/2003 |
| WO | WO-03030434 | 4/2003 |
| WO | WO 03/058508 | 7/2003 |
| WO | WO03073688 | 9/2003 |
| WO | WO-03107585 | 12/2003 |
| WO | WO03107588 | 12/2003 |
| WO | WO-2004092886 | 10/2004 |
| WO | WO 2004/097606 | 11/2004 |
| WO | WO 2004/102459 | 11/2004 |
| WO | WO 2005/010763 | 2/2005 |
| WO | 2006/065012 A1 | 6/2006 |
| WO | 2006/115533 A2 | 11/2006 |
| WO | WO-2007032974 | 3/2007 |

OTHER PUBLICATIONS

Lotspiech, "Broadcast Encryption's Bright Future," IEEE Computer, Aug. 2002.
Memon, "Protecting Digital Media Content," Communications of the ACM, Jul. 1998.
Ripley, "Content Protection in the Digital Home," Intel Technology Journal, Nov. 2002.
Steinebach, "Digital Watermarking Basics—Applications—Limits," NFD Information—Wissenschaft und Praxis, Jul. 2002.
DMOD WorkSpace OEM Unique Features; http://www.dmod.com/oem_features, downloaded Jan. 12, 2005.
Search Report Ref 306928.03 WO, for Application No. PCT/US05/30490, Date of mailing of the international search report Sep. 18, 2007, Authorized Officer Jacqueline A. Whitfield.
Search Report Ref 313743.02, for Application No. PCT/US 06/10327, mailed Oct. 22, 2007.
Search Report Ref 313744.02, for Application No. PCT/US06/10664, mailed Oct. 23, 2007.
Preliminary Report on Patentability Ref 313744.02, for Application No. PCT/US2006/010664, mailed Nov. 22, 2007.
Arbaugh, "A Secure and Reliable Bootstrap Architecture," IEEE Symposium on Security and Privacy, May 1997, pp. 65-71.
Search Report Ref 313746.02 WO, for Application No. PCT/US05/30489, mailed Aug. 2, 2007.
Oh, Kyung-Seok, "Acceleration technique for volume rendering using 2D texture based ray plane casting on GPU", 2006 Intl. Conf. CIS, Nov. 3-6, 2006.
Slusallek, "Vision—An Architecture for Global Illumination Calculation", IEEE Transactions on Visualization and Computer Graphics, vol. 1, No. 1; Mar. 1995; pp. 77-96.
Zhao, Hua, "A New Watermarking Scheme for CAD Engineering Drawings", 9th Intl. Conf. Computer-Aided Industrial Design and Conceptual Design; CAID/CD 2008;Nov. 22-25, 2008.

(56) References Cited

OTHER PUBLICATIONS

Kuan-Ting Shen, "A New Digital Watermarking Technique for Video." Proceedings VISUAL 2002, Hsin Chu, Taiwan, Mar. 11-13, 2002.
EP Partial Search Report, Ref. FB19620, for Application No. 06774630.5-1243 / 1902367 PCT/US2006026915, Mar. 29, 2012.
EP Communication for Application No. 04779544.8-2212 / 1678570 PCT/US2004024529 reference EP35527RK900kja, Mar. 9, 2010.
EP Communication for Application No. 04 779 544.8-2212, reference EP35527RK900kja, May 10, 2010.
EP Summons to attend oral proceedings for Application No. 04779544.8-2212 / 1678570, reference EP35527RK900kja, May 10, 2012.
Bovet, "An Overview of Unix Kernels" 2001, 0 Reilly, USA, XP-002569419.
JP Notice of Rejection for Application No. 2006-536592, Nov. 19, 2010.
CN First Office Action for Application No. 200480003262.8, Nov. 30, 2007.
CN Second Office Action for Application No. 200480003262.8, Jun. 13, 2008.
CA Office Action for Application No. 2,511,397, Mar. 22, 2012.
PCT international Search Report and Written Opinion for Application No. PCT/US04124529, reference MSFT-4429, May 12, 2006.
JP Notice of Rejection for Application No. 2006-536586, Nov. 12, 2010.
EP Communication for Application No. 04 779 478.9-2212, reference EP35512RK900peu, May 21, 2010.
EP Communication for Application No. 04 779 4789-2212, reference EP35512RK900peu, Apr. 3, 2012.
AU Examiner's first report on patent application No. 2004287141, Dec. 8, 2008.
PCT International Search Report and Written Opinion for Application No. PCT/US04/24433, reference MSFT-4430, Nov. 29, 2005.
CN First Office Action for Application No. 200480003286.3, Nov. 27, 2009.
CA Office Action for Application No. 2,511,531 , Mar. 22, 2012.
CN Notice on First Office Action for Application No. 200510056328.6, Jul. 24, 2009.
EP Communication for Application No. 05 101 873.7-1247, reference EP34127TE900kja, Dec. 19, 2006.
JP Notice of Rejection for Application No. 2005-067120, Dec. 28, 2010.
Bellovin; "Defending Against Sequence Number Attacks" AT&T Research, IETF Standard, Internet Engineering Task Force, May 1996.
Chung Lae Kim, "Development of WDM Integrated Optical Protection Socket Module," Journal of Korean institute of Telematics and Electronics, Mar. 1996.
Gardan, N+P (With and Without Priority) and Virtual Channel Protection: Comparison of Availability and Application to an Optical Transport Network, 7th International Conference on Reliability and Maintainability, Jun. 18, 1990.
Microsoft, "Digital Rights Management for Audio Drivers" Updated Dec. 4, 2001; XP002342580.
Microsoft, "Hardware Platform for the Next-Generation Secure Computing Base", Windows Platform Design Notes, 2003, XP-002342581.
Microsoft, Security Model for the Next-Generation Secure Computing Base, Windows Platform Design Notes, 2003, XP002342582.
Choudhury, "Copyright Protection for Electronic Publishing Over Computer Networks", Submitted to IEEE Network Magazine Jun. 1994.
CN Third Office Action for Application No. 03145223.X, Mar. 7, 2008.
EP Communication for Application No. 03 011 235.3-1247, Reference EP27518-034/gi, Apr. 22, 2010.
EP Communication for Application No. 03 011 235.3-1247, Reference EP27518-034/gi, Nov. 4, 2011.
JP Notice of Rejection for Application No. 2003-180214, Sep. 18, 2009.
RU Official Action for Application No. 2003118755/09(020028), reference 2412-127847RU/3152, May 29, 2007.
CN First Office Action for Application No. 200480012375.4, Sep. 4, 2009.
CN Second Office Action for Application No. 200480012375.4, Feb. 12, 2010.
AU Examiner's first report on patent application No. 2004288600, Jan. 18, 2010.
RU Office Action for Application No. 2005120671, reference 2412-132263RU/4102, Oct. 15, 2008.
RU Office Action for Application No. 2005120671, reference 2412-132263RU/4102, Oct. 21, 2008.
PCT International Search Report and Written Opinion for Application No. PCT/US04/23606, Apr. 27, 2005.
EP Communication for Application No. 04 778 899.7-2212, Reference EP35523RK900peu, Nov. 23, 2012.
PCT International Search Report and Written Opinion for Application No. PCT/US06/27251, reference 311888.02, Jul. 3, 2007.
CN First Office Action for Application No. 200680026251.0, Oct. 8, 2010.
Hong, "On the construction of a powerful distributed authentication server without additional key management", Computer Communications, Nov. 1, 2000.
Managing Digital Rights in Online Publishing, "How two publishing houses maintain control of copyright" Information Management & Technology, Jul. 2001.
Jakobsson, "Proprietary Certificates", 2002.
Kumik, "Digital Rights Management", Computers and Law, E-commerce: Technology, Oct.-Nov. 2000.
Torrubia, "Cryptography Regulations for E-commerce and Digital Rights Management", Computers & Security, 2001.
Zwollo, "Digital document delivery and digital rights management", Information Services & Use, 2001.
Griswold, "A Method for Protecting Copyright on Networks", IMA Intellectual Property Project Proceedings, 1994.
Kahn, "Deposit, Registration and Recordation in an Electronic Copyright Management System", Coalition for Networked information, Last updated Jul. 3, 2002.
Evans, "DRM: Is the Road to Adoption Fraught with Potholes?", 2001.
Fowler, "Technoiogy's Changing Role in Intellectual Property Rights", IT Pro, Mar.-Apr. 2002.
Gable, "The Digital Rights Conundrum", Transform Magazine— Information Lifecycle, Nov. 2001.
Gunter, Models and Languages for Digital Rights Proceedings of the 34th Hawaii International Conference on System Sciences, Jan. 3-6, 2001.
Peinado, "Digital Rights Management in a Multimedia Environment", SMPTE Journal, Apr. 2002.
Royan, "Content Creation and Rights Management: experiences of SCRAN (the Scottish Cultural Resources Access Network)", 2000.
Valimaki, "Digital rights management on Open and Semi-open Networks", Proceedings of the Second IEEE Workshop on Internet Applications, Jul. 23-24, 2001.
Yu, "Digital multimedia at home and content rights management", Proceedings 2002 IEEE 4th International Workshop on Networked Appliances, Jan. 15-16, 2002.
Hwang, "Protection of Digital Contents on Distributed Multimedia Environment", Proceedings of the IASTED International Conference, Internet and Multimedia Systems and Applications, Nov. 19-23, 2000.
Castro, "Secure routing for structured peer-to-peer overlay networks", Proceedings of the Fifth Symposium on Operating Systems Design and Implementation, Dec. 9-11, 2002.
Friend, "Making the Gigabit IPsec VPN Architecture Secure", Computer, Jun. 2004.
Hulicki, "Security Aspects in Content Delivery Networks", The 6th World Multiconference on Systemics, Cybernetics and Informatics. Jul. 14-18, 2002.
McGarvey, "Arbortext: Enabler of Multichannel Publishing", EContent, Apr. 2002.

(56) References Cited

OTHER PUBLICATIONS

Moffett, "Contributing and enabling technologies for knowledge management", International Journal Information Technology and Management, Jul. 2003.

Utagawa, "Making of card applications using IC Card OS MULTOS", Mar. 1, 2003.

Nakajima, Do You Really Know It? Basics of Windows2000/XP, Jan. 2004.

N+1 Network Guide, "First Special Feature, Security Oriented Web Application Development, Part 3, Method for Realizing Secure Session Management", Jan. 2004.

CN First Office Action for Appliction No. 200680013409.0, Jun. 26, 2009.

CN First Office Action for Appliction No. 200580049553.5, Aug. 8, 2008.

CN First Office Action for Appliction No. 200680013372.1, Dec. 18, 2009.

Bajikar, Trusted Platform Module (TPM) based Security on Notebook PCs—White Paper, Intel Corporation, Jun. 20, 2002.

Content Protection System Architecture, A Comprehensive Framework for Content Protection, Feb. 17, 2000.

Pruneda, Windows Media Technologies: Using Windows Media Rights Manager to Protect and Distribute Digital Media, Nov. 23, 2004.

"DirectShow System Overview," Last updated Apr. 13, 2005.

"Features of the VMR," accessed on Nov. 9, 2005.

"Introduction to DirectShow Application Programming," accessed on Nov. 9, 2005.

"Overview of Data Row in DirectShow," accessed on Nov. 9, 2005.

"Plug-in Distributors," accessed on Nov. 9, 2005.

"Using the Video Mixing Renderer," accessed on Nov. 9, 2005.

"VMR Filter Components," accessed on Nov. 9, 2005.

KR Office Action for Application No. 10-2008-7000503, Sep. 27, 2012.

PCT International Search Report and Written Opinion for Application No. PCT/US06/09904, reference 308715.02, Jul. 11, 2008.

CN First Office Action for Application No. 200680012462.9, Mar. 10, 2010.

JP Notice of Rejection for Application No. 2008-507668, Sep. 2, 2011.

EP Communication for Application No. 06738895.9-2202 / 1872479 PCT/US2006009904, reference F619160, Sep. 16, 2011.

KR Office Action for Application No. 10-2007-7020527, reference 308715.08, Apr. 9, 2012.

JP Final Rejection for Application No. 2008-507668, May 18, 2012.

Kassier, "Generic QOS Aware Media Stream Transcoding and Adaptation," Department of Distributed Systems, University of Ulm, Germany. Apr. 2003.

DRM Watch Staff, "Microsoft Extends Windows Media DRM to Non-Windows Devices," May 7, 2004.

Lee, "Gamma: A Content-Adaptation Server for Wireless Multimedia Applications," Bell Laboratories, Holmdel NJ, USA. Published in 2003.

Ihde, "Intermediary-based Transcoding Framework," Jan. 2001.

LightSurf Technologies, "LightSurf Intelligent Media Optimization and Transcoding," printed Apr. 18, 2005.

Digital 5, "Media Server," printed Apr. 18, 2005.

"Transcode", Nov. 29, 2002. XP-002293109.

"SoX—Sound eXchange". Last Updated Mar. 26, 2003. XP-002293110.

Britton, "Transcoding: Extending e-buisness to new environments", Accepted for publication Sep. 22, 2000. XP-002293153.

Britton, "Transcoding: Extending E-Business to New Environments"; IBM Systems Journal, vol. 40, No. 1, 2001.

Chandra, "Application-Level Differentiated Multimedia Web Services Using Quality Aware Transcoding"; IEEE Journal on Selected Areas of Communications, vol. 18, No. 12. Dec. 2000.

Chen, "An Adaptive Web Content Delivery System". May 21, 2000. XP-002293303.

Chen, "iMobile EE—An Enterprise Mobile Service Platform"; AT&T Labs—Research, Wireless Networks, 2003.

Chi, "Pervasive Web Content Delivery with Efficient Data Reuse", Aug. 1, 2002. XP-002293120.

Ripps, "The Multitasking Mindset Meets the Operating System", Electrical Design News, Newton, MA. Oct. 1, 1990. XP 000162745.

Huang, "A Frame-Based MPEG Characteristics Extraction Tool and Its Application in Video Transcoding"; IEEE Transaction on Consumer Electronics, vol. 48, No. 3. Aug. 2002.

Lee, "Data Synchronization Protocol in Mobile Computing Environment Using SyncML"; 5th IEEE International Conference on High Speed Networks and Multimedia Communications. Chungnarn National University, Taejon, Korea. 2002.

Shaha, "Multimedia Content Adaptation for QoS Management over Heterogeneous Networks". Rutgers University, Piscataway, NJ. May 11, 2001. XP-002293302.

Shen, "Caching Strategies in Transcoding-enabled Proxy Systems for Streaming Media Distribution Networks". Dec. 10, 2003. XP-002293154.

Singh, "PTC: Proxies that Transcode and Cache in Heterogeneous Web Client Environments"; Proceedings of the Third International Conference on Web Information Systems, 2002.

Lei, "Context-based media Adaptation in Pervasive Computing". University of Ottawa. Ottawa, Ontario, Canada. May 31, 2001. XP-002293137.

"International Search Report and Written Opinion mailed Jan. 16, 2007", Application No. PCT/US2006/034622, 6 pages (MS#313832.02).

"International Search Report and Written Opinion mailed Nov. 30, 2006", Application No. PCT/US05/40950, 8 pages (MS#310475.12).

Qiao, Daji et al., "MiSer: An Optimal Low-Energy Transmission Strategy for IEEE 802.11 a/h", obtained from ACM, (Sep. 2003),pp. 161-175.

"International Search Report and Written Opinion mailed Apr. 22, 2008", Application No. PCT/US2007/087960, 7 pages (MS#318113.05).

Eren, H. et al., "Fringe-Effect Capacitive Proximity Sensors for Tamper Proof Enclosures", *Proceedings of 2005 Sensors for Industry Conference*, (Feb. 2005),pp. 22-25.

"International Search Report and Written Opinion mailed Jul. 24, 2008", Application No. PCT/US05/40966 13pages (MS#310739.02).

Schneier, B. "Applied Cryptography, Second Edition: Protocols, Algorithms, and Source Code in C (cloth)", (Jan. 1, 1996),13 pages.

Goering, Richard "Web Venture Offers Metered Access to EDA Packages—Startup Winds Clocks by the Hour Tools (E*Cad Will Launch Web Site That Provides Pay-Per-Use and Pay-Per-Hour Access to Range of Chip Design Software)", *Electronic Engineering Times*, (Nov. 6, 2000),3 pages.

Zemac, Chen et al., "A Malicious Code Immune Model Based on Program Encryption", *IEEE—Wireless Communication, Networking and Mobile.Computing*, WICOM '08, 4th International Conference on Oct. 12-14, 2008,(2008),5 pages.

Mufti, Dr. Muid et al., "Design and Implementation of a Secure Mobile IP Protocol", *Networking and Communication, INCC 204*, International Conference on Jun. 11-13, 2004,(2004),5 pages.

Davida, George I., et al., "Unix Guardians: Active User Intervention in Data Protection", *Aerospace Computer Security Applications Conference, Fourth* Dec. 12-16, (1988),6 pages.

Morales, Tatiana "Understanding Your Credit Score", http://www.cbsnews.com/stories/2003/04/29/earlyshow/contributors/raymartin/main55152.shtml retrieved from the Internet on Apr. 23, 2009,3 pages.

"Achieving Peak Performance: Insights from a Global Survey on Credit Risk and Collections Practices", *GCI Group Pamphlet*, (2002, 2004), 12 pages.

"Equifax Business Solutions—Manage Your Customers", Retrieved from the Internet from http://www.equifax.com/sitePages/biz/smallBiz/?sitePage=manageCustomers on Oct. 14, 2005, 3 pages.

"Prequalification Using Credit Reports", Retrieved from the Internet at http://www.credco.com/creditreports/prequalification.htm on Oct. 14, 2005, 2 pages.

(56) References Cited

OTHER PUBLICATIONS

Gao, Jerry et al., "Online Advertising—Taxonomy and Engineering Perspectives", http://www.engr.sjsu.edu/gaojerry/report/OnlineAdvertising%20.pdf, (2002),33 pages.
Oshiba, Takashi et al., "Personalized Advertisement-Duration Control for Streaming Delivery", *ACM Multimedia*, (2002),8 pages.
Yue, Wei T., et al., "The Reward Based Online Shopping Community", *Routledge*, vol. 10, No. 4, (Oct. 1, 2000),2 pages.
"International Search Report and Written Opinion mailed Nov. 8, 2007", Application No. PCT/US05/40967, 5 pages (MS#310477.18).
"International Search Report and Written Opinion", Application Serial No. PCT/US05/40940, 9 pages (MS#312786.02), May 2, 2008.
"International Search Report and Written Opinion mailed Apr. 25, 2007", Application No. PCT/US05/040965, 5 pages (MS#311052.02).
"International Search Report and Written Opinion mailed Sep. 25, 2006", Application No. PCT/US05/40949, 7 pages (MS#311044.02).
"EP Office Action Mailed Nov. 17, 2006", Application No. 05110697.9, 6 pages (MS#310474.02).
"EP Office Action mailed Apr. 5, 2007", Application No. 05110697.9, 5 pages.
"EP Summons to Attend Oral Proceedings mailed Sep. 27, 2007" Application No. 05110697.9, 7 pages.
"Decision to Refuse a European Application mailed Feb. 15, 2008", Application No. 05110697.9, 45 pages.
"International Search Report and Written Opinion mailed Sep. 8, 2006", Application No. PCT/US05/040942, 20 pages (MS#309572.17).
"European Search Report mailed Dec. 6, 2010" Application No. 05820177.3, 8 pages (MS#309572.41).
Lampson, Butler et al., "Authentication in Distributed Systems: Theory and Practice", *ACM Transactions on Computer Systems*, v10, 265,(1992),18 pages.
"Office Action mailed Jun. 29, 2009", Mexican Application No. MX/a/2007/005657, 2 pages.
"Search Report Dated Jan. 11, 2008", EP Application No. 05820090.8, 7 pages.
"Examination Report mailed Mar. 5, 2008", EP Application No. 05820090.8, 1 page.
"First Office Action mailed Apr. 11, 2008", Chinese Application No. 200580038813.9, 11 pages.
"Office Action mailed Jun. 29, 2009", Mexican Application No. MX/a/2007/005656, 6 pages.
"Office Action mailed Nov. 30, 2009", Mexican Application No. MX/a/2007/005659, 6 pages.
"Notice of Allowance mailed Jul. 2, 2010", Mexican Application No. MX/a/2007/005659, 2 pages.
"Extended European Search Report mailed Dec. 6, 2010" EP Application No. 05820177.3, 8 pages.
"Second Office Action mailed Dec. 18, 2009", Chinese Application No. 200580038812.4, 24 pages.
"Third Office Action mailed Apr. 1, 2010", Chinese Application No. 200580038812.4, 9 pages.
"Notice on Grant of Patent Right for Invention mailed May 5, 2011", Chinese.Application No. 200580038812.4, 4 pages.
"Office Action mailed Jul. 7, 2009", Mexican Application No. MX/a/2007/005660, 8 pages.
"Notice of Allowance mailed Feb. 18, 2010" Mexican Application No. MX/a/2007/005660, 2 pages.
"Extended European Search Report mailed Aug. 13, 2010", EP Application No. 05823253.9, 7 pages.
"Notice on the First Office Action mailed Sep. 27, 2010", Chinese Application No. 200580038745.6, 6 pages.
"Office Action mailed Jul. 8, 2009" Mexican Application No. MX/a/2007/005662, 7 pages.
"Notice of Allowance mailed Feb. 19, 2010", Mexican Application No. MX/a/2007/005662, 2 pages.
"Partial Search Report mailed Jul. 23, 2010", EP Application No. 05821183.0.
"Extended European Search Report mailed Jan. 7, 2011", EP Application No. 05821183.0, 9 pages (MS#309572.57).
"Notice of Allowance mailed Dec. 25, 2009", Chinese Application No. 200580038773.8, 4 pages.
"Office Action mailed Jun. 26, 2009", Mexican Application No. MX/a/2007/005655, 5 pages.
"Office Action mailed Feb. 9, 2010", Mexican Application No. MX/a/2007/005855, 6 pages.
"Office Action mailed Sep. 24, 2010", Mexican Application No. MX/a/2007/005655, 3 pages.
"Extended European Search Report mailed Jan. 21, 2010" EP Application No. 05819896.1 8 pages (MS#309572.65).
"Office Action mailed Mar. 19, 2010", EP Application No. 05819896.1, 1 page.
"Office Action mailed Feb. 10, 2010", Mexican Application No. MX/a/2007/005656, 5 pages.
"Office Action mailed Oct. 18, 2010" Mexican Application No. MX/a/2007/005656, 3 pages.
"Notice on the First Office Action mailed Jul. 30, 2010", Chinese Application No.200680033207.2, 7 pages.
"EP Search Report mailed Jan. 2, 2008", EP Application No. 05109616.2, 7 pages (MS#310416.05).
"Flonix: USB Desktop OS Solutions Provider, http://www.flonix.com", Retrieved from the Internet Jun. 1, 2005, (Copyright 2004),2 pages.
"Migo by PowerHouse Technologies Group, http://www.4migo.com" Retrieved from the Internet Jun. 1, 2005, (Copyright 2003),3 pages.
"WebServUSB, http://www.webservusb.com", Retrieved from the Internet Jun. 1, 2005, (Copyright 2004),16 pages.
"Notice of Rejection mailed Jul. 8, 2011", Japanese Application No. 2007-541363, 10 pages (MS#310477.22).
"Notice of Rejection mailed Aug. 5, 2011" Japanese Patent Application No.2007-552142, 8 pages (MS#310522.06).
"Forward Solutions Unveils Industry's Most Advanced Portable Personal Computing System on USB Flash Memory Device", *Proquest, PR Newswire*, http://proquest.umi.com/pqdweb?index=20&did=408811931&SrchMode=1&sid=6&Fmt=3, Retrieved from the Internet Feb. 15, 2008,(Sep. 22, 2003),3 pages.
"Office Action mailed May 26, 2008", EP Application No. 05109616.2, 5 pages (MS#310416.05).
"Notice on Division of Application mailed Aug. 8, 2008", CN Application No. 200510113398.0, (Aug. 8, 2008),2 pages.
"Notice on First Office Action mailed Dec. 12, 2008", CN Application No. 200510113398.0.
"The Second Office Action mailed Jul. 3, 2009", CN Application No. 200510113398.0, 7 pages.
"Notice on Proceeding with the Registration Formalities mailed Oct. 23, 2009", CN Application No. 200510113398.0, 4 pages.
"Examiner's First Report on Application mailed Jun. 4, 2010", AU Application No. 2005222507, 2 pages.
"Notice of Acceptance mailed Oct. 14, 2010", AU Application No. 2005222507, 3 pages.
"Decision on Grant of a Patent for Invention mailed Apr. 29, 2010", Russian Application No. 2005131911, 31 pages.
"Notice of Allowance mailed Nov. 13, 2009", MS Application No. PA/a/2005/011088, 2 pages.
"TCG Specification Architecture Overview", Revision 1.2, (Apr. 28, 2004),55 pages.
"International Search Report and Written Opinion mailed Jun. 19, 2007", PCT Application No. PCT/US05/46091, 11 pages (MS#310476.02).
"Notice on Grant of Patent Right for Invention mailed Jan. 29, 2010" CN Application No. 200580040764.2, 4 pages.
"International Search Report mailed Jan. 5, 2007", Application No. PCT/US2006/032708, 3 pages (MS#313706.02).
"Cyotec—CyoLicence", printed from www.cyotec.com/products/cyoicence on Sep. 7, 2005, (Copyright 2003-2005).
"Magic Desktop Automation Suite for the Small and Mid-Sized Business", printed from www.remedy.com/soultions/magic_it_suite.htm on Sep. 7, 2005, (Copyright 2005),4 pages.

(56) References Cited

OTHER PUBLICATIONS

"Pace Anti-Piracy Introduction", printed from www.paceap.com/psintro.html on Sep. 7, 2005, (Copyright 2002),4 pages.
"Office Action mailed Jul. 6, 2009", MX Application No. MX/a/2007/005661, 6 pages.
"Office Action mailed Oct. 1, 2010", MX Application No. MX/a/2007/005661, 3 pages.
"Office Action mailed Mar. 8, 2011", MX Application No. MX/a/2007/005661, 8 pages.
"Notice on Second Office Action mailed Jun. 7, 2010", CN Application No. 200680030846.3, 6 pages.
"Decision on Rejection mailed Sep. 13, 2010", CN Application No. 200680030846.3, 5 pages.
Kwok, Sai H., "Digital Rights Management for the Online Music Business", ACM SlGecom Exhchanges, vol. 3, No. 3, (Aug. 2002),pp. 17-24.
"International Search Report and Written Opinion mailed Mar. 21, 2007", Application No. PCT/US05/46223, 10 pages (MS#310521.02).
"The First Office Action mailed Oct. 9, 2009", CN Application No. 200580043102.0, 20 pages.
"International Search Report and Written Opinion mailed Jul. 9, 2008" Application No. PCT/US05/46539, 11 pages (MS#310522.02).
"Notice of the First Office Action mailed Dec. 29, 2010", CN Application No. 200580044294.7, 9 pages.
"Office Action mailed Jul. 1, 2009", MX Application No. 2007/a/2007/007441.
"European Search Report mailed Aug. 31, 2011", EP Application No. 05855148.2, 6 pages (MS#310522.10).
"International Search Report and Written Opinion mailed Sep. 25, 2007", Application No. PCT/US06/12811, 10 pages (MS#311045.02).
"Examiner's First Report mailed Sep. 15, 2009" AU Application No. 2006220489, 2 pages.
"Notice of Acceptance mailed Jan. 25, 2010", AU Application No. 2006220489, 2 pages.
"The First Office Action mailed Aug. 22, 2008", CN Application No. 200680006199.2, 23 pages.
"The Second Office Action mailed Feb. 20, 2009" CN Application No. 200680006199.2, 9 pages.
"The Fourth Office Action mailed Jan. 8, 2010", CN Application No. 200680006199.2, 10 pages.
"The Fifth Office Action mailed Jul. 14, 2010", CN Application No. 200680006199.2, 6 pages.
"Notice on Grant of Patent mailed Oct. 20, 2010", CN Application No. 200680006199.2, 4 pages.
"First Office Action mailed Aug. 21, 2009", CN Application No. 200680030846.3, 8 pages.
"Notice on the First Office Action mailed Dec. 11, 2009", CN Application No. 200510127170.7, 16 pages.
"The Third Office Action mailed Jun. 5, 2009", CN Application No. 200680006199.2, 7 pages.
"Notice of Rejection mailed Sep. 9, 2011", JP Application No. 2007-548385, 9 pages (MS#310476.06).
"Notice of Rejection mailed Nov. 11, 2011", Japanese Application No. 2005-301957, 21 pages (MS#310416.06).
"Extended European Search Report mailed Dec. 21, 2011", EP Application No. 05854752.2, 7 pages (MS#310476.10).
"Final Rejection mailed Jan. 17, 2012" Japan Application No. 2007-552142, 8 pages (MS#310522.06).
"EP Office Action mailed Mar. 8, 2012", EP Application No. 05109616.2, 6 pages (MS#310416.05).
"Notice of Preliminary Rejection mailed May 30, 2012", Korean Patent Application No. 10-2007-7011069. 1 page (MS310477.23).
"Extended European Search Report mailed Jul. 5, 2012" EP Application No. 05851550.3 (MS#310477.26) 6 pages.
"Preliminary Rejection mailed Jul. 4, 2012", Korean Application No. 10-2007-7012294, 2 pages (MS#310476.07).

"Office Action mailed Jun. 8, 2012", JP Application No. 2005-301957, 8 pages (MS#310416.06).
JP Notice of Rejection for Application No. 2009-288223, Jun. 29, 2012.
EP Communication for Application No. 11007532 2-1247 / 2492774, Reference EP27518ITEjan, Aug. 3, 2012.
Abbadi, "Digital Rights Management Using a Mobile Phone"; Aug. 19-22, 2007, ICEC '07 Proceedings of the ninth international conference on Electronic commerce.
PCT international Search Report and Written Opinion for Application No. PCT/US06/26915, reference 313859.03, Oct. 17, 2007.
CN First Office Action for Application No. 200680025136.1, Apr. 24, 2009.
JP Notice of Rejection for Application No. 2008-521535, Jun. 10, 2011.
JP Notice of Rejection for Application No. 2008-521535, Sep. 27, 2011.
KR Preliminary Rejection for Application No. 10-2008-7000503, Reference 313859.07, Sep. 27, 2012.
Aviv, "Aladdin Knowledge Systems Partners with Rights Exchange, Inc. to Develop a Comprehensive Solution for Electronic Software Distribution," Aug. 3, 1998.
Amdur, "Metering Online Copyright," Jan. 16, 1996.
Amdur, "InterTrust Challenges IBM Digital Content Metering; Funding, Name Change, Developer Kit Kick Off Aggressive Market Push", Report On Electronic Commerce, Jul. 23, 1996.
Armati, "Tools and standards for protection, control and presentation of data," Last updated Apr. 3, 1996.
Benjamin, "Electronic Markets and Virtual Value Chains on the Information Superhighway," Sloan Management Review, Winter 1995.
Cassidy, "A Web developer's guide to content encapsulation technoloclly; New tools offer clever ways to distribute your programs, stories & and get paid for it", Apr. 1997.
Clark, "Software Secures Digital Content on Web", Interactive Week, Sep. 25, 1995.
Cox, "Superdistribution", ldees Fortes, Wired, Sep. 1994.
Cox, "What if there is a silver bullet", J. Object Oriented Program, Jun. 1992.
Hauser, "Does Licensing Require New Access Control Techniques?" Aug. 12, 1993.
Hudgins-Bonafield, "Selling Knowledge on the Net; Container Consortium Hopes to Revolutionize Electronic Commerce," Network Computing, Jun. 1, 1995.
"IBM spearheading intellectual property protection technology for information on the Internet," May 1, 1997.
"Technological Solutions Rise to Complement Law's Small Stick Guarding Electronic Works; Vendors fight to establish beachheads in copy-protection field," Information Law Alert, Jun. 16, 1995.
Kaplan, "IBM Cryptolopes, SuperDistribution and Digital Rights Management," Dec. 30, 1996.
Kent, "Protecting Externally Supplied Software in Small Computers," Sep. 1980.
Kohl, "Safeguarding Digital Library Contents and Users; Protecting Documents Rather Than Channels," D-Lib Magazine, Sep. 1997.
Linn, "Copyright and Information Services in the Context of the National Research and Education Network," IMA intellectual Property Project Proceedings, Jan. 1994.
McNab, "Superdistribution works better in practical applications," Mar. 2, 1998.
Moeller, "NetTrust lets cyberspace merchants take account," PC Week, Nov. 20, 1995.
Moeller, "IBM takes charge of E-commerce; Plans client, server apps based on SET," Apr. 29, 1996.
Pemberton, "An ONLINE interview with Jeff Ongler at IBM InfoMarket," Jul. 1996.
"Licensit: kinder, gentler copyright? Copyright management system links content, authorship information," Seybold Report on Desktop Publishing, Jul. 8, 1996.
Sibert, "The DigiBox: A Self-Protecting Container for Information Commerce," First USENIX Workshop on Electronic Commerce, Jul. 11-12, 1995.

(56) References Cited

OTHER PUBLICATIONS

Sibert, "Securing the Content, Not the Wire, for Information Commerce," Jul. 1995.
Smith, "A New Set of Rules for Information Commerce; Rights-protection technologies and personalized-information commerce will affect all knowledge workers" Electronic Commerce, Nov. 6, 1995.
Stefik, "Trusted Systems; Devices that enforce machine-readable rights to use the work of a musician or author may create secure ways to publish over the Internet," Scientific American, Mar. 1997.
Stefik, "Technical Perspective; Shifting the Possible: How Trusted Systems and Digital Property Rights Challenge Us to Rethink Digital Publishing," Berkeley Technology Law Journal, Spring 1997.
Tarter, "The Superdistribution Model," Soft Letter: Trends & Strategies in Software Publishing, Nov. 15, 1996.
Secor, "Rights Management in the Digital Age: Trading in Bits, Not Atoms," Spring 1997.
Weber, "Digital Right Management Technology," A Report to the International Federation of Reproduction Rights Organisations, Oct. 1995.
White, "ABYSS: An Architecture for Software Protection," IEEE Transactions On Software Engineering, Jun. 1990.
White, "ABYSS: A Trusted Architecture for Software Protection," IEEE Symposium on Security and Privacy, Apr. 27-29, 1987.
"Boxing Up Bytes". No publication date available. This reference was cited in U.S. Appl. No. 09/892,371 on Mar. 22, 2002.
Ramanujapuram, "Digital Content & Intellectual Property Rights: A specification language and tools for rights management," Dr. Dobb's Journal, Dec. 1998.
CN Notice on Reexamination for Application No. 200680025136.1, Jun. 17, 2013.
KR Notice of Final Rejection for Application No. 10-2007-7024145, Reference No. 313361.12, Oct. 23, 2012.
KR Notice of Preliminary Rejection for Application No. 2007-7023842, Reference No. 313361.06, Oct. 24, 2012.
"Black Box Crypton defies the hackers", Electronics Weekly, Mar. 6, 1985.
Business Wire, "Aladdin Acquires the Assets of Micro Macro Technologies", Mar. 3, 1999.
Computergram International, "BreakerTech Joins Copyright Management Market", Aug. 5, 1999.
ARM, "Optimising license checkouts from a floating license server", ARM Technical Support Knowledge Articles, Published on or before Dec. 20, 2003.
Blissmer, "Next step is encryption: Data security may be bundled with Next's operating system", Electronic Engineering Times, Feb. 3, 1992.
Stevens, "How Secure is your Computer System?", The Practical Accountant, Jan. 1998.
Olson, "Concurrent Access Licensing", UNIX Review, Sep. 1988.
PR Newswire, "Sony Develops Copyright Protection Solutions for Digital Music Content", Feb. 25, 1999.
"Solution for Piracy", Which Computer?, Nov. 1983.
Gold, "Finland—Data Fellows Secures ICSA Certification", Newsbytes, Jan. 7, 1998.
Thompson, "Digital Licensing", IEEE Internet Computing, Jul.-Aug. 2005.
Ahuja, "The Key to Keys", Dataquest, Aug. 31, 1997.
Malamud, "Network-Based Authentication: The Key to Security", Network Computing, Jun. 1991.
Kopeikin, "Secure Trading on the Net", Telecommunications, Oct. 1996.
Information Week, "The New Network: Planning and Protecting Intranet Electronic Commerce", Dec. 2, 1996.
Chin, "Reaching Out to Physicians", Health Data Management, Sep. 1998.
Finnie, "Suppliers Cashing In on the Internet", Communications Week International, Nov. 14, 1994.
Bank, "Postal Service Announces Plan to put Postmarks on Electronic Mail", San Jose Mercury News, Apr. 9, 1995.
Dawson, "S-A Unveils Security System", Broadband Week, Jan. 15, 1996.
Metropolitan Computer Times, "Bankard Set To Intro Virtual Shopping in Philippines", Newsbytes News Network, Apr. 16, 1997.
Rouvroy, "Reconfigurable Hardware Solutions for the Digital Rights Management of Digital Cinema", Proceedings of the 2004 ACM Workshop on Digital Rights Management, Oct. 25, 2004.
Housley, "Internet X.509 Public Key Infrastructure Certificate and Certificate Renovation List (CRL) Profile", Network Working Group, Apr. 2002.
Housley, "Metering: A Pre-pay Technique", SPIE Proceedings vol. 3022, Storage and Retrieval for Image and Video Databases V, Jan. 15, 1997.
Ogata, "Provably Secure Metering Scheme", Proceedings of the 6th International Conference on the Theory and Application of Cryptology and Information Security, Dec. 3-7, 2000.
Kim, "A Secure and Efficient Metering Scheme for Internet Advertising", Journal of KIISE: Computer Systems and Theory, vol. 29, Issue 3, 2002.
Stallings, "Network and Internetwork Security Principles and Practice", Prentice-Hall, Inc., p. 136, Jan. 1995.
Linn, "Privacy Enhancement for Internet Electronic Mail: Part 1: Message Encryption and Authentication Procedures", Network Working Group, Feb. 1993.
Kaliski, "Privacy Enhancement for Internet Electronic Mail: Part IV: Key Certification and Related Services", Network Working Group, Feb. 1993.
Backman, "Smartcards: The Intelligent Way to Security", Network Computing, May 15, 1998.
"Concatenate", Free On-Line Dictionary of Computing, Dec. 22, 1995.
Google Groups, "How to Prevent copying DB application to other machines", Dec. 22, 1998.
Garfield, "Internet Dynamics First to Ship Integrated Security Solution for Enterprise Intranets and Extranets; Conclave Accelerates Enterprise Deployment of Secure, High-Value Intranets and Extranets", Business Wire, Sep. 15, 1997.
Carozza, "Cylink: Public-Key Security Technology Granted to the Public; Cylink Announces the Renowned Diffie-Hellman Public-Key Technology Has Entered the Public Domain", Business Wire, Sep. 16, 1997.
Linetsky, "Programming Microsoft DirectShow", Wordware Publishing, Inc., Oct. 2001.
Pesce, "Programming Microsoft DirectShow for Digital Video and Television", Microsoft Press, Apr. 16, 2003.
KR Notice of Preliminary Rejection for Application No. 10-2007-7023842, Apr. 18, 2012.
KR Preliminary Rejection for Application No. 10-2007-7024156, Jul. 30, 2012.
KR Notice of Preliminary Rejection for Application No. 10-2007-7024145, Jan. 17, 2012.
TW Search Report for Application No. 094130187, Jul. 27, 2012.
U.S. Appl. No. 60/673,979, filed Apr. 22, 2005, David J. Marsh.
U.S. Appl. No. 11/116,598, filed Apr. 27, 2005, Sumedh N. Barde.
U.S. Appl. No. 11/227,045, filed Sep. 15, 2005, David J. Marsh.
U.S. Appl. No. 11/202,840, filed Aug. 12, 2005, David J. Marsh.
U.S. Appl. No. 11/202,838, field Aug. 12, 2005, Kenneth Reneris.
U.S. Appl. No. 11/191,448, filed Jul. 28, 2005, Sumedh N. Barde.
U.S. Appl. No. 12/390,505, filed Feb. 23, 2009, Sumedh N. Barde.
U.S. Appl. No. 09/525,510, filed Mar. 15, 2000, Marcus Peinado.
U.S. Appl. No. 11/866,041, filed Oct. 2, 2007, Marcus Peinado.
U.S. Appl. No. 10/178,256, filed Jun. 24, 2002, Glenn F. Evans.
U.S. Appl. No. 11/275,991, filed Feb. 8, 2006, Glenn F. Evans.
U.S. Appl. No. 11/275,990, filed Feb. 8, 2006, Glenn F. Evans
U.S. Appl. No. 11/275,993, filed Feb. 8, 2006, Glenn F. Evans.
U.S. Appl. No. 11/938,707, filed Nov. 12, 2007, Glenn F. Evans.
U.S. Appl. No. 60/513,831, filed Oct. 23, 2003, Chadd Knowlton.
U.S. Appl. No. 10/820,666, filed Apr. 8, 2004, Geoffrey Dunbar.
U.S. Appl. No. 10/820,673, filed Apr. 8, 2004, James M. Alkove.
U.S. Appl. No. 11/870,837, filed Oct. 11, 2007, Geoffrey Dunbar.
U.S. Appl. No. 10/838,532, filed May 3, 2004, James M. Alkove.
U.S. Appl. No. 10/798,688, filed Mar. 11, 2004, James M. Alkove.
U.S. Appl. No. 12/715,529, filed Mar. 2, 2010, James M. Alkove.

(56) References Cited

OTHER PUBLICATIONS

U.S. Appl. No. 10/968,462, filed Oct. 18, 2004, Benjamin Brooks Cutter.
U.S. Appl. No. 11/018,095, filed Dec. 20, 2004, Amit Jain.
U.S. Appl. No. 13/367,198, filed Feb. 6, 2012, Amit Jain.
U.S. Appl. No. 11/108,327, filed Apr. 18, 2005, Amit Jain.
U.S. Appl. No. 11/184,555, filed Jul. 19, 2005, Adil A. Sherwani.
U.S. Appl. No. 11/129,872, filed May 16, 2005, Darryl E. Havens.
U.S. Appl. No. 60/698,525, filed Jul. 11, 2005, Scott J. Fierstein.
U.S. Appl. No. 11/276,496, filed Mar. 2, 2006, Scott J. Fierstein.
U.S. Appl. No. 11/179,013, filed Jul. 11, 2005, Gareth Howell.
U.S. Appl. No. 13/016,686, filed Jan. 28, 2011, Gareth Howell.

* cited by examiner

PROTECTED MEDIA PIPELINE

CROSS-REFERENCE TO RELATED APPLICATION

This application claims benefit to U.S. Provisional Patent Application No. 60/673,979, filed on Friday, Apr. 22, 2005.

DESCRIPTION OF THE DRAWINGS

The present description will be better understood from the following detailed description read in light of the accompanying drawings, wherein.

Like reference numerals are used to designate like elements in the accompanying drawings.

DETAILED DESCRIPTION

Figure 1:
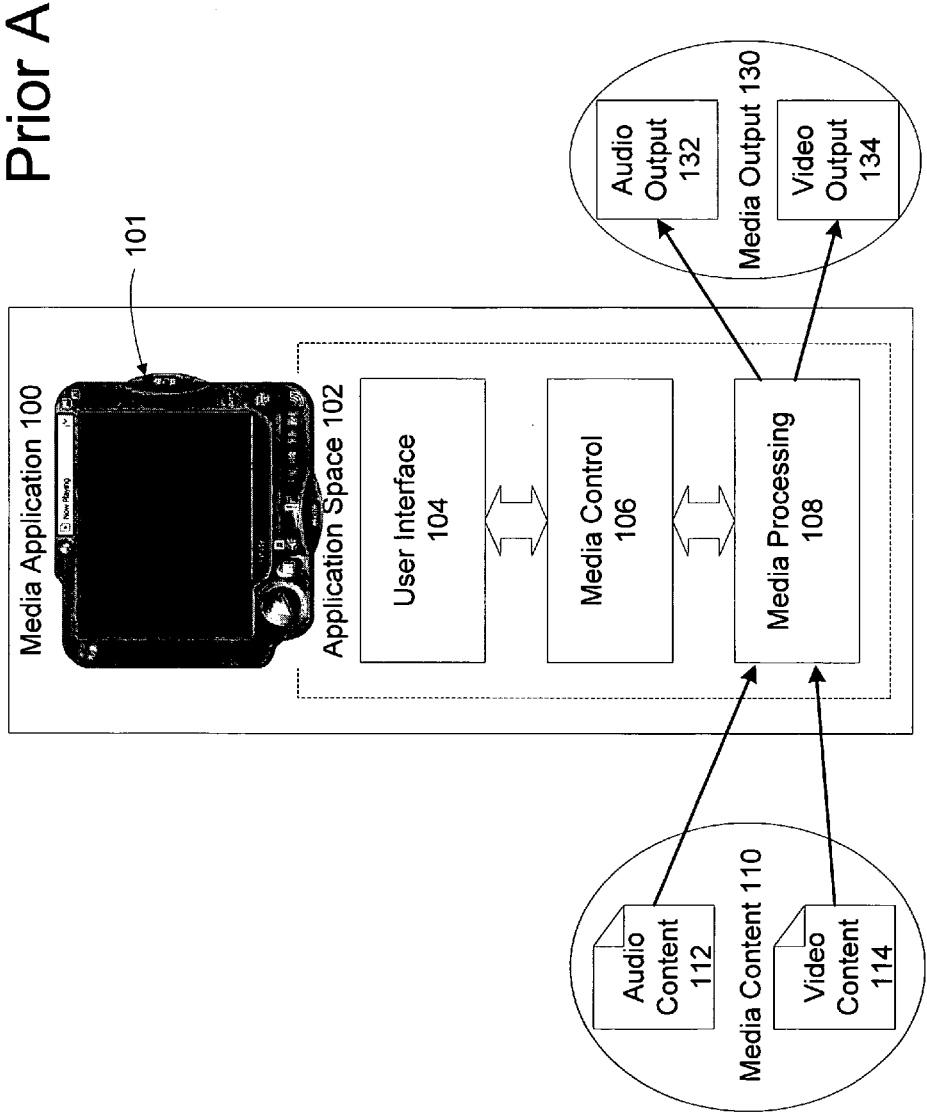
FIG. 1 is a block diagram showing an example of a typical prior art media player or application designed to operate on an exemplary personal computer.

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Although the present examples are described and illustrated herein as being implemented in a computer system, the system described is provided as an example and not a limitation. As those skilled in the art will appreciate, the present examples are suitable for application in a variety of different types of electronic systems.

Introduction

Digital media content is widely used in the form of CDs, DVDs and downloadable files. Various devices are able to process this media content including personal computers running various media player applications and the like, CD and DVD players, MP3 players and other general-purpose and/or dedicated electronic devices designed to process digital media content.

Because media content often comes in the form of a for-sale consumer products and the like, producers and providers may be anxious to protect their media content from unauthorized access, duplication, use, etc. Therefore, media content is often encrypted and/or otherwise secured. Some form of encryption key and/or other access mechanism may be provided for use with the media so that it can be accessed when and how appropriate. This key or mechanism may be used by a media application or the like to gain access to the protected media for processing, playing, rendering, etc.

Once the key or other mechanism has been used to decrypt or otherwise access media content within a system the media content may be vulnerable in its unprotected form. It may be possible to attack the system and/or media application so as to gain access to the unprotected media content. This may lead to the unauthorized access, use, duplication, distribution, etc. of the media content.

To avoid unauthorized access, a system that rightfully accesses the media content should be capable of protecting the media content. This protection should extend from the time the key or the like is obtained, used to access the media content, throughout any processing performed on the content, until the content is appropriately rendered in its authorized form. For example, a particular meeting may be recorded and encrypted using an access key with the intent of making the recording available to authorized personnel. Later, the recording is made available to an authorized individual via a media application on a PC. The media application uses the key to decrypt and access the media content, process it and play it for the listener. But if the media application itself has been compromised, or the application and/or content is attacked, the unencrypted media may no longer be protected.

One approach may be to construct a system for accessing, processing and rendering the media content within a protected environment that is designed to prevent unauthorized access to the media content. The example provided here describes a process and system for protecting media content from unauthorized access. Protection may be afforded by a protected media pipeline, among other mechanisms, which processes some, or all, of a media within a protected environment or protected space. A protected media pipeline may be composed of several elements.

A media source that may be part of the protected media pipeline accesses the media content, passes it through a set of transform functions or processes (decoders, effects, etc.) and then to a media sink which renders the processed media to a media output(s) (video rendering process, audio rendering process, etc). As an example, rendering may be as simple as sending audio signals to a set of headphones or it may be sending protected content in a secure manner to yet another process, system or mechanism external to the protected media pipeline.

A protected media pipeline may be constructed as a set or chain of media processing mechanisms operating in a secure or protected environment. In a PC, a protected media pipeline can be thought of as a software process that operates in a secure environment which protects the media content from unauthorized access while the content is being accessed, played and/or otherwise processed by the media system. When media content is being processed by an electronic device, a protected media pipeline can be thought of as a set of media processing mechanisms operating within a secure environment such that the media being processed is resistant to unauthorized access. The mechanism for providing this resistance may be purely physical in nature, such as a sealed case or lack of access points to the media content.

There may be two major aspects to constructing a trusted media system with a protected media pipeline. First, a trusted media system may be designed and constructed in such a way that it acknowledges and adheres to any access rules of the media content by ensuring that no actions are taken with the content above and beyond those allowed. Various mechanisms known to those skilled in this technology area may be used to address this first point. These mechanisms may include using encryption/decryption, key exchanges, passwords, licenses, interaction with a digital rights management system, and the like. Further, this may be as simple as storing the media content on/in a device such that it is resistant to physical, electronic or other methods of accessing and using the media content, except as intended.

Second, the trusted media system may be designed and constructed such that the media content being processed is secure from malicious attacks and/or unauthorized access and use. Processing the media content via a protected media pipeline operating in a protected environment or protected space addresses this second point. So in short, a protected media pipeline operating in a protected space refers to a media processing environment that resists unauthorized access to the media content being processed.

Figure 8:
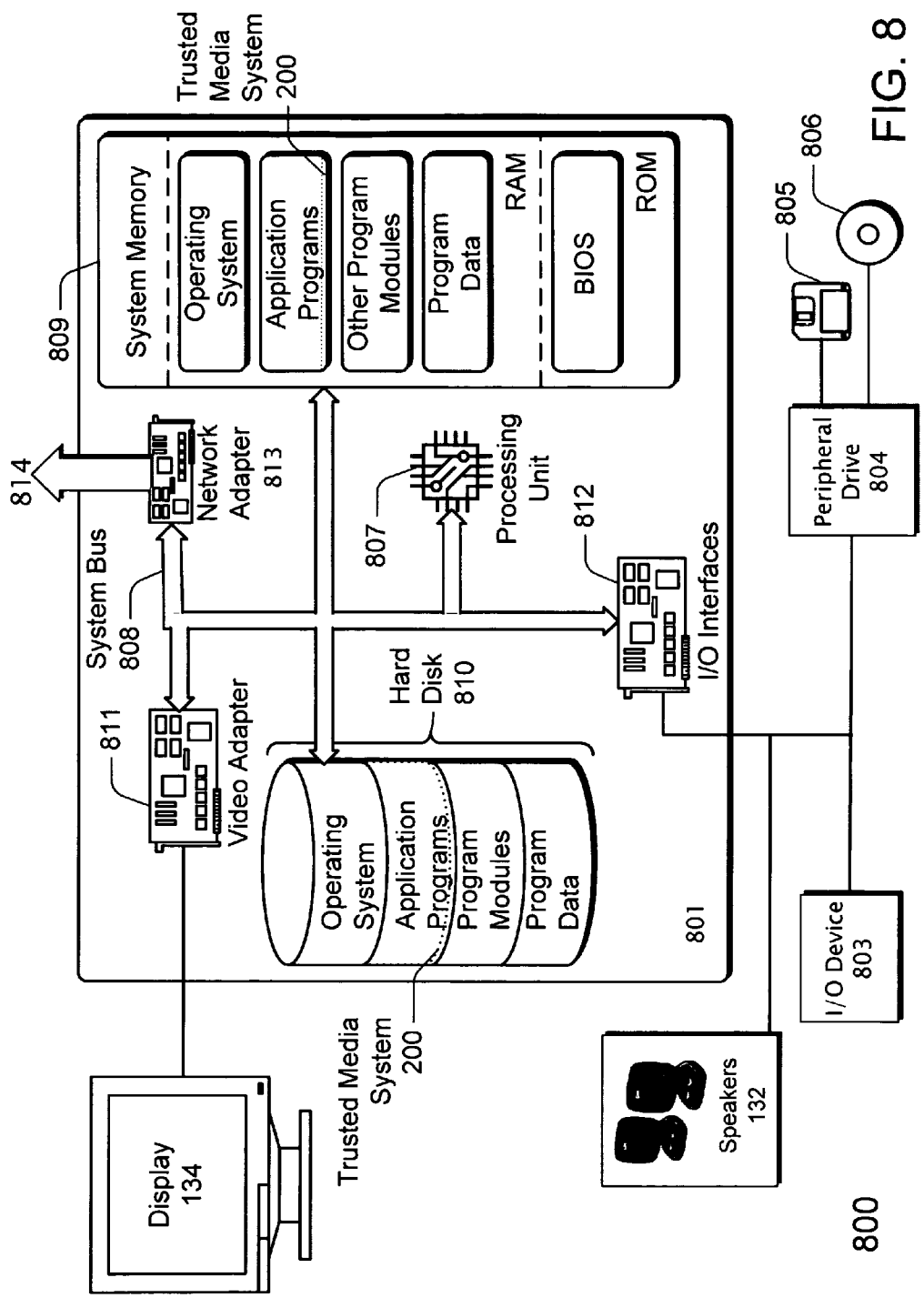
FIG. 8 is a block diagram showing an exemplary computing environment in which the software applications, systems and methods described in this application may be implemented.

FIG. 1 is a block diagram showing an example of a typical prior art media player or application 100 designed to operate on an exemplary personal computer (FIG. 8, 800). Equivalently, media players may operate on other devices with similar processing capabilities such as consumer electronic devices and the like. Other media applications may include, but are not limited to, media processors, media manipulators, media analyzers, or media formatters. A media application may be a software application program that provides a way of playing media such as audio and video by a digital processor such as a CPU (FIG. 8, 807) or the like. A media application may include a user interface or graphic 101 that may indicate the media being played and provides various user controls. Controls may be accessed through activation with a computer pointing device such as a mouse or by conventional buttons or the like. Such a media application may be thought of as a software application program operating in an application space 102 that is provided by the PC's computing environment (FIG. 8, 801) or operating system.

Another example of a media player may be a hardware device comprising a memory capable of storing media content and various button, switches, displays and controls and the like to allow a user to control the device, select the media to be played, control volume, download media content, etc.

The media player 100 may be comprised of mechanisms 104, 106 and 108. These mechanisms may operate in the application space 102. For a software media player, an application space 102 may be a space created in system memory (FIG. 8, 809) on a PC (FIG. 8, 800) where various software components or processes can be loaded and executed. For a hardware media player an application space 102 may be a printed circuit board and an electronic module containing the electronic elements that perform the processing and functions of the media player 100. The media player application 100 may include other spaces and mechanisms which may provide additional capabilities or features that may or may not be directly related to the processing of media. For example, a second media player playing a music selection may operate in a media application at the same time as a media player playing a newscast.

The application space 102 may include a user interface process 104 coupled to a media control process 106 which in turn is coupled to a media processing process 108. Typically these processes enable the media application 100 to couple to a source of media content 110, process the media content 110 and render it via media output 130. The media content 110 may or may not be encrypted or otherwise protected as part of an overall security and access control scheme.

For example, when activated the media application 100 may access audio content 112 and video content 114 typically available on a DVD ROM, an on-line source, or the like. The media content 110 may be played via media processing 108 which renders the content as audio output 132 and/or video output 134. Audio and video may typically be rendered on the speakers and/or display of a PC (FIG. 8, 800). This system is only one example of common media applications and environments that enable audio and video and the like to be processed, played and/or provided to other processes or systems. Another example of a media application would be a consumer electronic device such as an electronic juke box or the like. Yet another example would be a dedicated electronic device, with or without software and/or firmware.

Application space 102 may contain various processes and, in this example, includes the user interface process 104, the media control process 106, the media processing process 108, or their equivalents, used to coordinate and control the overall operation of the media application 100 and its processes. Typically, to prepare the media content 110, the user interface process 104 may provide an interface 101 for interaction between the user and the application. The media control process 106 or its equivalents may provide the overall management and control of the internal operations of the media application 100. The media processing process 108 may perform the processing of the media content 110 making it possible to render the media content via the media output 130, or perform whatever other media processing it may have been designed to perform.

The processes described above may not be secure against unauthorized access to the media content 110. Processing the media content 110 via such a system may expose it to unauthorized access. Such an unprotected application may enable users and/or attackers, with varying degrees of effort, to access and make use of the media content 110 in an unauthorized manner. For example, unauthorized access may enable the unauthorized sharing, copying, modifying, and/or distributing of media content 110.

Exemplary Trusted Media System

Figure 2:
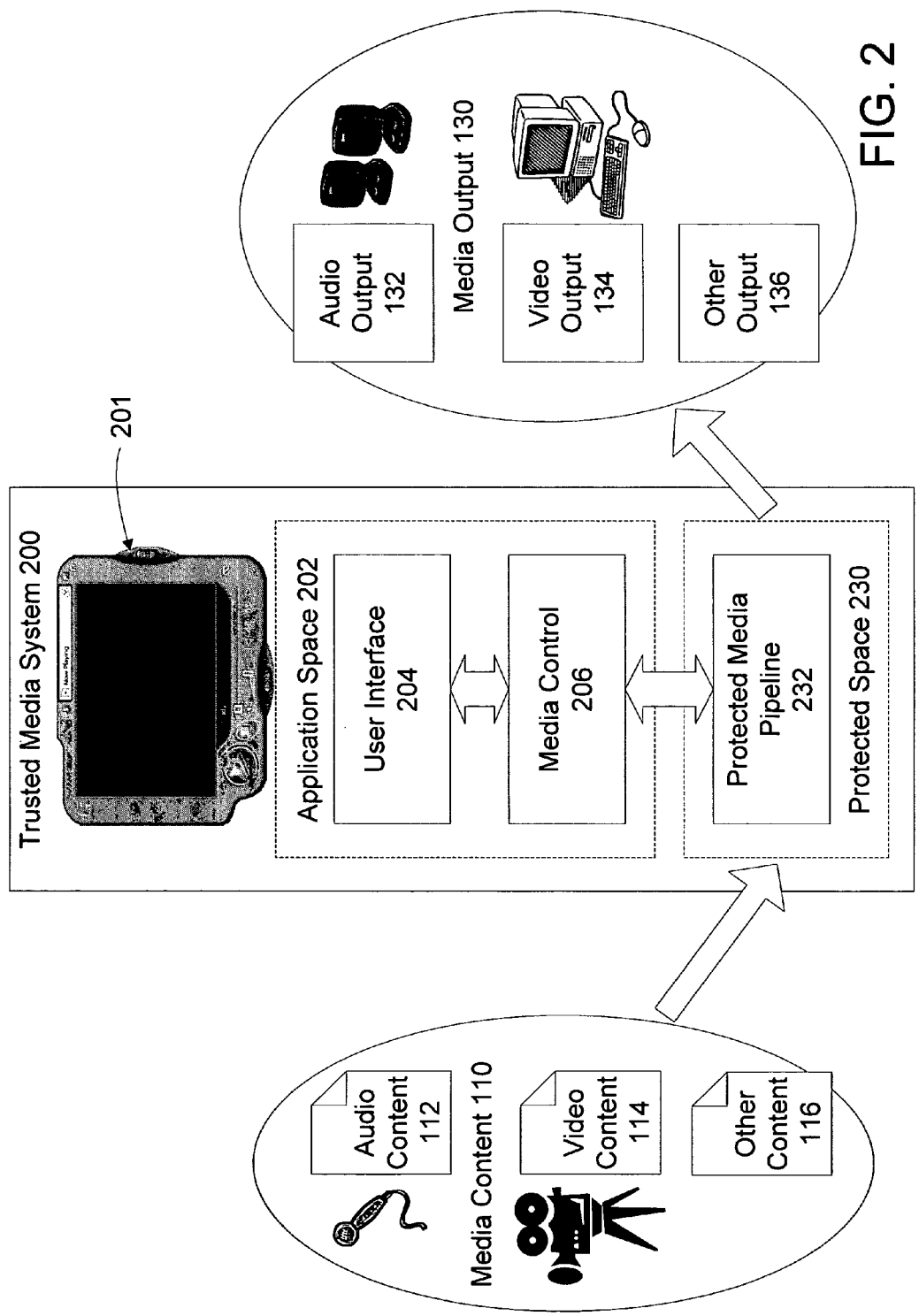
FIG. 2 is a block diagram showing an example of a trusted media system comprising an application space and a distinct protected space.

FIG. 2 is a block diagram showing an example of a trusted media system 200 comprising an application space 202 and a distinct protected space 230. In this exemplary embodiment of a media player the system comprises a protected media pipeline 232 operating within a protected space 230 in addition to user interface 204 and media control 206 mechanisms operating in the application space 202.

The protected space 230 typically provides a protected environment for media content 110 processing, the protected space 230 resisting unauthorized access to the media content 110 during processing. Media content 110 is typically protected by various built-in security schemes to deliver it untampered-with to a user, such as encryption and the like. However, once the media content 110 is decrypted or the like for processing, additional mechanisms to protect it from unauthorized access are required. A protected media pipeline 232 operating in a protected space 230.

Application space 202 may be contain various mechanisms including, but not limited to, a user interface mechanism 204 and a media control mechanism 206, or their equivalents, which are coupled to the protected media pipeline 232 operating within the protected space 230. Typically the user interface process 204 may provide an interface 201 or set of controls for interaction between the user and the system. The media control process 206 may provide the overall management and control of the internal operations of the trusted media system 200. The protected media pipeline 232 operating in the protected space 230 may perform the processing of the media content 110 and render the content via the media output 130, or perform whatever other media processing the media system 200 is designed to perform.

One or more protected spaces 230 may be provided as an extension of a computing environment (FIG. 8, 801) and typically possess a heightened level of security and access control. A protected space 230 may also include mechanisms to ensure that any mechanism operating inside it, such as a protected media pipeline 232, along with any media content being processed within the protected space 230, are used and accessed appropriately. In some embodiments the access and use privileges may be indicated by a media content license and/or a digital rights management system. Alternatively, mechanisms such as password protection, encryption and the like may provide access control.

Figure 3:
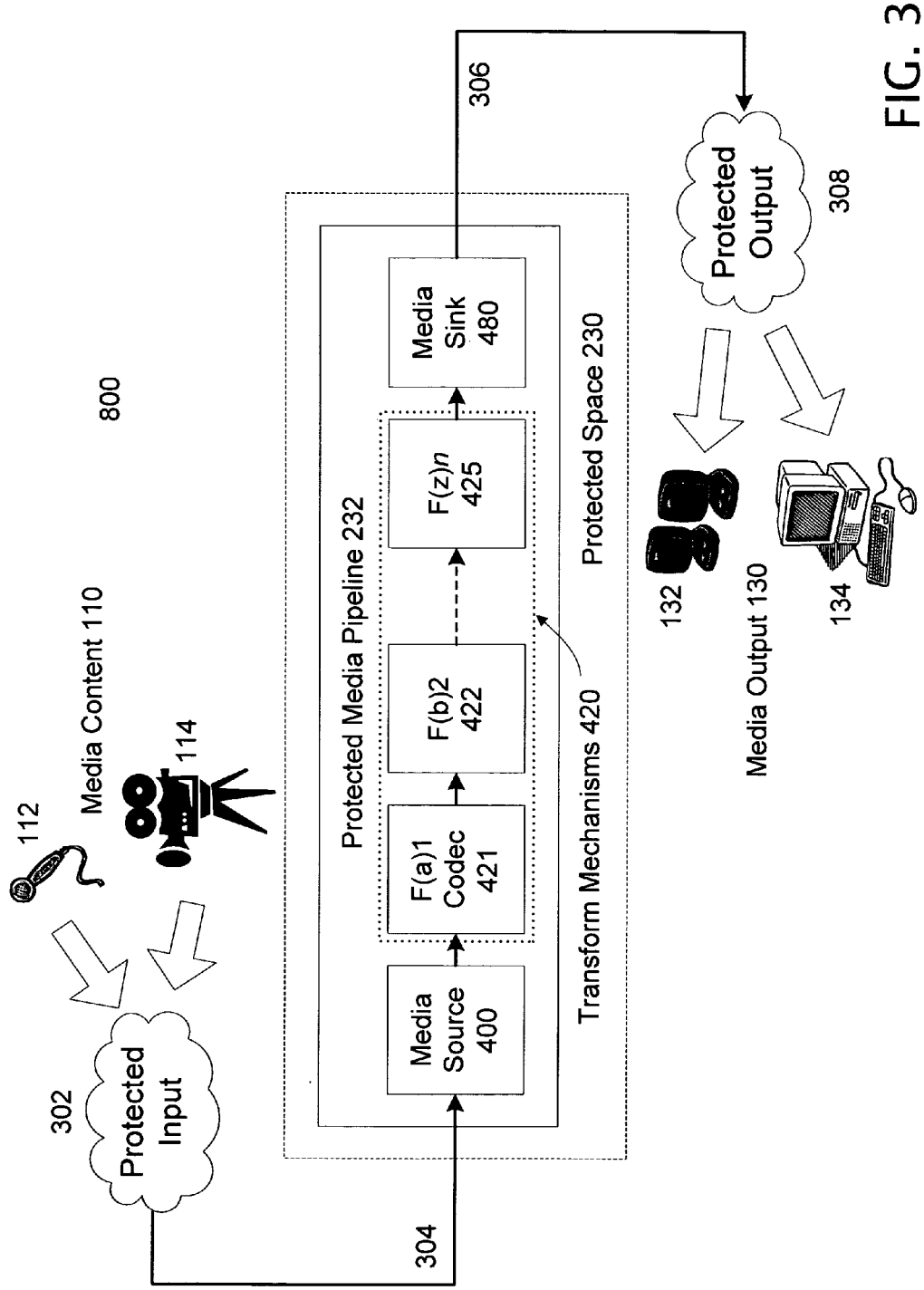
FIG. 3 is a block diagram showing exemplary components comprising an end-to-end system for protecting media content and other data from initial input to final output of a computing environment.

FIG. 3 is a block diagram showing exemplary components comprising an end-to-end system for protecting media content 110 and other data from initial input 302 to final output 308 of a computing environment 800. Such a system tends to protect media 110 or other data from the point of entry into a computing environment 800 to its final output 130 in addition to providing protection during processing within a protected media pipeline 232 and/or other processing components. Such end-to-end protection may be provided via three major components-protected input 302, a protected space 230 for processing and protected output 308.

Protected input 302 may be implement in hardware and/or software and may limit unauthorized access to media content 110 and/or other data as it is initially received onto the system 800 from some source such as a storage device, network connection, physical memory device and the like. The protected input 302 may be coupled to a protected media pipeline 232 via a secure connection 304. The secure connection 304 allows transfer of the media content 110 between the protected input 302 and the protected media pipeline 232 and/or other processing components and may be implemented using mechanisms such that it is tamper resistant.

Protected output 306 may be implemented in hardware and/or software and may limit unauthorized access to media content 110 as it is transferred from a protected media pipeline 232 or other processing to the output of the computing environment 800 which may be speakers, video displays, storage media, network connections and the like. The protected output 308 may be coupled to a protected media pipeline 232 via a secure connection 306. The secure connection 306 allows transfer of the media content 110, which may be in a processed form, between the protected media pipeline 232 and the protected output 308 and may be implemented using mechanisms such that it is tamper resistant.

Tamper resistance as used here includes limiting unauthorized access, resisting attack and otherwise protecting media content and/or other data from being compromised.

A protected space may also be referred to as a protected environment. Protected spaces or environments and their creation and maintenance are described beginning with the description of FIG. 9 below.

Protected Media Pipeline

Figure 4:
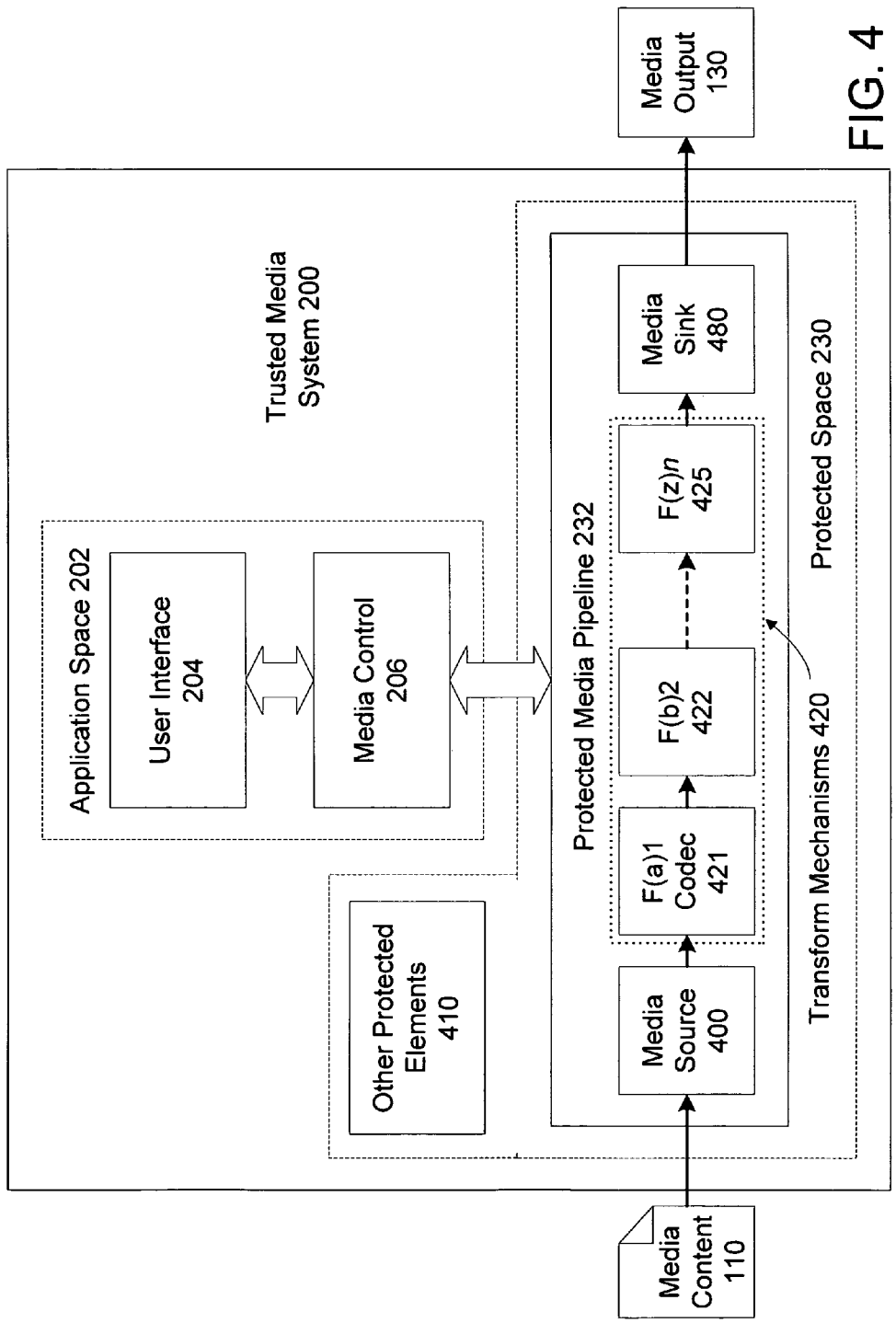
FIG. 4 is a block diagram showing exemplary components comprising a protected media pipeline operating in a protected space as part of a trusted media system.

FIG. 4 is a block diagram showing exemplary components comprising a protected media pipeline 232 operating in a protected space 230 as part of a trusted media system 200. The components 400, 421, 422, 425, and 480 form a protected media pipeline 232 operating in a protected space 230. Of these components, the transforms mechanisms 420 process the media content to prepare it for output. The protected space 230 may also contain other protected elements 410 of the trusted media system 200.

The protected media pipeline 232 typically performs the function of accessing and processing protected media content 110 and producing a protected output in the format determined by the trusted media system 200. Unprotected media content may also be processed in a protected media pipeline 232. Further, unprotected media pipelines may be constructed and operate in the application space 202 or other spaces. However, an unprotected media pipeline operating in the application space 202 would not benefit from a protected environment 230 which limits unauthorized access to the media content. For processing some types of media content, such as unprotected or unencrypted media content, an unprotected pipeline may be acceptable. In some embodiments there may be a plurality of media content having different security levels (some protected and some unprotected), processed through one or more pipelines each adapted to provide the desired level of protection.

In the protected media pipeline 232 a media source 400 may be coupled to a series of transform functions or mechanisms 420. A first transform function F(a)1 421 may be coupled to a second transform function F(b)2 422 which in turn may be coupled to any number of additional transform functions represented by F(z)n 425. The output of the set of transform functions 420 may be coupled to a media sink 480. There are typically one or more transform functions in a protected media pipeline 232, the specific function of each transform depending on the media content 110 and the processing that the trusted media system 200 is designed to perform.

The example shown illustrates transform mechanisms that may be connected in series forming a transform chain. In alternative embodiments of a protected media pipeline 232, two or more of the transform mechanisms may be coupled in parallel and/or two or more media pipelines may be coupled at some point in each pipeline's transform chain forming a single pipeline from that point forward. Further, each transform may have a single input or a plurality of inputs and they may have a single output or a plurality of outputs.

The media source 400 may access media content 110 via hardware and/or appropriate driver software or the like. For example, using a PC for processing music stored on a CD, the media source 400 couples to CD ROM driver software which controls the CD ROM drive hardware (FIG. 8, 804) to read audio data from a CD ROM disk (FIG. 8, 806). The media source 400 is a mechanism used in the construction of a media pipeline to access and receive the media content 110 and make it available to the remaining mechanisms of the media pipeline. Alternatively, a media source 400 may couple with a semiconductor memory in a consumer electronic device to access music stored on the device. Equivalent media sources may provide access to one or more types of media content, including video, digital recordings, and the like.

The media transforms 420, represented by F(a)1, F(b)2 and F(z)n, (421, 422 and 425 respectively) perform specific operations on the media content provided by the media source 400 and may each perform different operations. There are typically at least one media transform in a media pipeline. The media transforms 421, 422 and 425 prepare and/or process the media content 110 for rendering via the media output 130 and/or for further processing. The specific transformations performed may include operations such as encryption and/or decryption of media content, image enhancement of video content, silence detection in audio content, decompression, compression, volume normalization, and the like. Transforms may process media content 110 automatically or be controlled by a user via virtual or physical handles provided through a user interface 204. The specific transforms provided in a pipeline depend on the media content 110 to be processed and the function the trusted media system 200 has constructed the pipeline to perform. In a simple media system or application the processing may be as minimal as decoding an audio media and controlling the volume of the media accessed from a semiconductor memory and played on a headset. In a more complex media system or application a wide variety of processing and media manipulation are possible.

In a trusted media system 200 designed to process encrypted media content one of the transform mechanisms, typically the first transform F(a)1 421, may be a codec which decodes the media content such that it may be further processed. In alternative examples, decryption and/or decompression operations may be performed by distinct mechanisms and one or both operations may be eliminated depending on the format of media content being processed.

When operating on a PC, the media sink 480 may couple the processed or transformed media content 110 to the media output 130 via the media I/O hardware (FIG. 8, 812) controlled by appropriate driver programs. For example, in the case of audio data, the media sink 480 may couple to an available sound driver program which couples audio data that has been transformed to audio output hardware such as an amplifier and/or speakers (FIG. 2, 132). When operating on a consumer electronic device, the media sink 480 may be coupled, for example, to an audio amplifier which in turn couples to speakers or a headset through a connector on the device's case.

By constructing a pipeline that performs the sourcing, transform and sinking functions within a protected space 230, unauthorized access to the media content 110 may be restricted in a manner that conforms to the wishes of the media content provider/owner. Thus, this approach tends to provide a secure processing environment such that a media content provider may trust that their media content 110 will not be compromised while being processed.

The output of the protected media pipeline 232 may be coupled to the input of a media output 130. Alternatively the output of a protected media pipeline 232 may couple to the input of another protected media pipeline or some other process. This coupling may be implemented such that it is tamper resistant and restricts unauthorized access to any data or media content flowing from one pipeline to another or to some other process. The remainder of the elements illustrated in FIG. 4 operate as previously described for FIG. 2.

Figure 5:
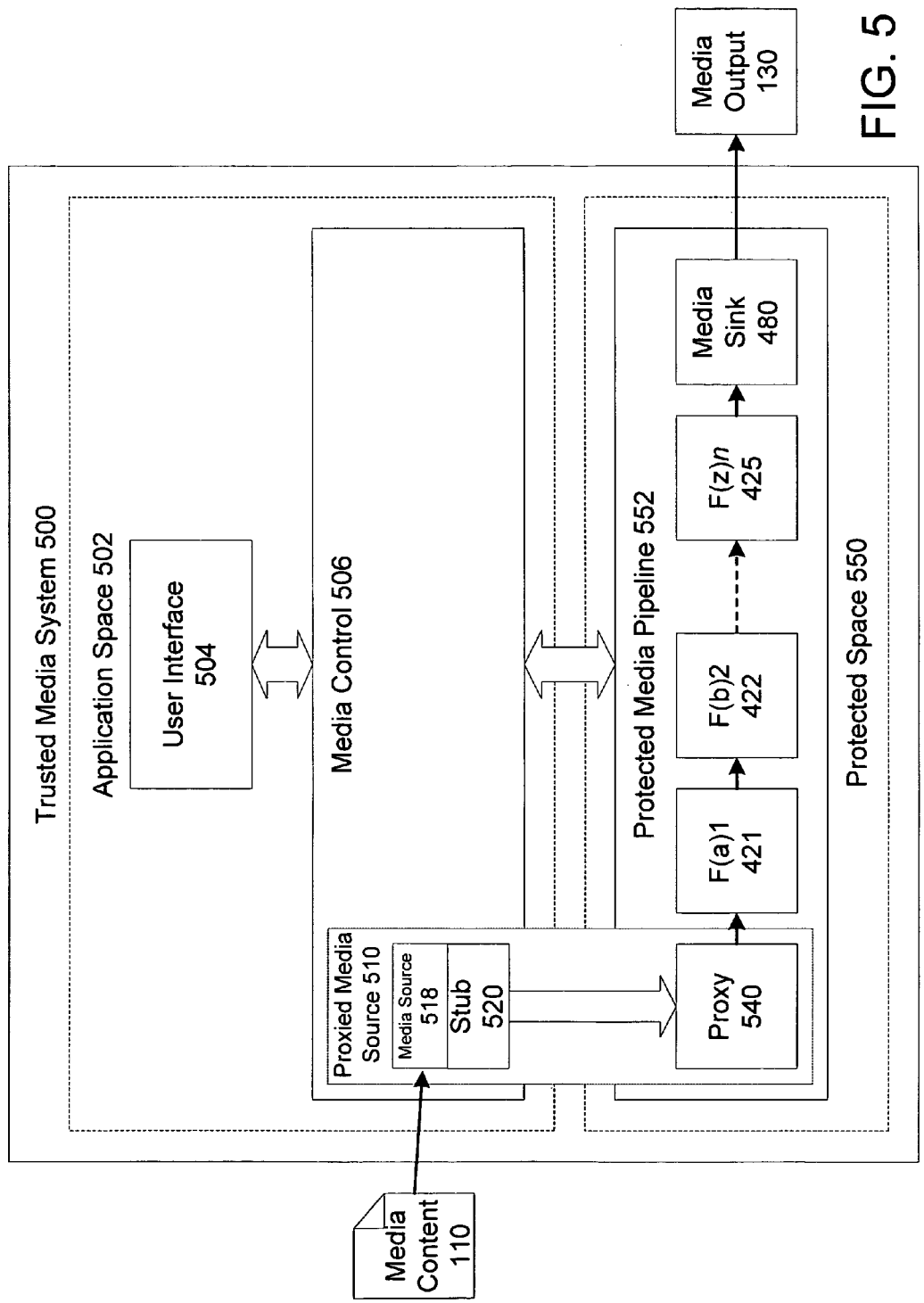
FIG. 5 is a block diagram showing an alternate example of a protected media pipeline having a proxied media source as part of a trusted media system.

FIG. 5 is a block diagram showing an alternate example of a protected media pipeline 552 having a proxied media source 510 as part of a trusted media system 500. The proxied media source 510 includes a media source portion 518 and a stub portion 520 that may operate in an unprotected application space 502, and a proxy portion 540 that may operate in a protected space 550. The proxied media source 510 may allow media content 110 to be transferred from the application space 502 via the media source 518 and the stub 520 to the protected space 550 via the proxy 540 by using remote procedure calls or the like.

When used in a PC environment (FIG. 8, 800), the proxied media source 510 architecture described here may simplify the creation of the media source modules by third-party software makers or content providers. Such a simplification may be provided by splitting the proxied media source 510 such that media application writers may only need to implement the media source portion 518. The stub portion 520 and proxy portion 540 may be provided as an element of the protected environment 550.

Further, the use of a proxied media source 510 may support mixing protected and unprotected media content 110 by allowing protected media content to be directed from a media source 518 to a first stub operating as part of a protected media pipeline while the unprotected media content may be directed from the media source 518 to processing modules operating within the unprotected application space 502 or other unprotected space via a second stub portion also operating within the unprotected application space 502 or some other unprotected space.

Similar to the proxied media source 510, the media sink 480 may also be proxied and split into stub and proxy portions. The stub portion may operate in the protected space 650 and may encrypt data prior to forwarding it to the proxy portion operating in an application space 202 or some other space. The remainder of the elements in FIG. 5 operate as previously described for FIG. 4.

Figure 6:
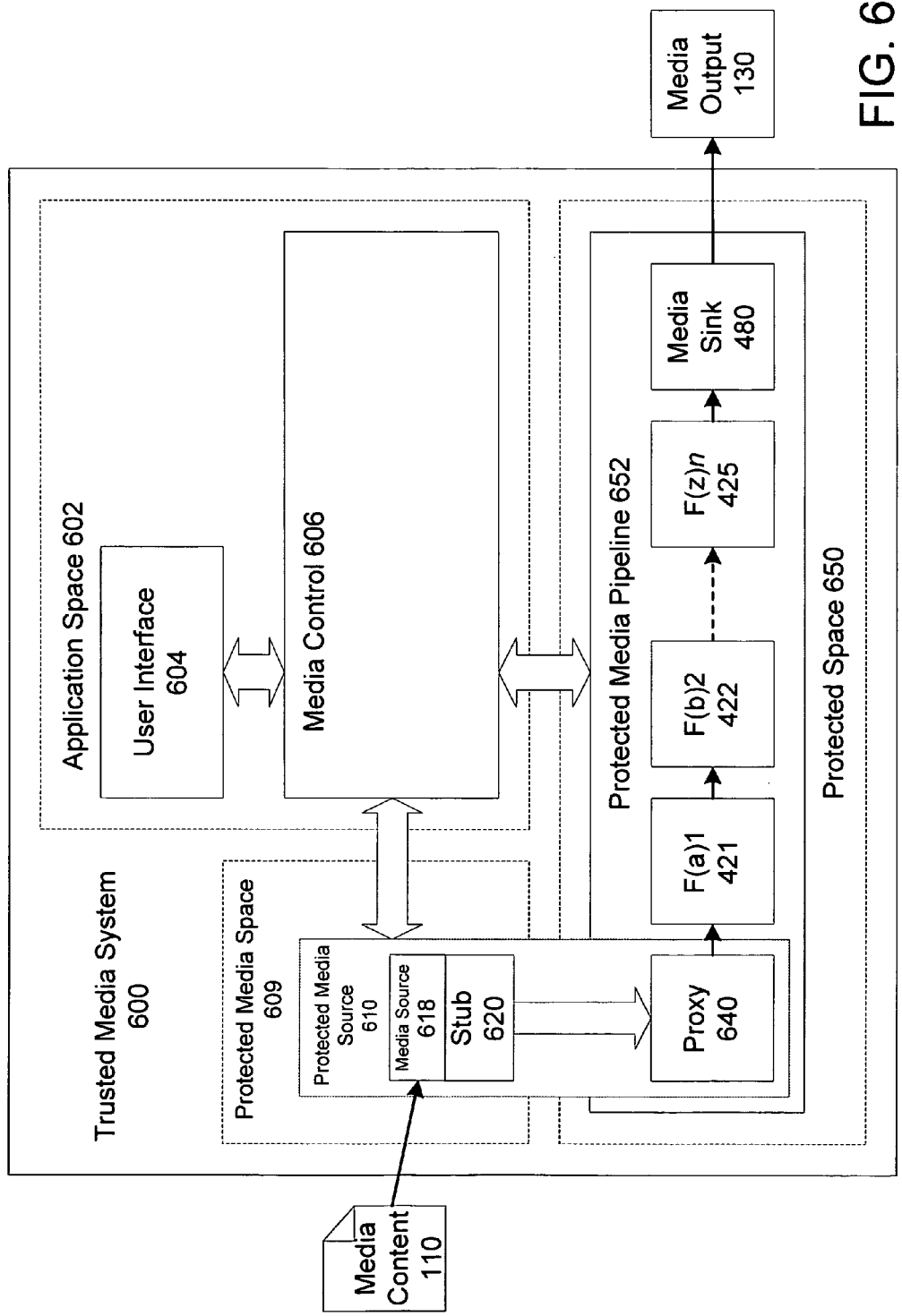
FIG. 6 is a block diagram showing an example of a further alternative example of a trusted media system.

FIG. 6 is a block diagram showing an example of a further alternative example of a trusted media system 600. In this embodiment the trusted media system 600 includes a protected media source 610 constructed to include a media source portion 618 and a stub portion 620 which operate in a protected media space 609, and a proxy portion 640 which operates in a protected space 650. The two protected regions 609 and 650 are coupled by the protected media source 610 with data being passed from the media source portion 618 via the stub portion 620 operating in the protected media space 609 to the proxy portion 640 operating in the protected space 650. The protected media source 610 may allow media content 110 to be transferred from the protected media space 609 to the protected pipeline space 650 using remote procedure calls or the like. The protected media source 610 architecture described here may simplify the creation of the media source by third-parties or content providers and result in more stable and secure protected media applications 600. The remaining elements of FIG. 6 operate as previously described for FIG. 4 and FIG. 5.

Figure 7:
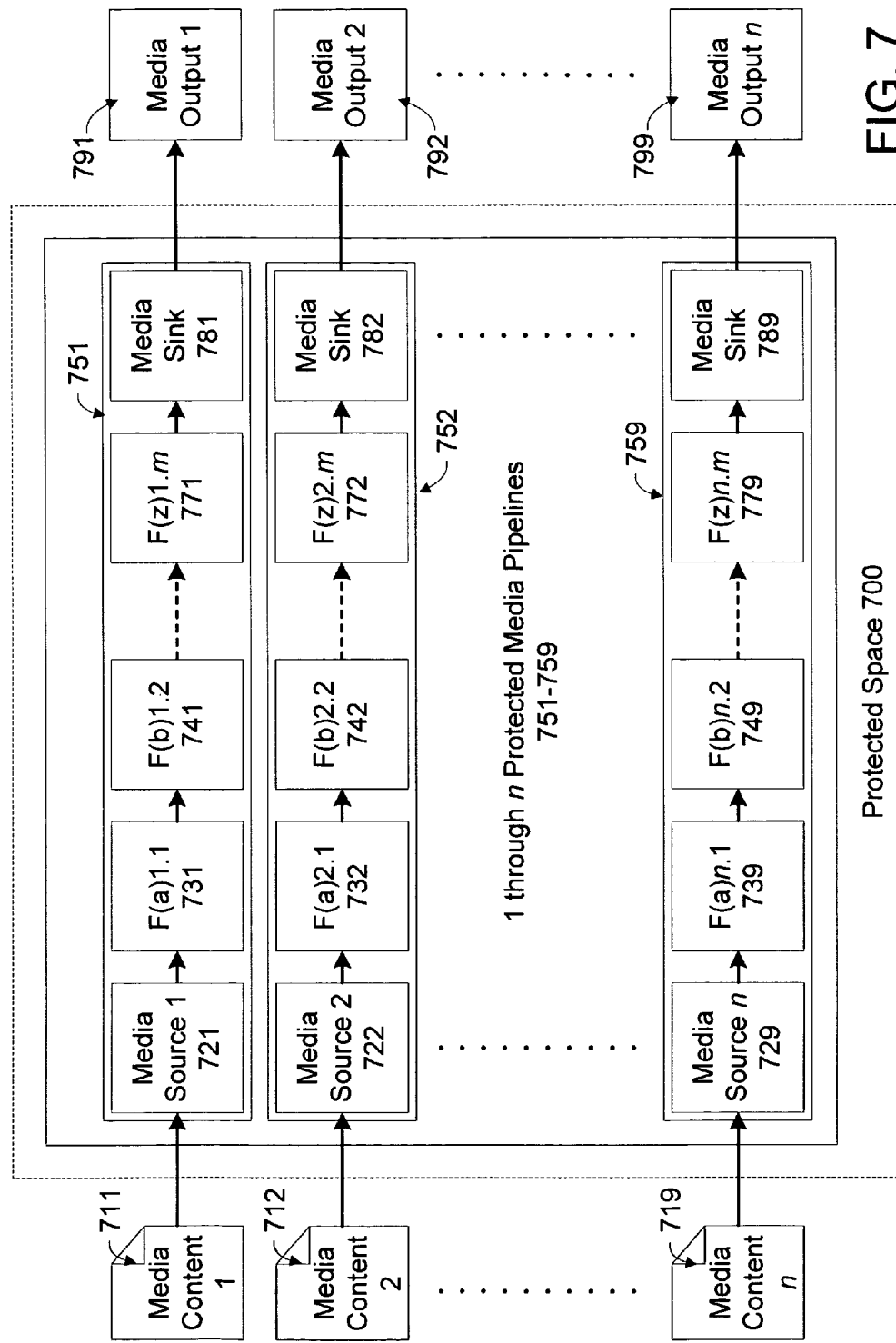
FIG. 7 is a block diagram showing a plurality of protected media pipelines.

FIG. 7 is a block diagram showing a plurality of protected media pipelines 751-759. The protected media pipelines 751, 752, 759 operate in a protected space 700. Alternatively each protected media pipeline may operate in its own protected space or various numbers of pipelines may be grouped into one or more protected spaces in any combination. A trusted media system may provide several such protected media pipelines.

An example of such a system may be a trusted media system playing a DVD with its audio content in Dolby digital 5.1 format. In this example there may be six different audio pipelines, one for each of the audio channels, in addition to a video pipeline for the video portion of the DVD. All of the protected media pipelines may operate in the same protected space as shown or, alternatively, the protected media pipelines may be grouped in groups of one or more with each group operating in its own distinct protected space.

In alternative embodiments of a protected media pipeline 232, two or more of the sources, transform mechanisms and/or sinks may be coupled in parallel and/or two or more media pipelines may be coupled at some point in each pipeline forming a single pipeline from that point forward. Alternatively a single pipeline may split into two pipelines. Further, sources, transforms and/or sinks may have a single input or a plurality of inputs and/or they may have a single output or a plurality of outputs. The remaining elements of FIG. 7 operate as previously described for FIG. 4.

FIG. 8 is a block diagram showing an exemplary computing environment 800 in which the software applications, systems and methods described in this application may be implemented. Exemplary personal computer 800 is only one example of a computing system or device that may process media content (FIG. 4, 110) and is not intended to limit the examples described in this application to this particular computing environment or device type.

The computing environment can be implemented with numerous other general purpose or special purpose computing system configurations. Examples of well known computing systems may include, but are not limited to, personal computers 800, hand-held or laptop devices, microprocessor-based systems, multiprocessor systems, set top boxes, programmable consumer electronics, gaming consoles, consumer electronic devices, cellular telephones, PDAs, and the like.

The PC 800 includes a general-purpose computing system in the form of a computing device 801. The components of computing device 801 may include one or more processors (including CPUs, GPUs, microprocessors and the like) 807, a system memory 809, and a system bus 808 that couples the various system components. Processor 807 processes various computer executable instructions to control the operation of computing device 801 and to communicate with other electronic and computing devices (not shown) via various communications connections such as a network connection 814 an the like. The system bus 808 represents any number of several types of bus structures, including a memory bus or memory controller, a peripheral bus, an accelerated graphics port, and a processor or local bus using any of a variety of bus architectures.

The system memory 809 includes computer readable media in the form of volatile memory, such as random access memory (RAM), and/or non-volatile memory, such as read only memory (ROM). A basic input/output system (BIOS) may be stored in ROM. RAM typically contains data and/or program modules that are immediately accessible to and/or presently operated on by one or more of the processors 807. A trusted media system 200 may be contained in system memory 809.

Mass storage devices 804 and 810 may be coupled to the computing device 801 or incorporated into the computing device by coupling to the system bus. Such mass storage devices 804 and 810 may include a magnetic disk drive which reads from and/or writes to a removable, non volatile magnetic disk (e.g., a "floppy disk") 805, or an optical disk drive that reads from and/or writes to a removable, non-volatile optical disk such as a CD ROM, DVD ROM or the like 806. Computer readable media 805 and 806 typically embody computer readable instructions, data structures, program modules and the like supplied on floppy disks, CDs, DVDs, portable memory sticks and the like.

Any number of program modules may be stored on the hard disk 810, other mass storage devices 804, and system memory 809 (limited by available space), including by way of example, an operating system(s), one or more application programs, other program modules, and program data. Each of such operating system, application program, other program modules and program data (or some combination thereof) may include an embodiment of the systems and methods described herein. For example, a trusted media system 200 may be stored on mass storage devices 804 and 810 and/or in system memory 809.

A display device 134 may be coupled to the system bus 808 via an interface, such as a video adapter 811. A user can interface with computing device 800 via any number of different input devices 803 such as a keyboard, pointing device, joystick, game pad, serial port, and/or the like. These and other input devices may be coupled to the processors 807 via input/output interfaces 812 that may be coupled to the system bus 808, and may be coupled by other interface and bus structures, such as a parallel port, game port, and/or a universal serial bus (USB).

Computing device 800 may operate in a networked environment using communications connections to one or more remote computers and/or devices through one or more local area networks (LANs), wide area networks (WANs), the Internet, optical links and/or the like. The computing device 800 may be coupled to one or more networks via network adapter 813 or alternatively by a modem, DSL, ISDN interface and/or the like.

Communications connection 814 is an example of communications media. Communications media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media include wired media such as a wired network or direct-wired connection, and wireless media such as acoustic, radio frequency, infrared, and other wireless media.

Those skilled in the art will realize that storage devices utilized to store computer-readable program instructions can be distributed across a network. For example a remote computer or device may store an example of the system described as software. A local or terminal computer or device may access the remote computer or device and download a part or all of the software to run the program. Alternatively the local computer may download pieces of the software as needed, or distributively process the software by executing some of the software instructions at the local terminal and some at remote computers or devices.

Those skilled in the art will also realize that by utilizing conventional techniques known to those skilled in the art that all, or a portion, of the software instructions may be carried out by a dedicated electronic circuit such as a digital signal processor ("DSP"), programmable logic array ("PLA"), or the like. The term electronic apparatus as used herein includes computing devices, consumer electronic devices including any software and/or firmware and the like, and electronic devices or circuits containing no software and/or firmware and the like.

The term computer readable medium may include system memory, hard disks, mass storage devices and their associated media, communications media, and the like.

Protected Environment

Figure 9:
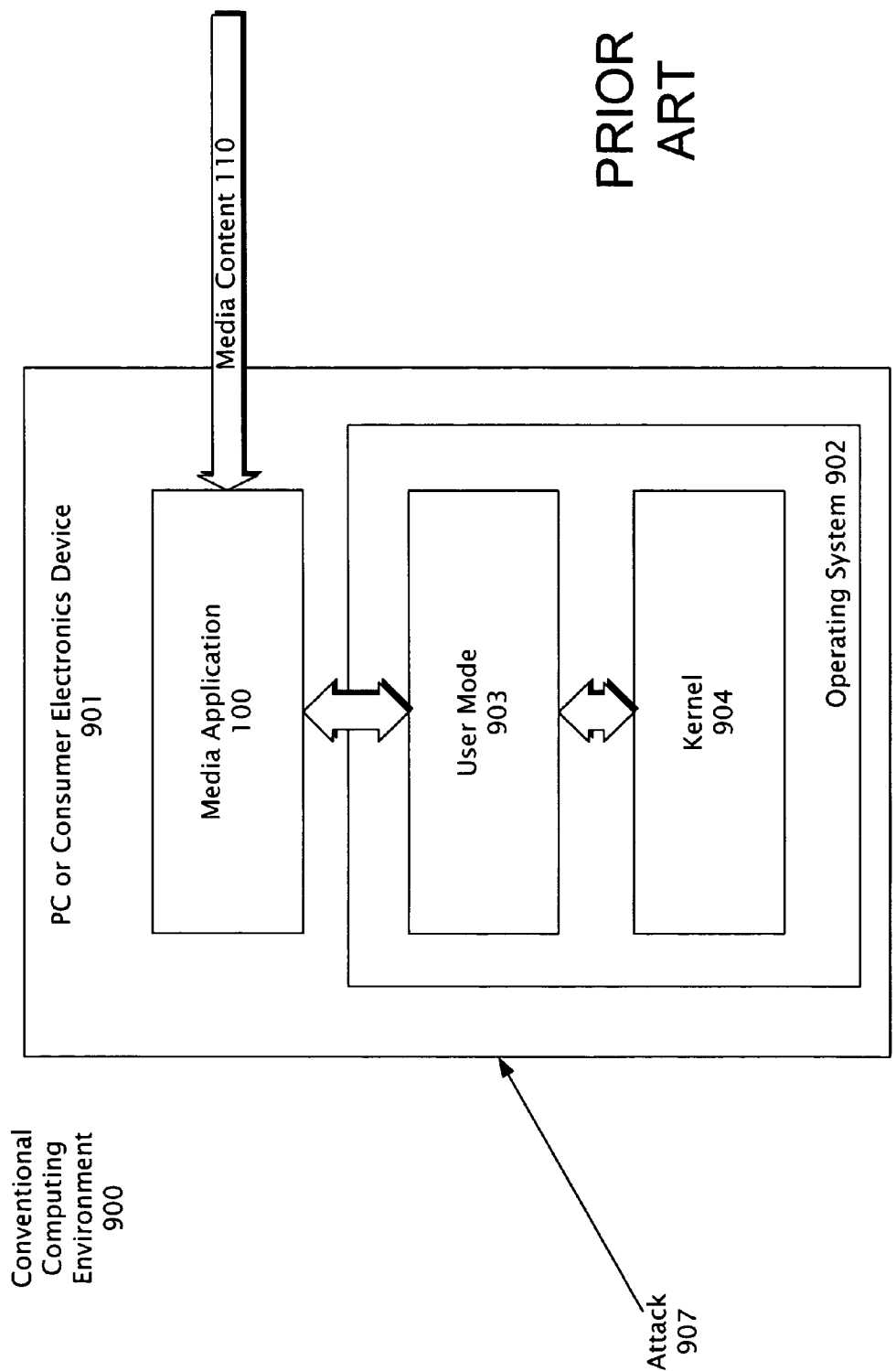
FIG. 9 is a block diagram showing a conventional media application processing media content operating in a conventional computing environment with an indication of an attack against the system.

FIG. 9 is a block diagram showing a conventional media application 100 processing media content 110 operating in a conventional computing environment 900 with an indication of an attack 907 against the system 901. A conventional computing environment 900 may be provided by a personal computer ("PC") or consumer electronics ("CE") device 901 that may include operating system ("OS") 902. Typical operating systems often partition their operation into a user mode 903, and a kernel mode 904. User mode 903 and kernel mode 904 may be used by one or more application programs 100. An application program 100 may be used to process media content 110 that may be transferred to the device 901 via some mechanism, such as a CD ROM drive, Internet connection or the like. An example of content 110 would be media files that may be used to reproduce audio and video information.

The computing environment 900 may typically include an operating system ("OS") 902 that facilitates operation of the application 100, in conjunction with the one or more central processing units ("CPU"). Many operating systems 902 may allow multiple users to have access to the operation of the CPU. Multiple users may have ranges of access privileges typically ranging from those of a typical user to those of an administrator. Administrators typically have a range of access privileges to applications 100 running on the system, the user mode 903 and the kernel 904. Such a computing environment 900 may be susceptible to various types of attacks 907. Attacks may include not only outsiders seeking to gain access to the device 901 and the content 110 on it, but also attackers having administrative rights to the device 901 or other types of users having whatever access rights granted them.

Figure 10:
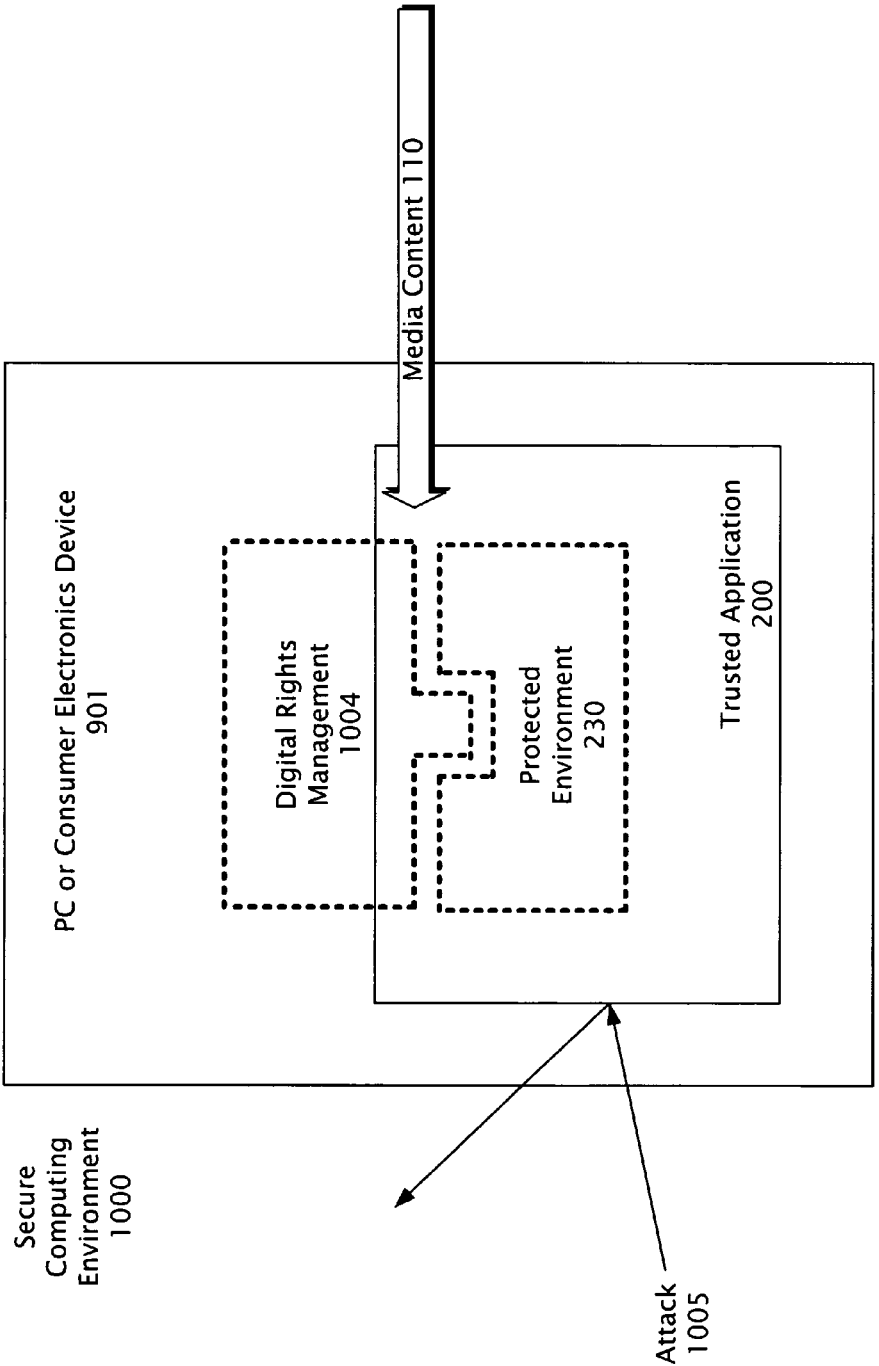
FIG. 10 is a block diagram showing a trusted application processing media content and utilizing a protected environment or protected space that tends to be resistant to attack.

FIG. 10 is a block diagram showing a trusted application 200 processing media content 110 and utilizing a protected environment or protected space 230 that tends to be resistant to attack 1005. The term "trusted application", as used here, may be defined as an application that utilizes processes operating in a protected environment such that they tend to be resistant to attack 1005 and limit unauthorized access to any media content 110 or other data being processed. Thus, components or elements of an application operating in a protected environment are typically considered "trusted" as they tend to limit unauthorized access and tend to be resistant to attack. Such an application 200 may be considered a trusted application itself or it may utilize another trusted application to protect a portion of its processes and/or data.

For example, a trusted media player 200 may be designed to play media content 110 that is typically licensed only for use such that the media content 110 cannot be accessed in an unauthorized manner. Such a trusted application 200 may not operate and/or process the media content 110 unless the computing environment 1000 can provide the required level of security, such as by providing a protected environment 230 resistant to attack 1005.

As used herein, the term "process" may be defined as an instance of a program (including executable code, machine instructions, variables, data, state information, etc.), residing and/or operating in a kernel space, user space and/or any other space of an operating system and/or computing environment.

A digital rights management system 1004 or the like may be utilized with the protected environment 230. The use of a digital rights management system 1004 is merely provided as an example and may not be utilized with a protected environment or a secure computing environment. Typically a digital rights management system utilizes tamper-resistant software ("TRS") which tends to be expensive to produce and may negatively impact computing performance. Utilizing a trusted application 200 may minimize the amount of TRS functionality required to provide enhanced protection.

Various mechanisms known to those skilled in this technology area may be utilized in place of, in addition to, or in conjunction with a typical digital rights management system. These mechanisms may include, but are not limited to, encryption/decryption, key exchanges, passwords, licenses, and the like. Thus, digital right management as used herein may be a mechanism as simple as decrypting an encrypted media, utilizing a password to access data, or other tamper-resistant mechanisms. The mechanisms to perform these tasks may be very simple and entirely contained within the trusted application 200 or may be accessed via interfaces that communicate with complex systems otherwise distinct from the trusted application 200.

Figure 11:
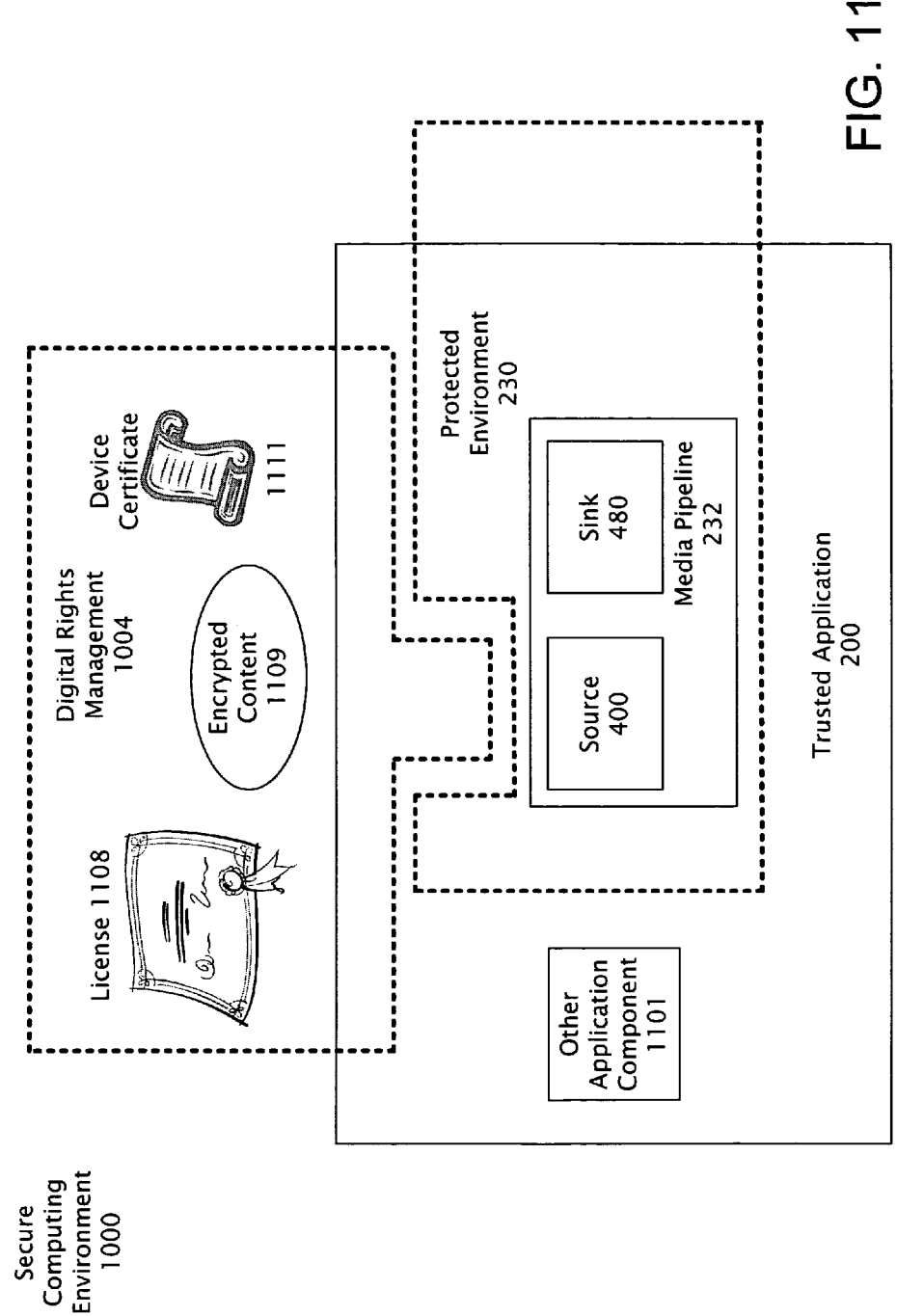
FIG. 11 is a block diagram showing exemplary components of a trusted application that may be included in the protected environment.

FIG. 11 is a block diagram showing exemplary components of a trusted application 200 that may be included in the protected environment 230. A trusted application 200 will typically utilize a protected environment 230 for at least a potion of its subcomponents 232, 400, 480. Other components 1101 of the trusted application may not utilize a protected environment. Components 232, 400 and 480 involved in the processing of media content or data that may call for an enhanced level of protection from attack or unauthorized access may operate within a protected environment 230. A protected environment 230 may be utilized by a single trusted application 200 or, possibly, by a plurality of trusted applications. Alternatively, a trusted application 200 may utilize a plurality of protected environments. A trusted application 200 may also couple to and/or utilize a digital rights management system 1004.

In the example shown, source 400 and sink 480 are shown as part of a media pipeline 232 operating in the protected environment 230. A protected environment 230 tends to ensure that, once protected and/or encrypted content 1109 has been received and decrypted, the trusted application 200 and its components prevent unauthorized access to the content 1109.

Digital rights management 1004 may provide a further avenue of protection for the trusted application 200 and the content 1109 it processes. Through a system of licenses 1108, device certificates 1111, and other security mechanisms a content provider is typically able to have confidence that encrypted content 1109 has been delivered to the properly authorized device and that the content 1109 is used as intended.

Figure 12:
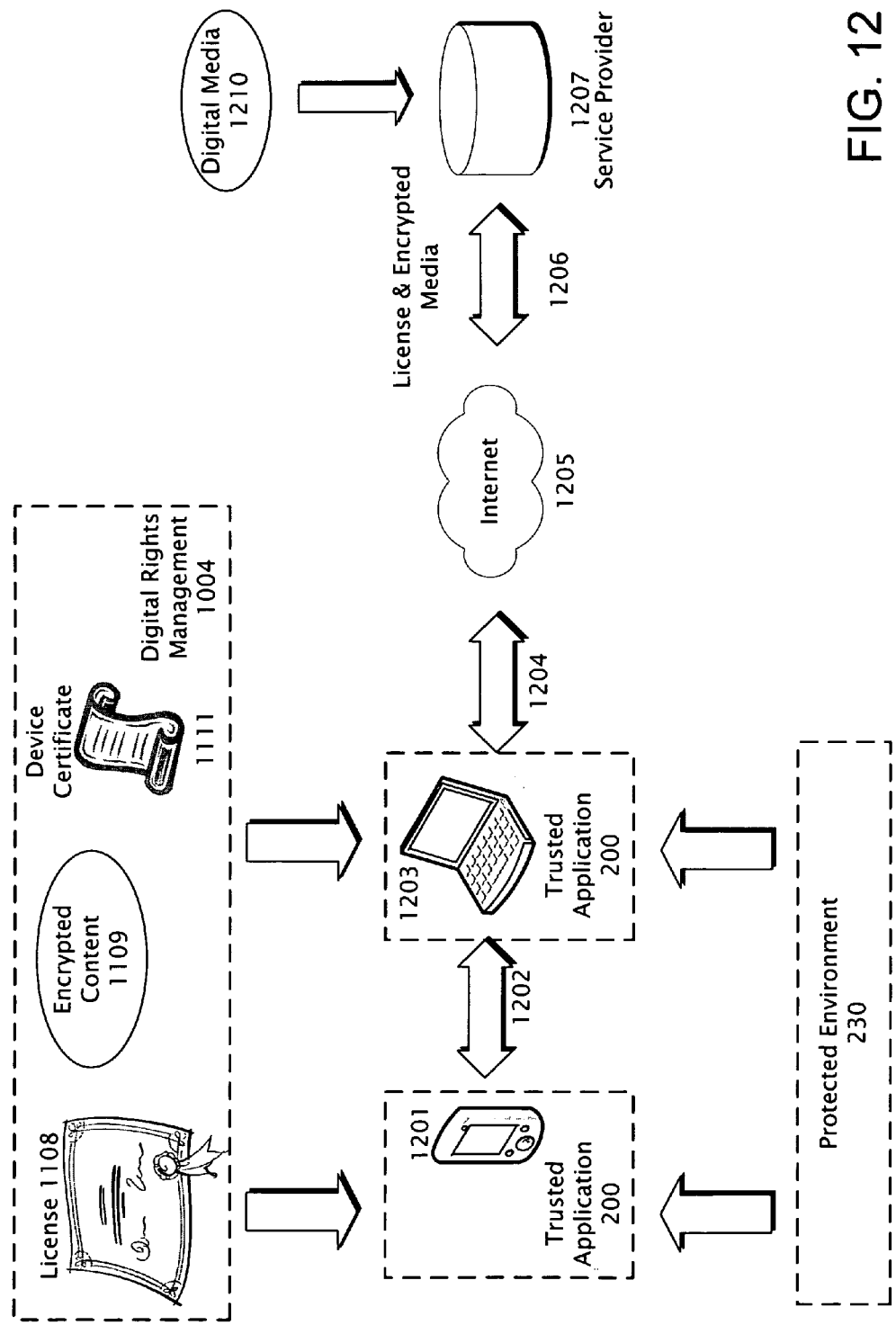
FIG. 12 is a block diagram showing a system for downloading digital media content from a service provider that utilizes an exemplary trusted application utilizing a protected environment.

FIG. 12 is a block diagram showing a system for downloading digital media content 1210 from a service provider 1207 to an exemplary trusted application 200 utilizing a protected environment 230. In the example shown the trusted application 200 is shown being employed in two places 1201, 1203. The trusted application 200 may be used in a CE device 1201 or a PC 1203. Digital media 1210 may be downloaded via a service provider 1207 and the Internet 1205 for use by the trusted application 200. Alternatively, digital media may be made available to the trusted application via other mechanisms such as a network, a CD or DVD disk, or other storage media. Further, the digital media 1210 may be provided in an encrypted form 1109 requiring a system of decryption keys, licenses, certificates and/or the like which may take the form of a digital rights management system 1004. The data or media content 1210 provided to the trusted application may or may not be protected, i.e, encrypted or the like.

In one example, a trusted application 200 may utilize a digital rights management ("DRM") system 1004 or the like along with a protected environment 230. In this case, the trusted application 200 is typically designed to acknowledge, and adhere to, the content's usage policies by limiting usage of the content to that authorized by the content provider via the policies. Implementing this may involve executing code which typically interrogates content licenses and subsequently makes decisions about whether or not a requested action can be taken on a piece of content. This functionality may be provided, at least in part, by a digital rights management system 1004. An example of a Digital Rights Management system is provided in U.S. patent application Ser. No. 09/290,363, filed Apr. 12, 1999, U.S. patent application Ser. Nos. 10/185,527, 10/185,278, and 10/185,511, each filed on Jun. 28, 2002 which are hereby incorporated by reference in its entirety.

Building a trusted application 200 that may be utilized in the CE device 1201 or the PC 1203 may include making sure the trusted application 200 which decrypts and processes the content 1109 may be "secure" from malicious attacks. Thus, a protected environment 230 typically refers to an environment that may not be easy to attack.

As shown, the trusted applications 200 operate in a consumer electronics device 1201, which can be periodically synced to a PC 1203 that also provides a trusted application. The PC 1203 is in turn coupled 1204 to the internet 1205. The internet connection allows digital media 1210 to be provided by a service provider 1207. The service provider 1207 may transmit licenses and encrypted media 1206 over the internet 1205 to trusted application 200. Once encrypted media is delivered and decrypted it may be susceptible to various forms of attack.

A protected computing environment tends to provide an environment that limit hackers from gaining access to unauthorized content. A hacker may include hackers acting as a systems administrator. A systems administrator typically has full control of virtually all of the processes being executed on a computer, but this access may not be desirable. For example, if a system user has been granted a license to use a media file it should not be acceptable for a system administrator different from the user to be able to access the media file. A protected environment tends to contribute to the creation of a process in which code that decrypts and processes content can operate without giving hackers access to the decrypted content. A protected environment may also limit unauthorized access to users of privilege, such as administrators, and/or any other user, who may otherwise gain unauthorized access to protected content. Protection may include securing typical user mode (FIG. 9, 903) processes and kernel mode (FIG. 9, 904) processes and any data they may be processing.

Processes operating in the kernel may be susceptible to attack. For example, in the kernel of a typical operating system objects are created, including processes, which may allow unlimited access by an administrator. Thus, an administrator, typically with full access privileges, may access virtually all processes.

Protected content may include policy or similar information indicating the authorized use of the content. Such policy may be enforced via a DRM system or other mechanism. Typically, access to the protected content is granted through the DRM system or other security mechanism, which may enforce policy. However, a system administrator, with full access to the system, may alter the state of the DRM system or mechanism to disregard the content policy.

A protected environment tends to provide a protected space that restricts unauthorized access to media content being processed therein, even for high-privilege users such as an administrator. When a protected environment is used in conjunction with a system of digital rights management or the like, a trusted application may be created in which a content provider may feel that adequate security is provided to protect digital media from unauthorized access and may also protect the content's policy from be tampered with along with any other data, keys or protection mechanisms that may be associated with the media content.

Current operating system ("OS") architectures typically present numerous possible attack vectors that could compromise a media application and any digital media content being processed. For purposes of this example, attacks that may occur in an OS are grouped into two types of attacks, which are kernel mode attacks and user mode attacks.

The first type of attack is the kernel mode attack. Kernel mode is typically considered to be the trusted base of the operating system. The core of the operating system, most system and peripheral drivers operate in kernel mode. Typically any piece of code running in the kernel is susceptible to intrusion by any other piece of code running in the kernel, which tends not to be the case for user mode. Also, code running in kernel mode typically has access to substantially all user mode processes. A CPU may also provide privilege levels for various code types. Kernel mode code is typically assigned the highest level of privilege by such a CPU, typically giving it full access to the system.

The second type of attack is the user mode attack. Code that runs in user mode may or may not be considered trusted code by the system depending on the level of privilege it has been assigned. This level of privilege may be determined by the user context or account in which it is operating. User mode code running in the context of an administrator account may have full access to the other code running on the system. In addition, code that runs in user mode may be partitioned to prevent one user from accessing another's processes.

These attacks may be further broken down into specific attack vectors. The protected environment is typically designed to protect against unauthorized access that may otherwise be obtained via one or more of these attack vectors. The protected environment may protect against attack vectors that may include: process creation, malicious user mode applications, loading malicious code into a process, malicious kernel code, invalid trust authorities, and external attack vectors.

Process creation is a possible attack vector. An operating system typically includes a "create process" mechanism that allows a parent process to create a child process being created. A malicious parent process may, by modifying the create process code or by altering the data it creates, make unauthorized modifications to the child process. This could result in compromising digital media that may be processed by a child process created by a malicious parent process.

Malicious user mode applications are a possible attack vector. An operating system typically includes administrator level privileges. Processes running with administrator privileges may have unlimited access to many operating system mechanisms and to nearly all processes running on the computer. Thus, in Windows for example, a malicious user mode application running with administrator privileges may gain access to many other processes running on the computer and may thus compromise digital media. Similarly, processes operating in the context of any user may be attacked by any malicious process operating in the same context.

Loading malicious code into a secure process is a possible attack vector. It may be possible to append or add malicious code to a process. Such a compromised process cannot be trusted and may obtain unauthorized access to any media content or other data being processed by the modified process.

Malicious kernel mode code is a possible attack vector. An operating system typically includes a "system level" of privilege. In Windows, for example, all code running in kernel mode is typically running as system and therefore may have maximum privileges. The usual result is that all drivers running in kernel mode have maximum opportunity to attack any user mode application, for example. Such an attack by malicious kernel mode code may compromise digital media.

Invalid trust authorities (TAs) are a possible attack vector. TAs may participate in the validation of media licenses and may subsequently "unlock" the content of a digital media. TAs may be specific to a media type or format and may be implemented by media providers or their partners. As such, TAs may be pluggable and/or may be provided as dynamic link libraries ("DLL"). A DLL or the like may be loaded by executable code, including malicious code. In order for a TA to ensure that the media is properly utilized it needs to be able to ensure that the process in which it is running is secure. Otherwise the digital media may be compromised.

External attacks are another possible attack vector. There are a set of attacks that don't require malicious code running in a system in order to attack it. For instance, attaching a debugger to a process or a kernel debugger to the machine, looking for sensitive data in a binary file on a disk, etc., are all possible mechanisms for finding and compromising digital media or the processes that can access digital media.

Figure 13:
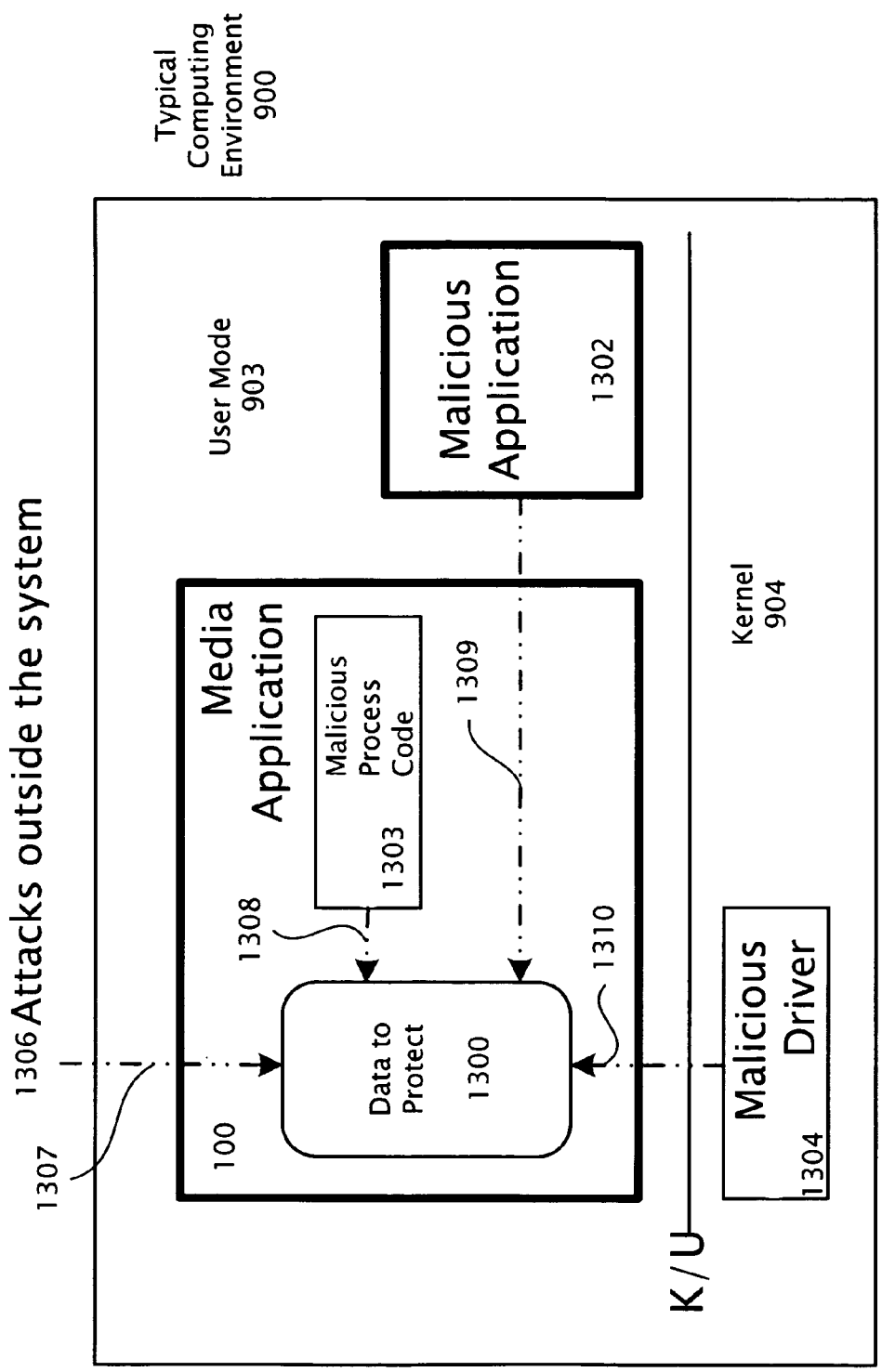
FIG. 13 is a block diagram showing exemplary attack vectors that may be exploited by a user or mechanism attempting to access media content or other data typically present in a computing environment in an unauthorized manner.

FIG. 13 is a block diagram showing exemplary attack vectors 1307-1310 that may be exploited by a user or mechanism attempting to access media content or other data 1300 typically present in a computing environment 900 in an unauthorized manner. A protected environment may protect against these attack vectors such that unauthorized access to trusted applications and the data they process is limited and resistance to attack is provided. Such attacks may be made by users of the system or mechanisms that may include executable code. The media application 100 is shown at the center of the diagram and the attack vectors 1307-1310 tend to focus on accessing sensitive data 1300 being stored and/or processed by the application 100.

A possible attack vector 1309 may be initiated via a malicious user mode application 1302. In the exemplary operating system architecture both the parent of a process, and any process with administrative privileges, typically have unlimited access to other processes, such as one processing media content, and the data they process. Such access to media content may be unauthorized. Thus a protected environment may ensure that a trusted application and the media content it processes are resistant to attacks by other user mode applications and/or processes.

A possible attack vector 1308 is the loading of malicious code 1303 into a process 1301. Having a secure process that is resistant to attacks from the outside is typically only as secure as the code running on the inside forming the process. Given that DLLs and other code are typically loaded into processes for execution, a mechanism that may ensure that the code being loaded is trusted to run inside a process before loading it into the process may be provided in a protected environment.

A possible vector of attack 1310 is through malicious kernel mode code 1304. Code running in kernel mode 904 typically has maximum privileges. The result may be that drivers running in kernel mode may have a number of opportunities to attack other applications. For instance, a driver may be able to access memory directly in another process. The result of this is that a driver could, once running, get access to a processes memory which may contain decrypted "encrypted media content" (FIG. 11, 1109). Kernel Mode attacks may be prevented by ensuring that the code running in the kernel is non-malicious code, as provided by this example.

A possible attack vector 1307 is by external attacks 1306 to the system 900. This group represents the set of attacks that typically do not require malicious code to be running on the system 900. For instance, attaching a debugger to an application and/or a process on the system, searching a machine 900 for sensitive data, etc. A protected environment may be created to resist these types of attacks.

Figure 14:
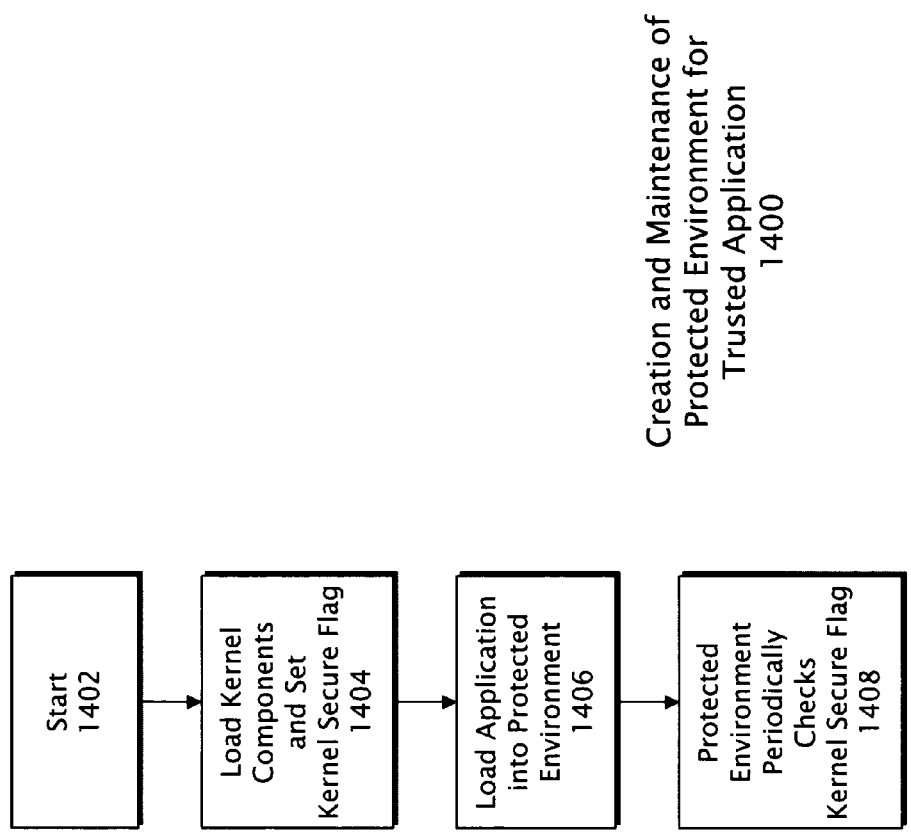
FIG. 14 is a flow diagram showing the process for creating and maintaining a protected environment that tends to limit unauthorized access to media content and other data.

FIG. 14 is a flow diagram showing the process 1400 for creating and maintaining a protected environment that tends to limit unauthorized access to media content and other data. The sequence 1400 begins when a computer system is started 1402 and the kernel of the operating system is loaded and a kernel secure flag is set 1404 to an initial value. The process continues through the time that a protected environment is typically created and an application is typically loaded into it 1406. The process includes periodic checking 1408 via the protected environment that seeks to ensure the system remains secure through the time the secure process is needed.

The term "kernel", as used here, is defined as the central module of an operating system for a computing environment, system or device. The kernel module may be implemented in the form of computer-executable instructions and/or electronic logic circuits. Typically, the kernel is responsible for memory management, process and task management, and storage media management of a computing environment. The term "kernel component", as used here, is defined to be a basic controlling mechanism, module, computer-executable instructions and/or electronic logic circuit that forms a portion of the kernel. For example, a kernel component may be a "loader", which may be responsible for loading other kernel components in order to establish a fully operational kernel.

To summarize the process of creating and maintaining a protected environment:

1. Block 1402 represents the start-up of a computer system. This typically begins what is commonly known as the boot process and includes loading an operating system from disk or some other storage media.

2. Typically one of the first operations during the boot process is the loading of the kernel and its components. This example provides the validation of kernel components and, if all are successfully validated as secure, the setting of a flag indicating the kernel is secure. This is shown in block 1404.

3. After the computer system is considered fully operational a user may start an application such as a trusted media player which may call for a protected environment. This example provides a secure kernel with an application operating in a protected environment, as shown in block 1406.

4. Once the protected environment has been created and one or more of the processes of the application have been loaded into it and are operating, the trusted environment may periodically check the kernel secure flag to ensure the kernel remains secure, as shown in block 1408. That is, from the point in time that the trusted application begins operation, a check may be made periodically to determine whether any unauthorized kernel components have been loaded. Such unauthorized kernel components could attack the trusted application or the data it may be processing. Therefore, if any such components are loaded, the kernel secure flag may be set appropriately.

Figure 15:
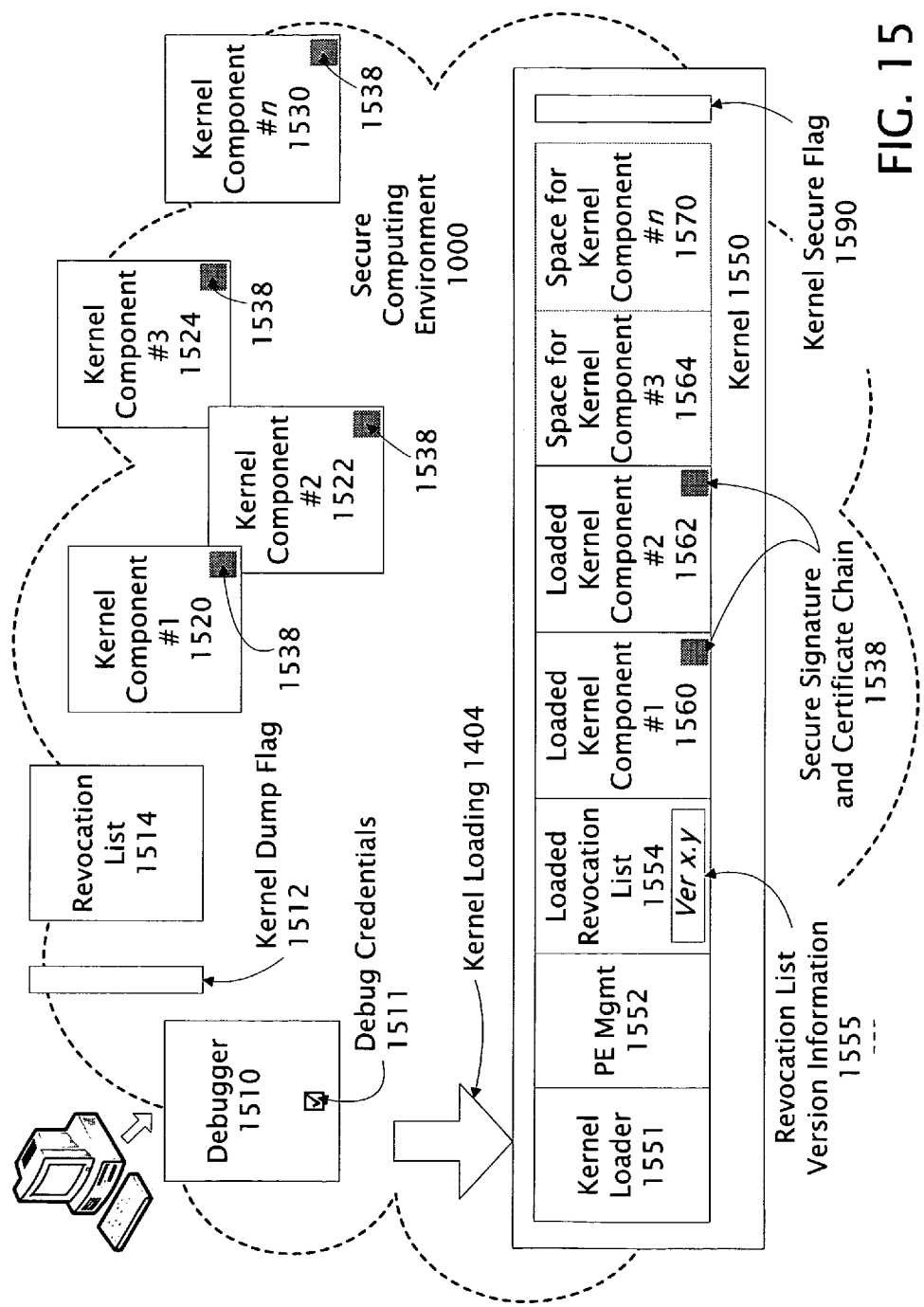
FIG. 15 is a block diagram showing exemplary kernel components and other components utilized in creating an exemplary secure computing environment.

FIG. 15 is a block diagram showing exemplary kernel components 1520-1530 and other components 1510-1514 utilized in creating an exemplary secure computing environment 1000. This figure shows a computer system containing several components 1510-1530 typically stored on a disk or the like, several of which are used to form the kernel of an operating system when a computer is started. Arrow 1404 indicates the process of loading the kernel components into memory forming the operational kernel of the system. The loaded kernel 1550 is shown containing its various components 1551-1562 and a kernel secure flag 1590 indicating whether or not the kernel is considered secure for a protected environment. The kernel secure flag 1590 being described as a "flag" is not meant to be limiting; it may be implemented as a boolean variable or as a more complex data structure or mechanism.

Kernel components 1520-1530 are typically "signed" and may include certificate data 1538 that may enable the kernel to validate that they are the components they claim to be, that they have not been modified and/or are not malicious. A signature block and/or certificate data 1538 may be present in each kernel component 1520-1530 and/or each loaded kernel component 1560, 1562. The signature and/or certificate data 1538 may be unique to each component. The signature and/or certificate data 1538 may be used in the creation and maintenance of protected environments as indicated below. Typically a component is "signed" by its provider in such as way as to securely identify the source of the component and/or indicate whether it may have been tampered with. A signature may be implemented as a hash of the component's header or by using other techniques. A conventional certificate or certificate chain may also be included with a component that may be used to determine if the component can be trusted. The signature and/or certificate data 1538 are typically added to a component before it is distributed for public use. Those skilled in the art will be familiar with these technologies and their use.

When a typical computer system is started or "booted" the operating system's loading process or "kernel loader" 1551 will typically load the components of the kernel from disk or the like into a portion of system memory to form the kernel of the operating system. Once all of the kernel components are loaded and operational the computer and operating system are considered "booted" and ready for normal operation.

Kernel component #1 1520 thru kernel component #n 1530, in the computing environment, may be stored on a disk or other storage media, along with a revocation list 1514, a kernel dump flag 1512 and a debugger 1510 along with a debug credential 1511. Arrow 1404 indicates the kernel loading process which reads the various components 1514-1530 from their storage location and loads them into system memory forming a functional operating system kernel 1550. The kernel dump flag 1512 being described as a "flag" is not meant to be limiting; it may be implemented as a boolean variable or as a more complex data structure or mechanism.

The kernel loader 1551 along with the PE management portion of the kernel 1552, the revocation list 1554 and two of the kernel components 1520 and 1522 are shown loaded into the kernel, the latter as blocks 1560 and 1562, along with an indication of space for additional kernel components yet to be loaded into the kernel, 1564 and 1570. Finally, the kernel 1550 includes a kernel secure flag 1590 which may be used to indicate whether or not the kernel 1550 is currently considered secure or not. This illustration is provided as an example and is not intended to be limiting or complete. The kernel loader 1551, the PE management portion of the kernel 1552 and/or the other components of the kernel are shown as distinct kernel components for clarity of explanation but, in actual practice, may or may not be distinguishable from other portions of the kernel.

Included in the computing environment 1000 may be a revocation list 1514 that may be used in conjunction with the signature and certificate data 1538 associated with the kernel components 1560 and 1562. This object 1514 may retain a list of signatures, certificates and/or certificate chains that are no longer considered valid as of the creation date of the list 1514. The revocation list 1514 is shown loaded into the kernel as object 1554. Such lists are maintained because a validly-signed and certified component, for example components 1560 and 1562, may later be discovered to have some problem. The system may use such a list 1554 to check kernel components 1520-1530 as they are loaded, which may be properly signed and/or have trusted certificate data 1538, but that may have subsequently been deemed untrustworthy. Such a revocation list 1554 will typically include version information 1555 so that it can more easily be identified, managed and updated as required.

Another component of the system that may impact kernel security is a debugger 1510. Debuggers may not typically be considered a part of the kernel but may be present in a computing environment 1000. Debuggers, including those known as kernel debuggers, system analyzers, and the like, may have broad access to the system and the processes running on the system along with any data present. A debugger 1510 may be able access any data in a computing environment 1000, including media content that should not be accessed in a manner other than that authorized. On the other hand, debugging is typically a part of developing new functionality and it should be possible to debug within protected environments the code intended to process protected media content. A debugger 1510 may thus include debug credentials 1511 which may indicate that the presence of the debugger 1510 on a system is authorized. Thus detection of the presence of a debugger 1510 along with any accompanying credentials 1511 may be a part of the creation and maintenance of protected environments (FIG. 14, 1400).

The computing environment 1000 may include a kernel dump flag 1512. This flag 1512 may be used to indicate how much of kernel memory is available for inspection in case of a catastrophic system failure. Such kernel dumps may be used for postmortem debugging after such as failure. If such a flag 1512 indicates that system memory is available for inspection upon a dump then the kernel 1550 may be considered insecure as hacker could run an application which exposes protected media in system memory and then force a catastrophic failure condition which may result in the system memory being available for inspection, including that containing the exposed media content. Thus a kernel dump flag 1512 may be used in the creation and maintenance of a protected environments (FIG. 14, 1400).

Figure 16:
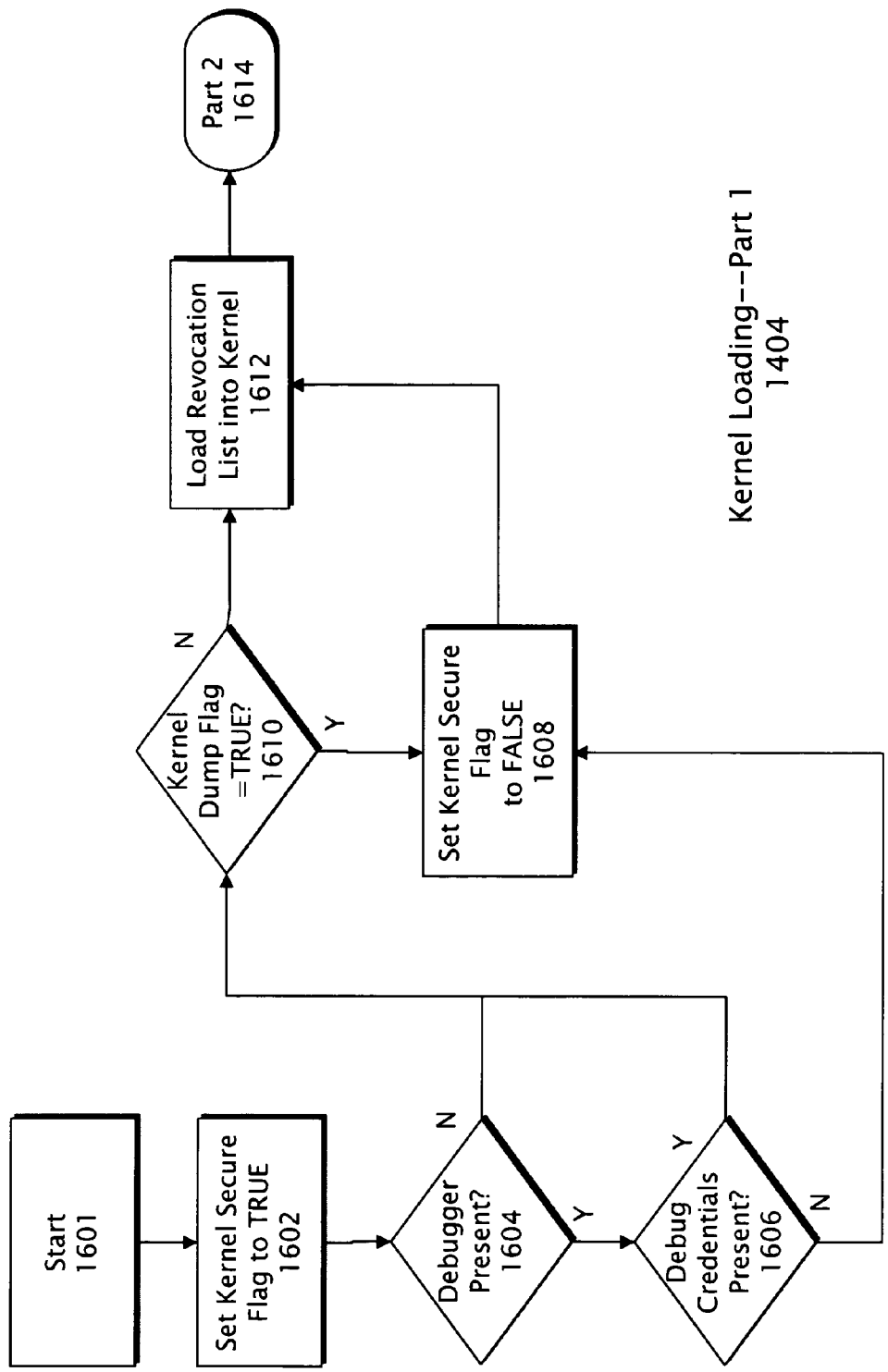
FIG. 16 and FIG. 17 are flow diagrams showing an exemplary process for loading kernel components to create an exemplary secure computing environment.
Figure 17:
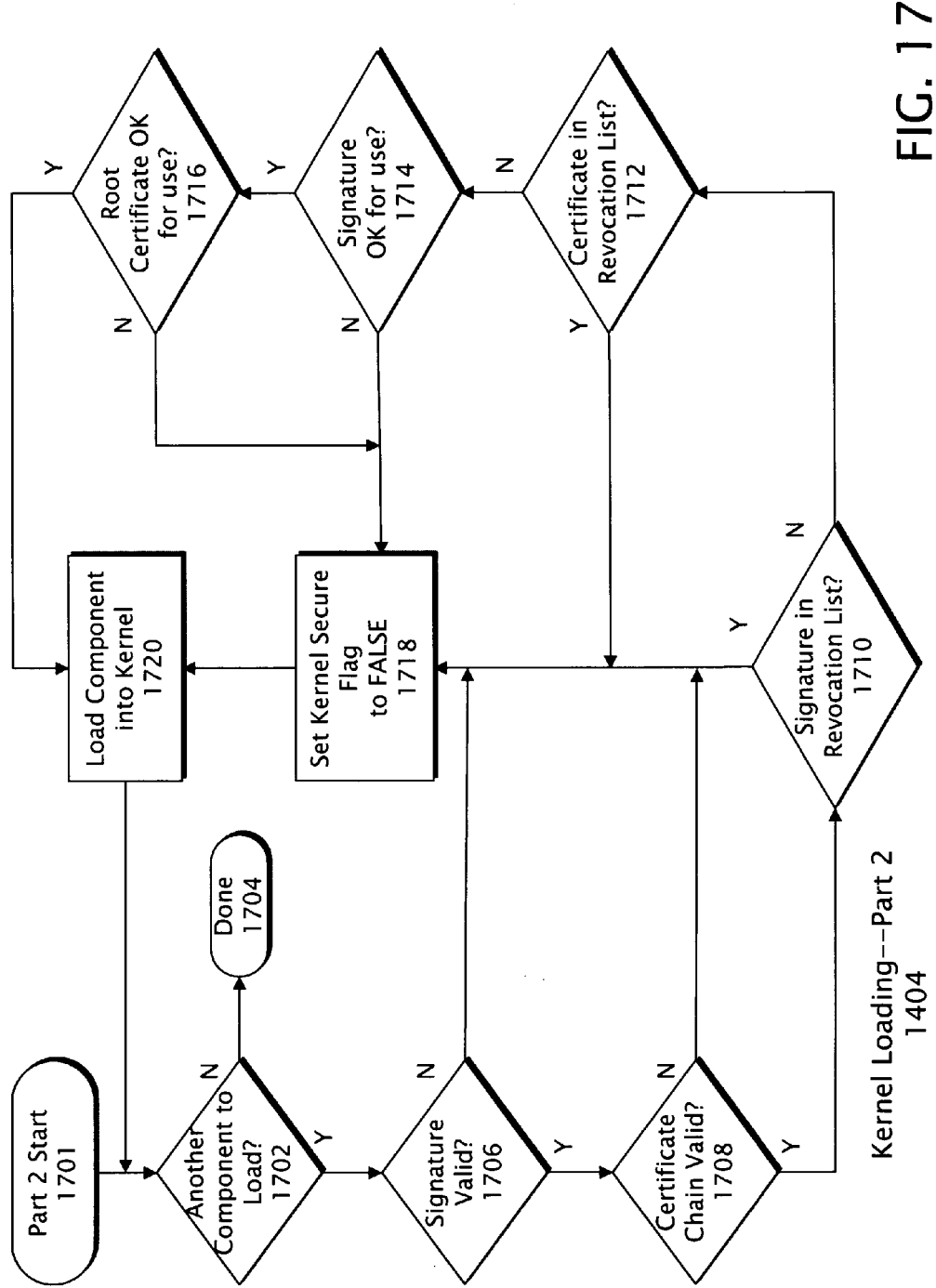

FIG. 16 and FIG. 17 are flow diagrams showing an exemplary process 1404 for loading kernel components to create an exemplary secure computing environment. This process 1404 begins after the kernel loader has been started and the PE management portion of the kernel has been loaded and made operational. Not shown in these figures, the PE management portion of the kernel may validate the kernel loader itself and/or any other kernel elements that may have been previously loaded. Validation is usually defined as determining whether or not a given component is considered secure and trustworthy as illustrated in part 2 of this process 1404.

The term "authorized for secure use" and the like as used below with respect to kernel components has the following specific meaning. A kernel containing any components that are not authorized for secure use does not provide a secure computing environment within which protected environments may operate. The opposite may not be true as it depends on other factors such as attack vectors.

1. Block 1601 shows the start of the loading process 1404 after the PE management portion of the kernel has been loaded and made operational. Any component loaded in the kernel prior to this may be validated as described above.

2. Block 1602 shows the kernel secure flag initially set to TRUE unless any component loaded prior to the PE management portion of the kernel, or that component itself, is found to be insecure at which point the kernel secure flag may be set to FALSE. In practice the indication of TRUE or FALSE may take various forms; the use of TRUE or FALSE here is only an example and is not meant to be limiting.

3. Block 1604 indicates a check for the presence of a debugger in the computing environment. Alternatively a debugger could reside remotely and be attached to the computing environment via a network or other communications media to a process in the computing environment. If no debugger is detected the loading process 1404 continues at block 1610. Otherwise it continues at block 1609. Not shown in the diagram, this check may be performed periodically and the state of the kernel secure flag updated accordingly.

4. If a debugger is detected, block 1606 shows a check for debug credentials which may indicate that debugging is authorized on the system in the presence of a protected environment. If such credentials are not present, the kernel secure flag may be set to FALSE as shown in block 1608. Otherwise the loading process 1404 continues at block 1610.

5. Block 1610 shows a check of the kernel dump flag. If this flag indicates that a full kernel memory dump or the like is possible then the kernel secure flag may be set to FALSE as shown in block 1608. Otherwise the loading process 1404 continues at block 1612. Not shown in the diagram, this check may be performed periodically and the state of the kernel secure flag updated accordingly.

6. Block 1612 shows the loading of the revocation list into the kernel. In cases where the revocation list may be used to check debug credentials, or other previously loaded credentials, signatures, certificate data, or the like, this step may take place earlier in the sequence (prior to the loading of credentials and the like to be checked) than shown. Not shown in the diagram is that, once this component is loaded, any and all previously loaded kernel components may be checked to see if their signature and/or certificate data has been revoked per the revocation list. If any have been revoked, the kernel secure flag may be set to FALSE and the loading process 1404 continues at block 1614. Note that a revocation list may or may not be loaded into the kernel to be used in the creation and maintenance of a protected environments.

7. Block 1614 shows the transition to part 2 of this diagram shown in FIG. 17 and continuing at block 1701.

8. Block 1702 shows a check for any additional kernel components to be loaded. If all components have been loaded then the load process 1404 is usually complete and the kernel secure flag remains in whatever state it was last set to, either TRUE or FALSE. If there are additional kernel components to be loaded the load process 1404 continues at block 1706.

9. Block 1706 shows a check for a valid signature of the next component to be loaded. If the signature is invalid then the kernel secure flag may be set to FALSE as shown in block 1718. Otherwise the loading process 1404 continues at block 1708. If no component signature is available the component may be considered insecure and the kernel secure flag may be set to FALSE as shown in block 1718. Signature validity may be determined by checking for a match on a list of valid signatures and/or by checking whether the signer's identity is a trusted identity. As familiar to those skilled in the security technology area, other methods could also be used to validate component signatures.

10. Block 1708 shows a check of the component's certificate data. If the certificate data is invalid then the kernel secure flag may be set to FALSE as shown in block 1718. Otherwise the loading process 1404 continues at block 1710. If no component certificate data is available the component may be considered insecure and the kernel secure flag may be set to FALSE as shown in block 1718. Certificate data validity may be determined by checking the component's certificate data to see if the component is authorized for secure use. As familiar to those skilled in the art, other methods could also be used to validate component certificate data.

11. Block 1710 shows a check of the component's signature against a revocation list. If the signature is present on the list, indicating that it has been revoked, then the kernel secure flag may be set to FALSE as shown in block 1718. Otherwise the loading process 1404 continues at block 1712.

12. Block 1712 shows a check of the component's certificate data against a revocation. If the certificate data is present on the list, indicating that it has been revoked, then the kernel secure flag may be set to FALSE as shown in block 1718. Otherwise the loading process 1404 continues at block 1714.

13. Block 1714 shows a check of the component's signature to determine if it is OK for use. This check may be made by inspecting the component's leaf certificate data to see if the component is authorized for secure use. Certain attributes in the certificate data may indicate if the component is approved for protected environment usage. If not the component may not be appropriately signed and the kernel secure flag may be set to FALSE as shown in block 1718. Otherwise the loading process 1404 continues at block 1716.

14. Block 1716 shows a check of the component's root certificate data. This check may be made by inspecting the component's root certificate data to see if it is listed on a list of trusted root certificates. If not the component may be considered insecure and the kernel secure flag may be set to FALSE as shown in block 1718. Otherwise the loading process 1404 continues at block 1720.

15. Block 1720 shows the loading of the component into the kernel where it is now considered operational. Then the loading process 1404 returns to block 1702 to check for any further components to be loaded.

Figure 18:
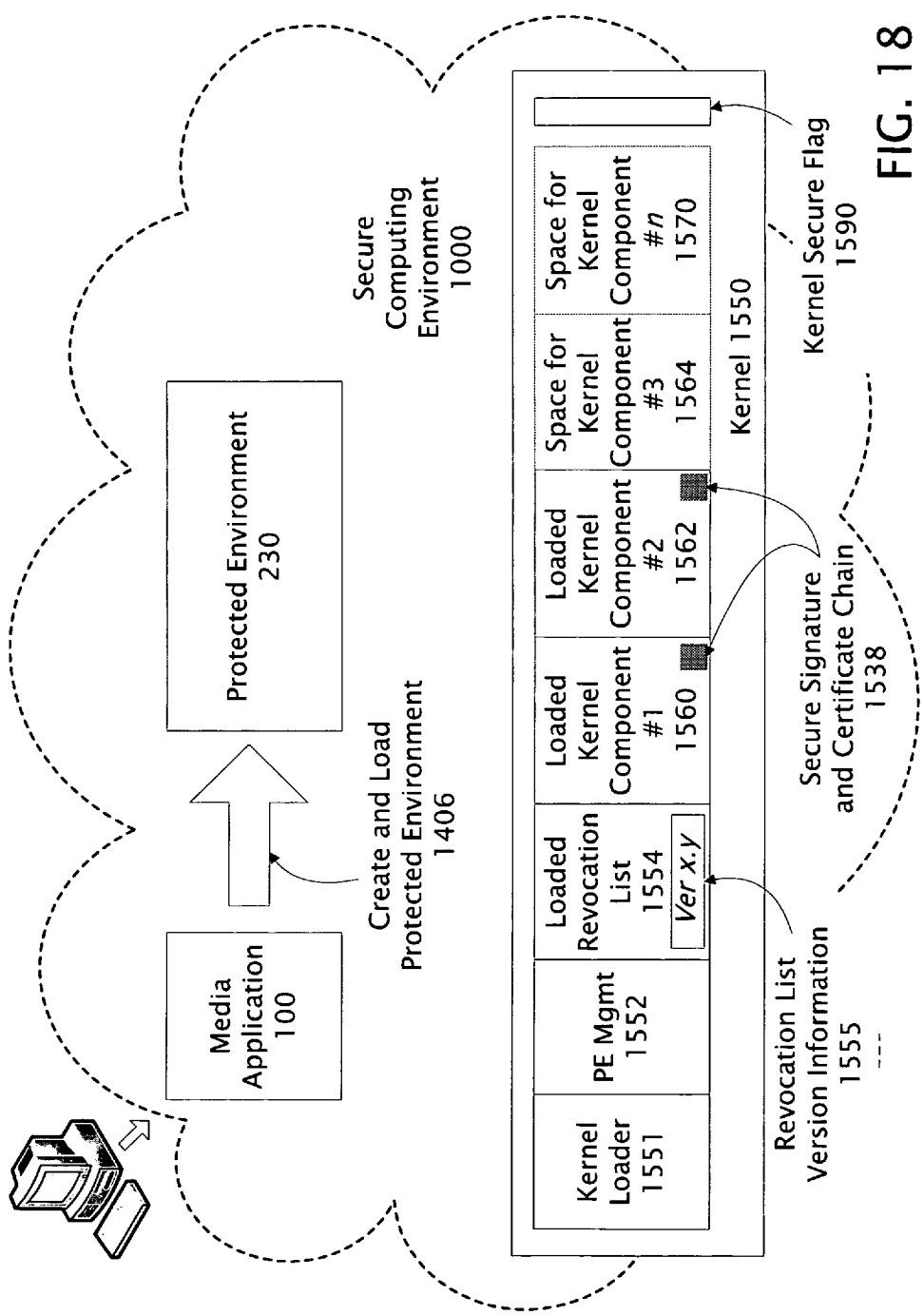
FIG. 18 is a block diagram showing a secure computing environment loading an application into an exemplary protected environment to form a trusted application that may be resistant to attack.

FIG. 18 is a block diagram showing a secure computing environment 1000 loading an application 100 into an exemplary protected environment 230 to form a trusted application that may be resistant to attack. In this example the kernel may be the same as that described in FIG. 15, has already been loaded and the system 1000 is considered fully operational. At this point, as an example, a user starts media application 100. The media application 100 may call for the creation of a protected environment 230 for one or more of its processes and/or components to operate within. The protected environment creation process 1406 creates the protected environment 230 and loads the application 100 and/or its components as described below.

Figure 19:
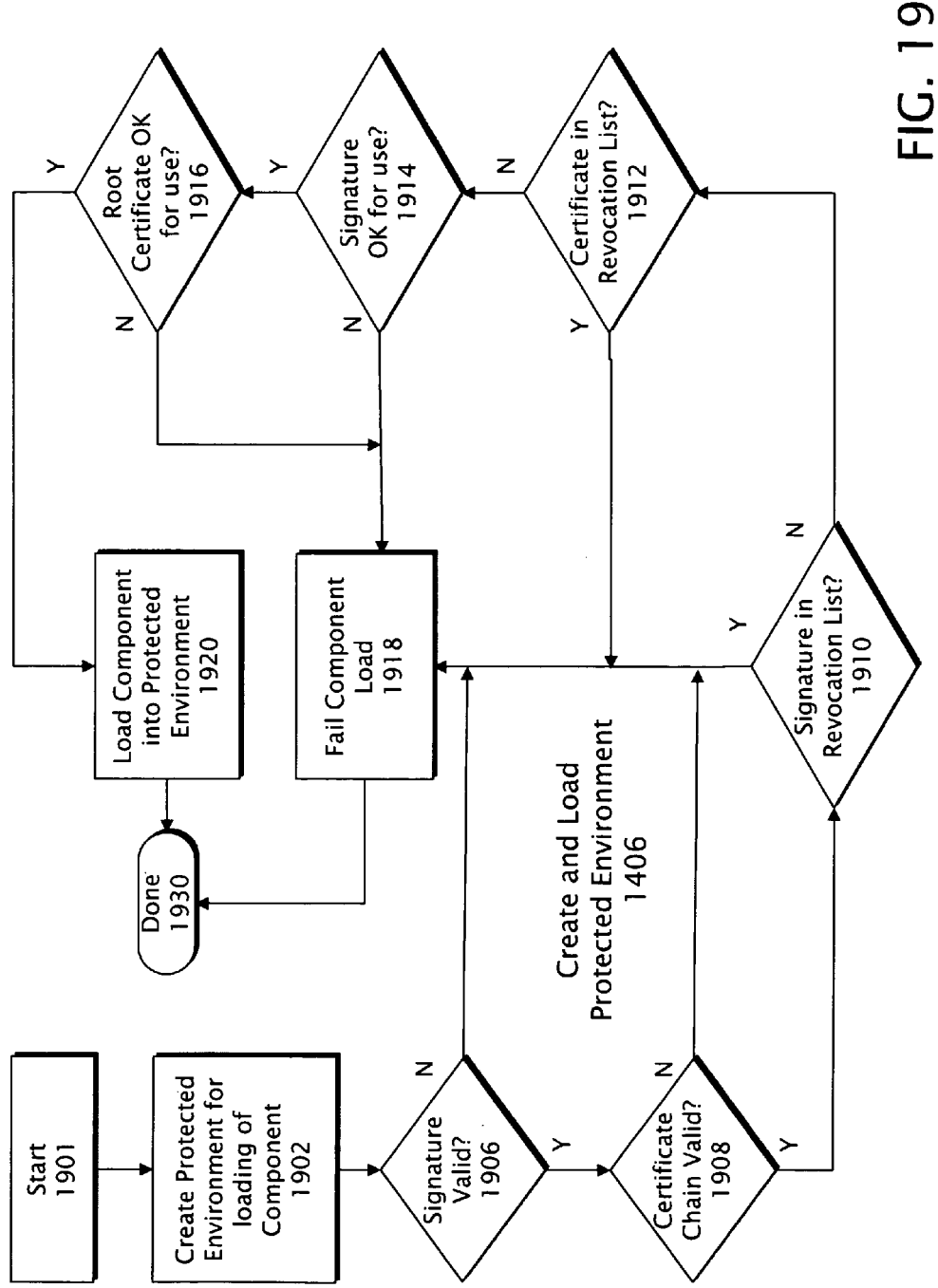
FIG. 19 is a flow diagram showing an exemplary process for creating a protected environment and loading an application into the protected environment.

FIG. 19 is a flow diagram showing an exemplary process 1406 for creating a protected environment and loading an application into the protected environment. This process 1406 includes the initial step of creating a secure process followed by validating the software component to be loaded into it and then loading the software component into the new secure process and making it operational. Upon success, the result may be a software component operating in a protected environment supported by a secure kernel. Such a software component, along with any digital media content or other data it processes, may be protected from various attacks, including those described above.

1. Block 1901 shows the start of the protected environment creation process 1406. This point is usually reached when some application or code calls for a protected environment to operate.

2. Block 1902 shows the establishment of a protected environment. While not shown in the diagram, this may be accomplished by requesting the operating system to create a new secure process. Code later loaded and operating in this secure process may be considered to be operating in a protected environment. If the kernel secure flag is set to FALSE then the "create new secure process" request may fail. This may be because the system as a whole is considered insecure and unsuitable for a protected environment and any application or data requiring a protected environment. Alternatively, the "create new secure process" request may succeed and the component loaded into the new process may be informed that the system is considered insecure so that it can modify its operations accordingly. Otherwise the process 1406 continues at block 1906.

3. Block 1906 shows a check for a valid signature of the software component to be loaded into the new secure process or protected environment. If the signature is invalid then the process 1406 may fail as shown in block 1918. Otherwise the process 1406 continues at block 1908. Not shown in the process is that the program, or its equivalent, creating the new secure process may also be checked for a valid signature and the like. Thus, for either the component itself and/or the program creating the new secure process, if no signature is available the component may be considered insecure and the process 1406 may fail as shown in block 1918. Signature validity may be determined by checking for a match on a list of valid signatures and/or by checking whether the signer's identity is a trusted identity. As familiar to those skilled in the security technology area, other methods could also be used to validate component signatures.

4. Block 1908 shows a check of the software component's certificate data. If the certificate data is invalid then the process 1406 may fail as shown in block 1918. Otherwise the process 1406 continues at block 1910. If no component certificate data is available the component may be considered insecure and the process 1406 may fail as shown in block 1918. Certificate data validity may be determined by checking the component's certificate data to see if the component is authorized for secure use. As familiar to those skilled in the art, other methods could also be used to validate component certificate data.

5. Block 1910 shows a check of the component's signature against a revocation list. If the signature is present on the list, indicating that it has been revoked, then the process 1406 may fail as shown in block 1918. Otherwise the process 1406 continues at block 1912.

12. Block 1912 shows a check of the component's certificate data against the revocation list. If the certificate data is present on the list, indicating that it has been revoked, then the process 1406 may fail as shown in block 1918. Otherwise the process 1406 continues at block 1914.

13. Block 1914 shows a check of the component's signature to determine if it is acceptable for use. This check may be made by inspecting the component's leaf certificate data to see if the component is authorized for secure use. Certain attributes in the certificate data may indicate if the component is approved for protected environment usage. If not the component may be considered to not be appropriately signed and the process 1406 may fail as shown in block 1918. Otherwise the process 1406 continues at block 1916.

14. Block 1916 shows a check of the component's root certificate data. This check may be made by inspecting the component's root certificate data to see if it is listed on a list of trusted root certificates. If not the component may be considered insecure and the process 1406 may fail as shown in block 1918. Otherwise the process 1406 continues at block 1920.

15. Block 1918 shows the failure of the software component to load followed by block 1930, the end of the protected environment creation process 1406.

16. Block 1920 shows the software component being loaded into the protected environment, where it is considered operational, followed by block 1930, the end of the protected environment creation process 1406.

Figure 20:
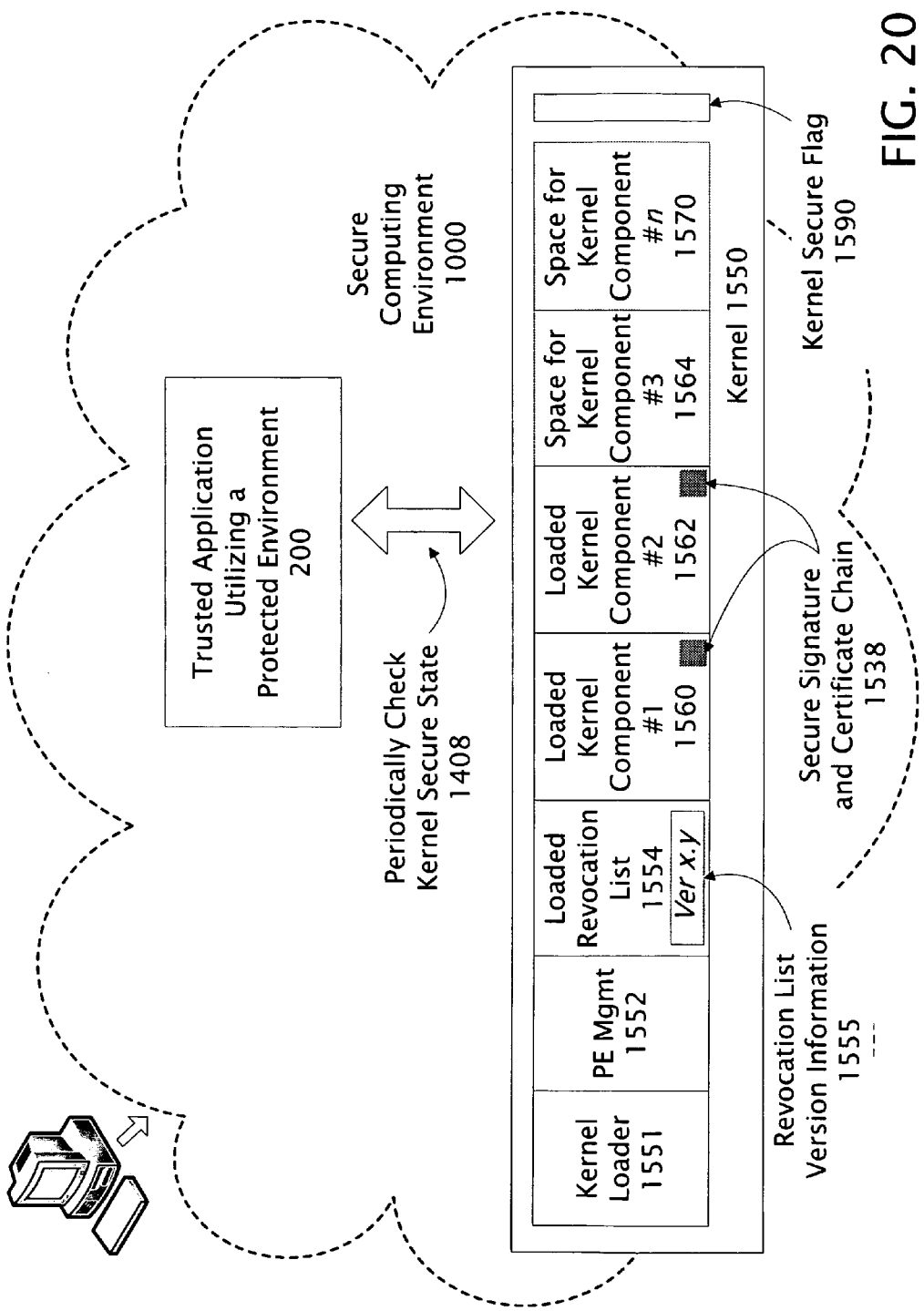
FIG. 20 is a block diagram showing an exemplary trusted application utilizing an exemplary protected environment periodically checking the security state of the secure computing environment.

FIG. 20 is a block diagram showing an exemplary trusted application utilizing an exemplary protected environment 230 periodically checking 1408 the security state 1590 of the secure computing environment 1000. In this example, the computing environment 1000 and the kernel 1550 may be the same as those described in FIG. 15 and FIG. 16. The kernel 1550 has already been loaded and the computer 1000 is considered fully operational. Further, a protected environment has been created and the appropriate components of the trusted application have been loaded into it and made operational, establishing a trusted application utilizing a protected environment 230, hereafter referred to simply as the "protected environment".

The protected environment 230 may periodically check with the PE management portion of the kernel 1552 to determine whether the kernel 1550 remains secure over time. This periodic check may be performed because it is possible for a new component to be loaded into the kernel 1550 at any time, including a component that may be considered insecure. If this were to occur, the state of the kernel secure flag 1590 may change to FALSE and the code operating in the protected environment 230 has the opportunity to respond appropriately.

For example, consider a media player application that was started on a PC 1000 with a secure kernel 1550 and a portion of the media player application operating in a protected environment 230 processing digital media content that is licensed only for secure use. In this example, if a new kernel component that is considered insecure is loaded while the media player application is processing the media content, then the check kernel secure state process 1040 would note the kernel secure flag 1590 has changed to FALSE indicating the kernel 1550 may no longer be secure.

Alternatively, the revocation list 1545 may be updated and a kernel component previously considered secure may no longer be considered secure, resulting in the kernel secure flag 1590 being set to FALSE. At this point the application may receive notification that the system 1000 is no longer considered secure and can terminate operation, or take other appropriate action to protect itself and/or the media content it is processing.

Figure 21:
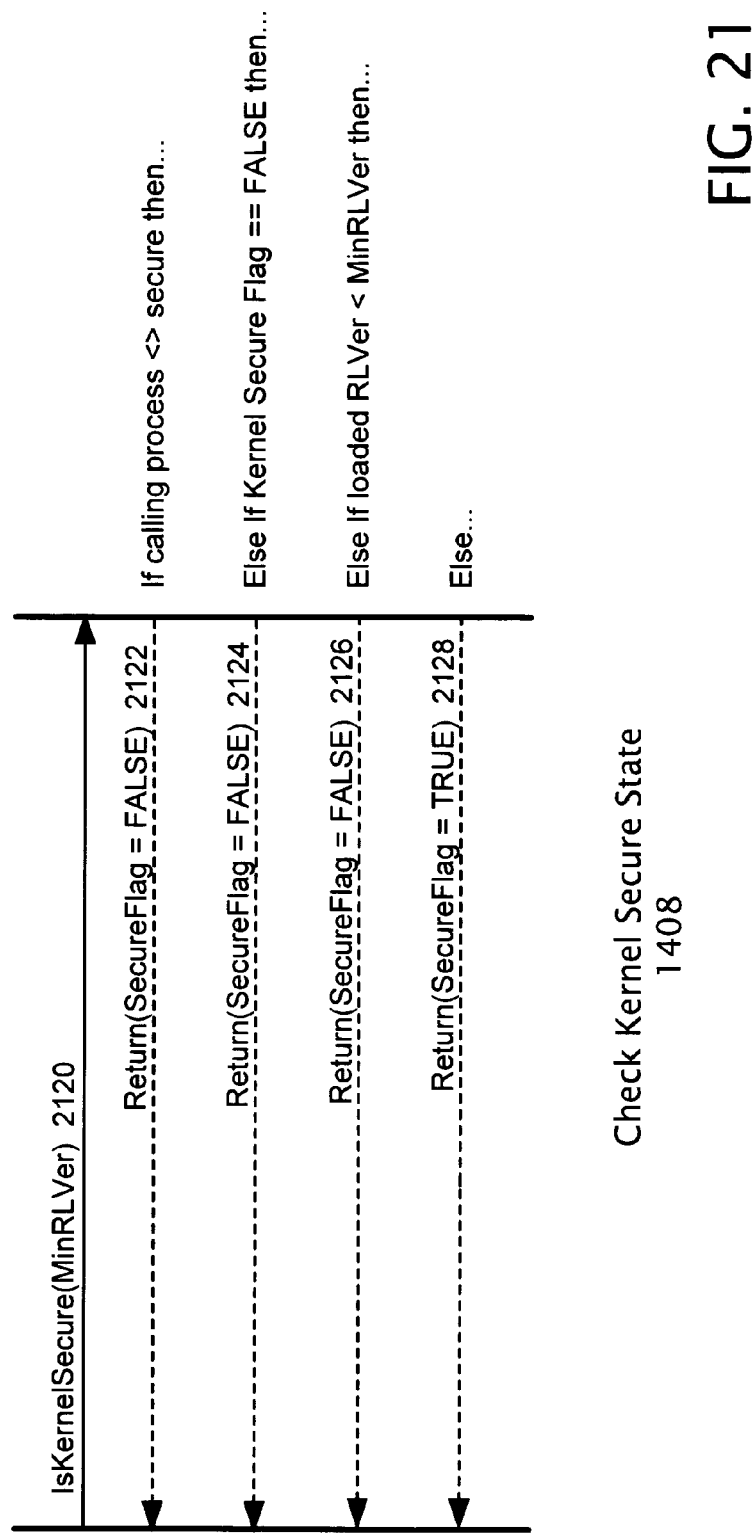
FIG. 21 is a flow diagram showing an exemplary process for periodically checking the security state of the secure computing environment.

FIG. 21 is a flow diagram showing an exemplary process 1408 for periodically checking the security state of the secure computing environment. This process 1408 may be used by a protected environment 230 to determine if the kernel remains secure over time. The protected environment 230 may periodically use this process 1408 to check the current security status of the kernel. The protected environment 230 and/or the software component operating within it may use the current security status information to modify its operation appropriately. Periodic activation of the process may be implemented using conventional techniques.

The diagram in FIG. 21 shows a sequence of communications 1408, illustrated with exemplary pseudo code, between the protected environment 230 and the PE management portion of the kernel 1552. This communication may include a check of the version of a revocation list which may give an application the ability to specify a revocation list of at least a certain version. This communications sequence may be cryptographically secured using conventional techniques.

1. The protected environment 230 makes a IsKernelSecure (MinRLVer) call 2120 to the PE management portion of the kernel to query the current security state of the kernel. Included in this call 2120 may be the minimum version (MinRLVer) of the revocation list expected to be utilized.

2. The PE management portion of the kernel checks to see if the protected environment, which is the calling process, is secure. If not, then it may provide a Return (SecureFlag=FALSE) indication 2122 to the protected environment and the communications sequence 1408 is complete. This security check may be done by the PE management portion of the kernel checking the protected environment for a valid signature and/or certificate data as described above.

3. Otherwise, the PE management portion of the kernel checks the kernel secure flag in response to the call 2120. If the state of the flag is FALSE then it may provide a Return (SecureFlag=FALSE) indication 2124 to the protected environment and the communications sequence 1408 is complete.

4. Otherwise, the PE management portion of the kernel checks the revocation list version information for the revocation list. If the revocation list has version information that is older than that requested in the IsKernelSecure(MinRLVer) call 2120 then several options are possible. First, as indicated in the diagram, the PE management portion of the kernel may provide a Return(SecureFlag=FALSE) indication 2126 to the protected environment and the communications sequence 1408 is complete.

Alternatively, and not shown in the diagram, an appropriate version revocation list may be located and utilized, all kernel components may be re-validated using this new or updated list, the kernel secure flag updated as appropriate and the previous step #3 of this communications sequence 1408 repeated.

5. Otherwise, the PE management portion of the kernel may provide a Return(SecureFlag=TRUE) indication 2128 to the protected environment and the communications sequence 1408 is complete.

Figure 22:
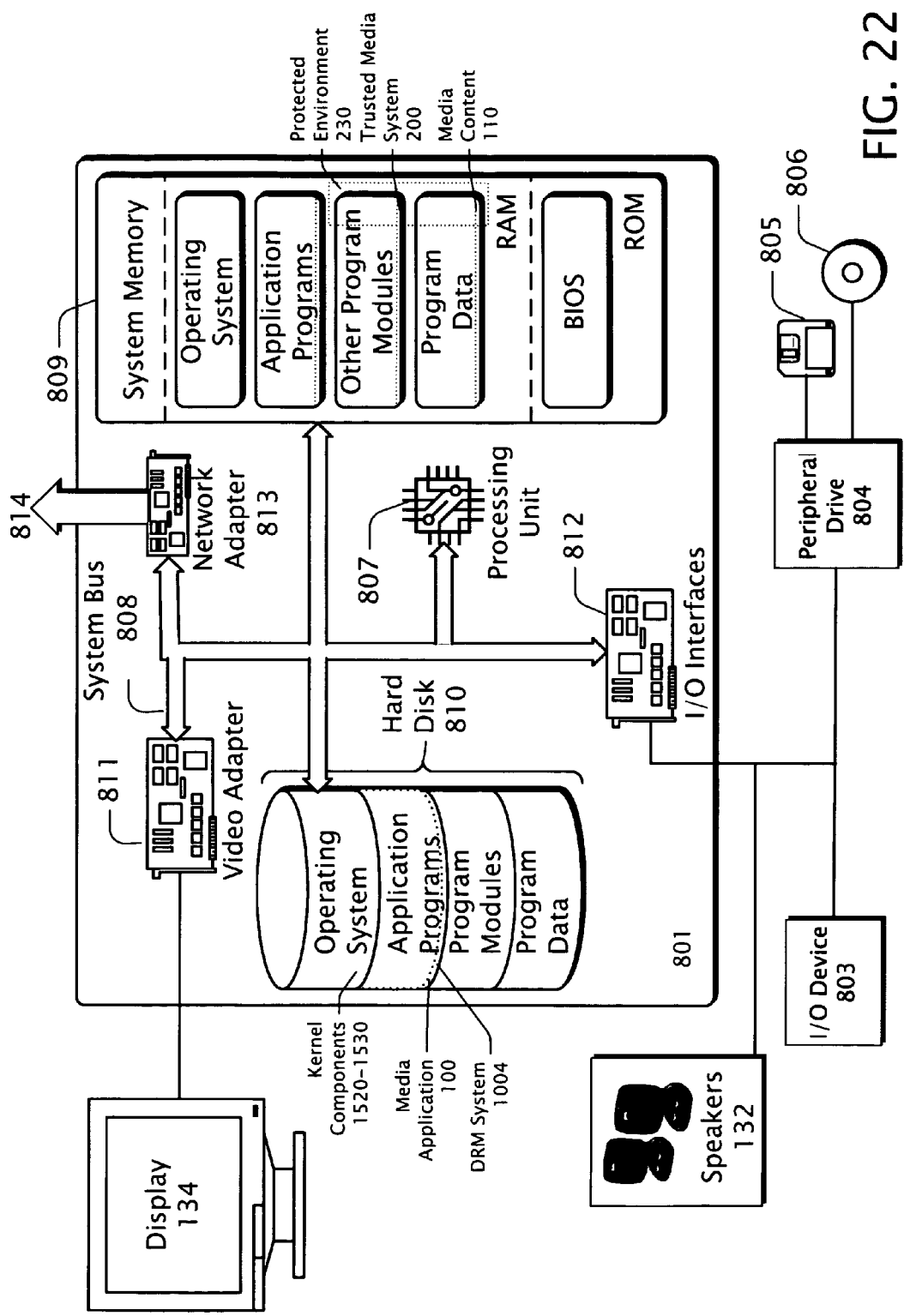
FIG. 22 is a block diagram showing an exemplary computing environment including a representation of a protected environment, a trusted media system, and other related elements.

FIG. 22 is a block diagram showing an exemplary computing environment 800 including a representation of a protected environment 230, a trusted media system 200, and other related elements. Exemplary personal computer 800 is similar to that shown in FIG. 8 with the addition of kernel components 1520-1530 that may be stored on the disk 810 along with the other operating system code and the like. Media application 100 and/or a digital rights management system 1004 may be stored on the disk 810 along with other application programs. These components 1520-1530 and applications 100, 1004 may be loaded into system memory 809 and considered operational. Shown loaded in system memory 809 is a trusted application 200 utilizing a protected environment 230 and media content 110.

The invention claimed is:

1. A system comprising a computing device and at least one software module that are together configured for processing media content, the system comprising:
a media source having an input and an output, the media source configured for operating in a protected space provided within the computing device, the input of the media source coupled to a first secure connection over which the media content is received via the media source into the protected space;
a plurality of transform mechanisms having an input and an output and configured for operating in the protected space provided within the computing device, the input of the plurality of transform mechanisms coupled to the output of the media source, where the plurality of transform mechanisms are configured for processing the media content;
a media sink having an input and an output, the media sink configured for operating in the protected space provided within the computing device, the input of the media sink coupled to the output of the plurality of transform mechanisms, the output of the media sink coupled to a second secure connection over which the processed media content is transferred via the media source out of the protected space, where the media source, the plurality of transform mechanisms, and the media sink are separate from each other and together form a protected media pipeline that includes an output and an input and that is configured for processing the media content within the protected space of the computing device.

2. The system of claim 1, where one of the plurality of transform mechanisms is a decoder.

3. The system of claim 1 further comprising a plurality of protected media pipelines.

4. The system of claim 1, where two of the plurality of transform mechanisms are coupled in series.

5. The system of claim 1, where two of the plurality of transform mechanisms are coupled in parallel.

6. The system of claim 1, where the protected media pipeline processes digitized audio.

7. The system of claim 1, where the protected media pipeline processes digitized video.

8. The system of claim 1, where the protected media pipeline is configured for resisting unauthorized access to the media content.

9. The system of claim 1 where the media source is configured for accessing the media content via hardware or via software.

10. A system comprising a computing device and at least one software module that are together configured for processing media content, the system comprising:
- a stub portion of a protected media source, where the stub portion includes an input and an output and is configured for operating in a first space provided within the computing device, the input of the stub portion of the protected media source coupled to media content; and
- a proxy potion of the protected media source, where the proxy portion includes an input and an output and is configured for operating in a protected space provided within the computing device, the input of the proxy portion of the protected media source coupled to the output of the stub portion of the protected media source, the stub portion further configured for transferring at least a portion of the media content via remote procedure call to the proxy portion;
- a plurality of transform mechanisms having an input and an output and configured for operating in the protected space provided within the computing device, the input of the plurality of transform mechanisms coupled to the output of the proxy portion of the protected media source, where the plurality of transform mechanisms are configured for processing the media content;
- a media sink having an input and an output, the media sink configured for operating in the protected space provided within the computing device, the input of the media sink coupled to the output of the plurality of transform mechanisms, the output of the media sink coupled to a second secure connection over which the processed media content is transferred via the media source out of the protected space, where the media source, the plurality of transform mechanisms, and the media sink are separate from each other and together form a protected media pipeline that includes an output and an input and that is configured for processing the media content within the protected space of the computing device.

11. The system of claim 10, where the first space is configured as an unprotected application space comprising unprotected elements of the system.

12. The system of claim 10, where the first space is configured as a protected media space distinct from the protected space and distinct from an unprotected application space comprising unprotected elements of the system.

13. The system claim 10, where the protected media source is configured for resisting unauthorized access to the media content transferred between the stub portion of the media source and the proxy portion of the media source.

14. A system comprising a computing device and at least one software module that are together configured for processing media content, the system comprising:
- a media control mechanism configured for operating in an application space within the computing device, and for controlling operations of the system;
- a protected media pipeline configured for operating in a protected space within the computing device, the protected space distinct from the application space, the protected media pipeline coupled to the media control mechanism, the protected media pipeline including a media source, a media sink, and a plurality of transform mechanisms, an input of the media source coupled to a first secure connection over which the media content is received via the media source into the protected space, an output of the media source coupled to an input of a plurality of transform mechanisms, the protected media pipeline configured for accessing the media content via the media source, decrypting the media content, processing the decrypted media content, and outputting the processed media content via the media sink, an output of the media sink coupled to a second secure connection over which the processed media content is transferred via the media source out of the protected space, where the media source, the plurality of transform mechanisms, and the media sink are separate from each other.

15. The system of claim 14, where the protected media pipeline is configured for resisting unauthorized access to the media content.

16. The system of claim 14 further comprising a digital rights management system communicating with the protected media pipeline.

17. The system of claim 14, where the media content is encrypted.

18. The system of claim 1, where the output of the protected media pipeline is coupled to the input of another protected media pipeline.

19. The system of claim 14 where the media source is configured for accessing the media content via hardware or via software.

* * * * *